US012643086B2

(12) United States Patent
Lawler et al.

(10) Patent No.: US 12,643,086 B2
(45) Date of Patent: Jun. 2, 2026

(54) METHOD AND APPARATUS FOR CARBON DIOXIDE SEQUESTRATION

(71) Applicant: Anvil Capture Systems Inc., East Chatham, NY (US)

(72) Inventors: James Warner Lawler, Brooklyn, NY (US); Corey Adam Myers, Cambridge, MA (US)

(73) Assignee: Anvil Capture Systems Inc., East Chatham, NY (US)

( * ) Notice: Subject to any disclaimer, the term of this patent is extended or adjusted under 35 U.S.C. 154(b) by 0 days.

(21) Appl. No.: 19/258,281

(22) Filed: Jul. 2, 2025

(65) Prior Publication Data

US 2026/0008008 A1 Jan. 8, 2026

Related U.S. Application Data

(60) Provisional application No. 63/667,548, filed on Jul. 3, 2024.

(51) Int. Cl.
*B01J 20/10* (2006.01)
*B01D 53/62* (2006.01)
(Continued)

(52) U.S. Cl.
CPC .............. *B01J 20/10* (2013.01); *B01D 53/62* (2013.01); *B01D 53/81* (2013.01); *B01D 53/82* (2013.01); *B01J 20/041* (2013.01); *B01J 20/28004* (2013.01); *B01J 20/28011* (2013.01); *B01J 20/28019* (2013.01); *B01J 20/3028* (2013.01); *B01D 2251/402* (2013.01);
(Continued)

(58) Field of Classification Search
None
See application file for complete search history.

(56) References Cited

U.S. PATENT DOCUMENTS 7,427,449 B2 9/2008 Delaney et al.
7,722,842 B2 5/2010 Park et al.
(Continued)

FOREIGN PATENT DOCUMENTS

BR PI0903159 11/2010
BR 102013019137 8/2015
(Continued)

OTHER PUBLICATIONS

Agbo, Peter, "Technological Innovation Opportunities for CO2 Removal", Energy earthshots U.S. Department of Energy, (Nov. 2024), 137 pages.

(Continued)

*Primary Examiner* — Daniel Berns
(74) *Attorney, Agent, or Firm* — Schwegman Lundberg & Woessner, P.A.

(57) ABSTRACT

A method for sequestering carbon dioxide includes contacting a first feedstock that is a gaseous feedstock including carbon dioxide with a second feedstock comprising one or more minerals, such that at least a portion of the carbon dioxide in the first feedstock reacts with the one or more minerals in the second feedstock to form a first output including one or more carbonate minerals and a second (Continued)

output that is a gaseous output having a lower concentration of carbon dioxide than a concentration of carbon dioxide in the first feedstock.

18 Claims, 12 Drawing Sheets

(51) Int. Cl.

| | |
|---|---|
| ***B01D 53/81*** | (2006.01) |
| ***B01D 53/82*** | (2006.01) |
| ***B01J 20/04*** | (2006.01) |
| ***B01J 20/28*** | (2006.01) |
| ***B01J 20/30*** | (2006.01) |

(52) U.S. Cl.

CPC .. *B01D 2251/404* (2013.01); *B01D 2251/604* (2013.01); *B01D 2253/106* (2013.01); *B01D 2253/25* (2013.01); *B01D 2253/304* (2013.01); *B01D 2253/306* (2013.01); *B01D 2253/311* (2013.01); *B01D 2253/34* (2013.01); *B01D 2257/504* (2013.01); *B01D 2258/06* (2013.01)

(56) References Cited

U.S. PATENT DOCUMENTS

| | | | | |
|---|---|---|---|---|
| 8,470,276 | B1 | 6/2013 | Siriwardane et al. | |
| 8,951,493 | B2 | 2/2015 | Sceats et al. | |
| 9,993,789 | B2 | 6/2018 | Bergstrøm | |
| 10,065,174 | B1 | 9/2018 | Wifong et al. | |
| 10,150,079 | B2 | 12/2018 | Mercier et al. | |
| 10,322,389 | B2 | 6/2019 | Malyala et al. | |
| 10,850,231 | B2 | 12/2020 | Mercier et al. | |
| 11,420,150 | B2 | 8/2022 | Onaizi et al. | |
| 11,697,597 | B2 | 7/2023 | Benhelal et al. | |
| 11,890,572 | B1 | 2/2024 | Scott et al. | |
| 2005/0180910 | A1 | 8/2005 | Park et al. | |
| 2007/0065841 | A1 | 3/2007 | Dunbar et al. | |
| 2012/0291675 | A1 | 11/2012 | Camire et al. | |
| 2013/0209339 | A1 | 8/2013 | Park et al. | |
| 2016/0332114 | A1 | 11/2016 | Mercier et al. | |
| 2019/0160450 | A1 | 5/2019 | Laroche et al. | |
| 2021/0047197 | A1* | 2/2021 | Benhelal .................. | C01F 5/24 |
| 2021/0120750 | A1 | 4/2021 | Bourhis et al. | |
| 2021/0252481 | A1 | 8/2021 | Chen et al. | |
| 2022/0362729 | A1 | 11/2022 | Leonard et al. | |
| 2024/0181432 | A1 | 6/2024 | Nusheh et al. | |
| 2025/0042756 | A1 | 2/2025 | Bellmann | |
| 2025/0051229 | A1 | 2/2025 | Bellmann | |
| 2025/0153098 | A1 | 5/2025 | Liu et al. | |
| 2025/0170524 | A1 | 5/2025 | Anderson et al. | |

FOREIGN PATENT DOCUMENTS

| | | | | |
|---|---|---|---|---|
| CN | 105457461 | | 4/2016 | |
| CN | 111603906 | | 12/2021 | |
| CN | 117443339 | | 1/2024 | |
| EP | 2478951 | | 7/2012 | |
| EP | 2008784 | | 2/2013 | |
| EP | 2216094 | | 5/2014 | |
| EP | 2484634 | | 7/2015 | |
| EP | 2928830 | | 4/2018 | |
| EP | 4140953 | | 3/2023 | |
| EP | 4442351 | | 10/2024 | |
| EP | 4472752 | | 12/2024 | |
| EP | 4323091 | | 2/2025 | |
| EP | 4556102 | | 5/2025 | |
| IN | 333055 | | 2/2020 | |
| IN | 202341051870 | | 9/2023 | |
| JP | H11166710 | | 6/1999 | |
| JP | 2020175344 | | 10/2020 | |
| WO | 2005108297 | | 11/2005 | |
| WO | 2010097449 | | 9/2010 | |
| WO | WO-2023002460 | A1 | 1/2023 | |
| WO | 2023049359 | | 3/2023 | |
| WO | WO-2023069964 | A1 * | 4/2023 | ............. B01D 53/84 |
| WO | 2024208737 | | 10/2024 | |
| WO | 2025062133 | | 3/2025 | |
| WO | 2025080858 | | 4/2025 | |

OTHER PUBLICATIONS

Isogai, Hirotaka, "Cost estimation of CCS integration into thermal power plants in Japan", Mechanical Engineering Journal, vol. 9, No. 4, (May 2022), 18 pages.

Lim, Sopokhem, "Application of Sorel cement containing magnesium carbonate as concrete fine aggregate for sequestering CO2: material and structural performance", Journal of Cleaner Production, 145697, (May 2025), 17 pages.

Mason, J Brad, "Thor steam reforming technology for the treatment of ion exchange resins and more complex wastes such as fuel reprocessing wastes", International Conference on Radioactive Waste Management and Environmental, (Oct. 2010), 8 pages.

Myers, C, "Sustainable Aviation Fuels from 30,000 feet Scoping Report", Lawrence Livermore National Laboratory (LLNL), Livermore, CA (United States), (Jan. 15, 2024), 13 pages.

Myers, C, "The cost of CO2 transport by truck and rail in the United States", International Journal of Greenhouse Gas Control 134, 104123, (2024), 16 pages.

Myers, C A, "Gigatonne-scale reduction of CO2 emissions via mineralization using iron and steel slags", Doctoral degree—Graduate School of Creative Science and Engineering, (Jul. 2019), 376 pages.

Myers, Corey, "Top-down life cycle assessment protocols for all mineralization-based CO2 removal methods", SSRN 5070948, (Oct. 2024), 12 pages.

Myers, Corey, "Community Economic Benefit Tools: Building trust for the re-industrialization and decarbonization of the US", Lawrence Livermore National Laboratory (LLNL), Livermore, CA (United States), (Nov. 2023), 33 pages.

Myers, Corey, "Acceleration of gas-solid CO2 mineralization with low energy consumption", Lawrence Livermore National Lab. (LLNL), Livermore, CA (United States), (Aug. 29, 2022), 12 pages.

Myers, Corey A, "Quantification of the CO2 mineralization potential of ironmaking and steelmaking slags under direct gas-solid reactions in flue gas", International Journal of Greenhouse Gas Control 87, (2019), 12 pages.

Myers, Corey, "Direct mineralization of atmospheric CO2 using natural rocks in Japan", Environmental Research Letters 15 (12) 124018, (Nov. 2020), 13 pages.

Myers, Corey A, "Negative emissions using Mg sourced from desalination brine or natural evaporite deposits", Proceedings of the 15th Greenhouse Gas Control Technologies Conference, (Mar. 2021), 12 pages.

Myers, Corey A, "Experimental Determination of Co2 Mineralization Depth of Slag Minerals at Co2 Concentrations Available in Iron and Steelmaking Flue Gases", 14th Greenhouse Gas Control Technologies Conference Melbourne, (Oct. 2018), 12 pages.

Myers, Corey, "Purification of magnesium chloride from mixed brines via hydrogen chloride absorption with ambient temperature and pressure regeneration of super azeotropic hydrochloric acid", Cleaner Engineering and Technology 8, 100473, (Jun. 2022), 14 pages.

Myers, Corey, "Stabilization of Radionuclides and Metals into Spinels Using THOR Fluidized Bed Steam Reforming 12039", WM Symposia 1628 E Southern Avenue Suite 9332 Tempe AZ 85282, (Feb. 2012), 12 pages.

Myers, Corey A, "Enhanced recovery process of calcium oxide and metals from steelmaking slag with net carbon sequestration", Energy Procedia 114, (Jul. 2017), 10 pages.

Myers, Corey, "Demonstration of brine-based atmospheric CO2 removal", 2nd International Conference on Negative Emission Technologies, (Jun. 2022), 24 pages.

Myers, Corey A, "Application of quenching to polycrystalline metallurgical slags to reduce comminution energy and increase mineral liberation", International Heat Transfer Conference Digital Library, (Aug. 2018), 10 pages.

(56) References Cited

OTHER PUBLICATIONS

Myers, Corey A, "Review of CCS and CCUS and their technological outlook—From the perspectives of cost, quantitative contribution, and risk-", Special Issue: Carbon Dioxide Capture, Storage, Fixation, and Utilization Technologies Feb. 2019 vol. 122, No. 1203 with manual English translation, (2019), 38 pages.
Nakagaki, T, "Time-dependent temperature distribution in slowly cooled molten slag simulated by solidification process and heat transfer model using properties estimated by deep neural network", Lawrence Livermore National Laboratory (LLNL), Livermore, CA (United States), (Aug. 16, 2022), 12 pages.
Nakagaki, T., "Processing technology from the molten state to promote CO2 mineralization of steel slag", Chemical Engineering 85 (3) with manual English translation, (2021), 18 pages.
Nordahl, Sarah L, "Carbon accounting for carbon dioxide removal", One Earth 7 (9), (Sep. 2024), 7 pages.
Olander, Jonathan, "Verification of the Accountability Method as a Means to Classify Radioactive Wastes Processed Using THOR Fluidized Bed Steam Reforming at the Studsvik Processing Facility", WM Symposia 1628 E Southern Avenue Suite 9 332 Tempe AZ 85282, (Feb. 2013), 19 pages.
Sunshine, Ethan M, "Multiscale optimization of formic acid dehydrogenation process via linear model decision tree surrogates", Computers and Chemical Engineering 194, 108921, (Mar. 2025), 8 pages.
Tsubuku, Yohei, "Feasibility study of net CO2 sequestration using seawater desalination brine with profitable polyproduction of commodities", 14th Greenhouse Gas Control Technologies Conference Melbourne, (Oct. 2018), 8 pages.
Yuan, Mengyao, "Integrated Systems-to-Atoms (S2A) Framework for Designing Resilient and Efficient Hydrogen Infrastructure Solutions", Energy and Fuels vol. 39 Issue 14, (Feb. 3, 2025), 25 pages.
"U.S. Appl. No. 19/258,385, Restriction Requirement mailed Sep. 5, 2025", 7 pages.
"U.S. Appl. No. 19/258,385, Response filed Oct. 24, 2025 to Restriction Requirement mailed Sep. 5, 2025", 7 pages.
"International Application Serial No. PCT US2025 036271, International Search Report mailed Nov. 13, 2025", 4 pages.
"International Application Serial No. PCT US2025 036271, Written Opinion mailed Nov. 13, 2025", 10 pages.
"International Application Serial No. PCT US2025 036264, International Search Report mailed Dec. 2, 2025", 4 pages.
"International Application Serial No. PCT US2025 036264, Written Opinion mailed Dec. 2, 2025", 11 pages.
"U.S. Appl. No. 19/258,385, Non Final Office Action mailed Dec. 2, 2025", 14 pages.
Myers, Corey A, "Effect of Solidification and Cooling Methods on the Efficacy of Slag as a Feedstock for CO2 Mineralization", ISIJ International, vol. 58 2018, No. 2, 2018, 10 pages.
Myers, Corey A, "Prediction of Nucleation Lag Time from Elemental Composition and Temperature for Iron and Steelmaking Slags Using Deep Neural Networks", ISIJ International 59 4, 2019, 13 pages.
Myers, Corey A, "Enhancing CO2 mineralization rate and extent of iron and steel slag via grinding", ISIJ International 62 12, 2022, 10 pages.

* cited by examiner

100

102
INTRODUCING A FIRST FEEDSTOCK INTO A REACTOR, THE FIRST FEEDSTOCK INCLUDING CARBON DIOXIDE

104
CONTACTING THE FIRST FEEDSTOCK WITH A SECOND FEEDSTOCK INCLUDING ONE OR MORE MINERALS PRESENT IN THE REACTOR SUCH THAT AT LEAST A PORTION OF THE THE CARBON DIOXIDE REACTS WITH THE ONE OR MORE MINERALS TO PRODUCE FIRST AND SECOND OUTPUTS, THE FIRST OUTPUT INCLUDING ONE OR MORE CARBONATE MINERALS AND THE SECOND OUTPUT INCLUDING A CONCENTRATION OF CARBON DIOXIDE THAT IS LESS THAN A CONCENTRATION OF CARBON DIOXIDE IN THE FIRST FEEDSTOCK

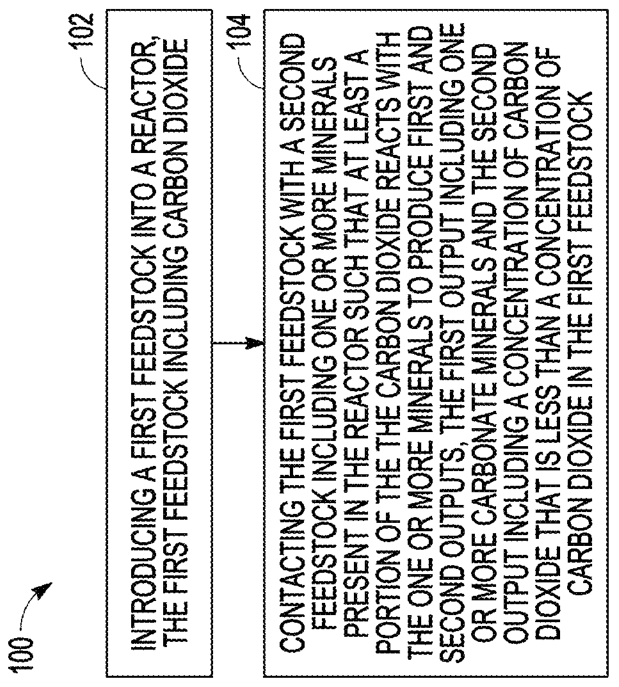

EXTRACT 202

CRUSH

GRIND

204

PELLETIZE 206

MODULAR REACTOR 208

ON-SITE STORAGE 210

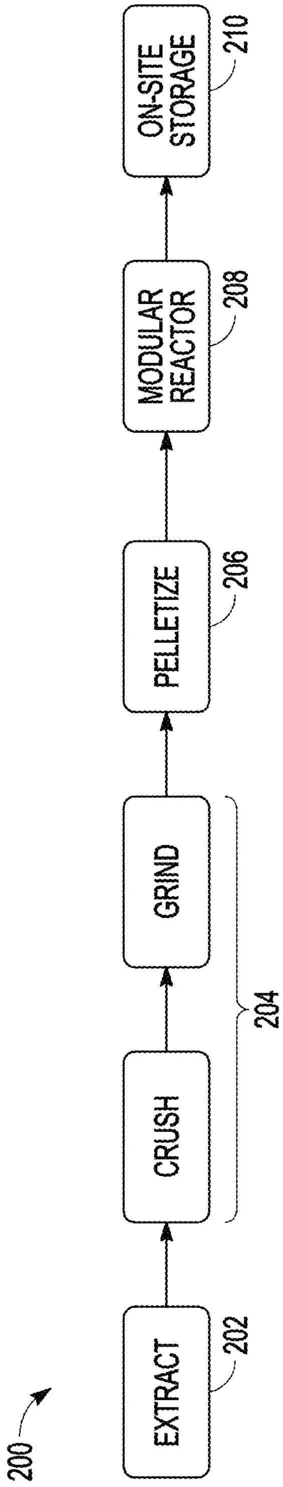

FIG. 2

METHOD AND APPARATUS FOR CARBON DIOXIDE SEQUESTRATION

CROSS-REFERENCE TO RELATED APPLICATION

This application claims the benefit of priority to U.S. Provisional Patent Application Ser. No. 63/667,548 filed Jul. 3, 2024, the disclosure of which is incorporated herein in its entirety by reference.

BACKGROUND

The increasing concentration of carbon dioxide ($CO_2$) in the atmosphere the primary contributor to global climate change. Efforts to mitigate this issue have led to the development of various technologies aimed at capturing and sequestering $CO_2$. Among these, direct air capture (DAC) has emerged as a promising approach for removing $CO_2$ directly from ambient air. DAC technologies typically rely on chemical or physical processes to extract $CO_2$, which can then be stored in long-term, stable forms to achieve permanent removal from the carbon cycle.

Direct air carbon capture and sequestration (DACCS) combines DAC with safe, long-term storage methods to ensure the captured $CO_2$ remains isolated from the atmosphere for extended periods, often exceeding 1,000 years. However, existing DACCS systems face several challenges, including high energy consumption, low net $CO_2$ capture efficiency, and significant operational costs. Additionally, many current methods require complex infrastructure, large site footprints, and extensive material handling, which further limit their scalability and economic viability.

One approach to DACCS involves the use of mineralization reactions, wherein $CO_2$ reacts with alkaline minerals to form stable carbonate compounds. This method offers the advantage of permanent $CO_2$ storage in solid form, eliminating the need for external storage facilities or injection into geological formations. However, conventional mineralization processes often suffer from slow reaction rates, high energy requirements, and limited compatibility with ambient atmospheric conditions.

SUMMARY OF THE INVENTION

In various aspects the present disclosure provides a method for sequestering carbon dioxide, the method including contacting a first feedstock that is a gaseous feedstock including carbon dioxide with a second feedstock including one or more minerals, such that at least a portion of the carbon dioxide in the first feedstock reacts with the one or more minerals in the second feedstock to form a first output including one or more carbonate minerals and a second output that is a gaseous output having a lower concentration of carbon dioxide than a concentration of carbon dioxide in the first feedstock.

In various aspects the present disclosure provides a method for sequestering carbon dioxide. The method includes contacting a gaseous feedstock including carbon dioxide and having a relative humidity of 50% to 100% with pellets including a pelletized powder including brucite, wherein the powder is 5 wt % to 90 wt % magnesium hydroxide. The contacting is performed such that at least a portion of the carbon dioxide in the gaseous feedstock reacts with the pellets to produce used pellets that are the pellets after reaction with the carbon dioxide to form one or more magnesium carbonates and a gaseous output having a lower concentration of carbon dioxide than a concentration of carbon dioxide in the gaseous feedstock.

In various aspects the present disclosure provides a method for sequestering carbon dioxide. The method includes introducing a first feedstock into a reactor, wherein the first feedstock is gaseous and includes carbon dioxide, and wherein the first feedstock has a relative humidity of 80% to 100%. The method also includes contacting the first feedstock with a second feedstock in the reactor, the second feedstock including dry spherical pellets that are less than or equal to 15 wt % water, have a mean diameter of 1 mm to 10 mm, and include a pelletized powder including brucite, wherein the powder is 5 wt % to 90 wt % magnesium hydroxide, such that at least a portion of the carbon dioxide reacts with the pellets to produce first and second outputs, wherein the first output includes used pellets that are the pellets after reaction with the carbon dioxide to form one or more magnesium carbonates and the second output is a gaseous output having a lower concentration of carbon dioxide than a concentration of carbon dioxide in the first feedstock.

In various aspects the present disclosure provides an apparatus for sequestering carbon dioxide. The apparatus includes a reactor including a reactor cavity configured to house structured powder bodies including one or more minerals. The reactor includes a gas inlet extending through a wall of the reactor and into the reactor cavity. The reactor also includes a gas outlet extending through the wall of the reactor and into the reactor cavity, the gas outlet configured to release a product gas from the reactor. The reactor is configured such that a gas source including carbon dioxide provided to the reactant gas inlet passes through the reactor cavity such that at least some of the carbon dioxide reacts with the structured powder bodies to form used structured powder bodies that are the structured powder bodies after reaction with the carbon dioxide to form one or more magnesium carbonates and forms the product gas having a lower concentration of carbon dioxide than the gas source.

In various aspects the present disclosure provides an apparatus for sequestering carbon dioxide. The apparatus includes a reactor that includes a reactor cavity configured to house pellets including a pelletized powder including brucite, wherein the powder is 5 wt % to 90 wt % magnesium hydroxide. The reactor includes a gas inlet extending through a wall of the reactor and into the reactor cavity. The reactor also includes a gas outlet extending through the wall of the reactor and into the reactor cavity, the gas outlet arranged to release a product gas from the reactor. The reactor is configured such that a gas source including carbon dioxide and having a relative humidity of 50% to 100% provided to the reactant gas inlet passes through the reactor cavity such that at least some of the carbon dioxide reacts with the pellets to form used pellets that are the pellets after reaction with the carbon dioxide to form one or more magnesium carbonates and forms the product gas having a lower concentration of carbon dioxide than the gas source.

In various aspects the present disclosure provides an apparatus for sequestering carbon dioxide. The apparatus includes a reactor including a reactor cavity including a removable cassette configured to house a stationary and dry bed of pellets, wherein the pellets are less than or equal to 15 wt % water and include a pelletized powder including brucite, wherein the powder is 5 wt % to 90 wt % magnesium hydroxide, wherein the pellets are spherical pellets having a mean diameter of 1 mm to 10 mm, wherein the removable cassette and the reactor are configured such that the removable cassette can be slid into and out of the reactor.

The reactor includes a gas inlet extending through a wall of the reactor and into the reactor cavity, wherein the gas inlet is located in a portion of the reactor that is at one end of the reactor. The reactor also includes a gas outlet extending through the wall of the reactor and into the reactor cavity, the gas outlet arranged to release a product gas from the reactor, wherein the gas outlet is located in a portion of the reactor that is at an opposite end of the reactor. The reactor is configured such that the cassette forms a substantially air-tight seal with an interior of the wall of the reactor such that gas entering from the gas inlet is prevented from bypassing the reactor cavity as it flows to the gas outlet. The reactor is configured such that a gas source including carbon dioxide and having a relative humidity of 80% to 100% provided to the reactant gas inlet passes through the reactor cavity such that at least some of the carbon dioxide reacts with the pellets to form used pellets that are the pellets after reaction with the carbon dioxide to form one or more magnesium carbonates and forms the product gas having a lower concentration of carbon dioxide than the gas source.

Various aspects of the method and apparatus for removing $CO_2$ of the present disclosure can have various commercial and/or economic advantages over other methods and apparatuses for removing $CO_2$. For example, in various aspects, the method and apparatus for removing $CO_2$ of the present disclosure can have greater energy efficiency than other $CO_2$ removal methods, such as compared to fluidized bed methods or slurry reactor methods. In various aspects, the method and apparatus for removing $CO_2$ of the present disclosure can have higher net $CO_2$ removal (i.e., quantity of $CO_2$ mineralized minus the $CO_2$ emitted to achieve mineralization) efficiency than other methods, such as compared to methods requiring significant upstream emissions. In various aspects, the method and apparatus for removing $CO_2$ of the present disclosure can have superior $CO_2$ capture rates compared to other methods. In various aspects, the method and apparatus for removing $CO_2$ of the present disclosure can have reduced capital expenditure compared to other methods. In various aspects, the method and apparatus for removing $CO_2$ of the present disclosure can have lower overall operational cost per mass of $CO_2$ removed and more cost-effective operation compared to other methods. In various aspects, the methods and apparatus for removing $CO_2$ of the present disclosure can have lower energy consumption compared to other methods such as those concentrating $CO_2$ from the atmosphere. In various aspects, the methods and apparatus for removing $CO_2$ of the present disclosure can have lower land usage compared to other methods that use biological sources of carbon. In various aspects, the methods and apparatus for removing $CO_2$ of the present disclosure can have higher certainty of $CO_2$ removal compared to other methods. In various aspects, the methods and apparatus for removing $CO_2$ of the present disclosure can have higher verifiability of net $CO_2$ removal compared to other methods. In various aspects, the methods and apparatus for removing $CO_2$ of the present disclosure can have higher certainty and duration of sequestering $CO_2$ from the atmosphere, hydrosphere, and biosphere carbon cycles compared to other methods. In various aspects, the methods and apparatus for removing $CO_2$ of the present disclosure can have lower project execution risk compared to other methods.

Various aspects of the method and apparatus for removing $CO_2$ of the present disclosure can have various technical performance advantages over other methods and apparatuses for removing $CO_2$. For example, in various aspects, the method and apparatus for removing $CO_2$ of the present disclosure can more rapidly mineralize $CO_2$ as compared to other methods. In various aspects, the method and apparatus for removing $CO_2$ of the present disclosure can have better ambient condition operation than other methods. In various aspects, the method and apparatus for removing $CO_2$ of the present disclosure can have better performance over a range of different humidities, including at high humidities, compared to other methods. In various aspects, the method and apparatus for removing $CO_2$ of the present disclosure can have better compatibility with atmospheric $CO_2$ concentration than other methods, such as compared to methods requiring $CO_2$ concentration. In various aspects, the method and apparatus for removing $CO_2$ of the present disclosure can have a more flexible reactor configuration than other methods.

Various aspects of the method and apparatus for removing $CO_2$ of the present disclosure can have various operational advantages over other methods and apparatuses for removing $CO_2$. For example, in various aspects, the method and apparatus for removing $CO_2$ of the present disclosure can have a lower pressure drop than other methods, such as compared to fluidized bed methods or slurry methods. In various aspects, the method and apparatus for removing $CO_2$ of the present disclosure can have better continuous operation capability than other methods. In various aspects, the method and apparatus for removing $CO_2$ of the present disclosure can have easier material handling than other methods, such as compared to powder-based methods. In various aspects, the method and apparatus for removing $CO_2$ of the present disclosure can have more modular design than other methods. In various aspects, the method and apparatus for removing $CO_2$ of the present disclosure can have reduced site footprint compared to other methods. In various aspects, the method and apparatus for removing $CO_2$ of the present disclosure can have lower infrastructure requirements than other methods, such as compared to large-scale industrial systems.

Various aspects of the method and apparatus for removing $CO_2$ of the present disclosure can have various environmental advantages over other methods and apparatuses for removing $CO_2$. For example, in various aspects, the method and apparatus for removing $CO_2$ of the present disclosure can provide more permanent $CO_2$ storage than other methods. In various aspects, the method and apparatus for removing $CO_2$ of the present disclosure can have fewer external storage requirements than other methods, such as compared to methods requiring $CO_2$ transport and injection. In various aspects, the method and apparatus for removing $CO_2$ of the present disclosure can have reduced land disturbance compared to other methods. In various aspects, the method and apparatus for removing $CO_2$ of the present disclosure can have better single-pass processing than other methods.

In various aspects, the structured powder for removing $CO_2$ of the present disclosure can have various commercial and/or economic advantages over other $CO_2$ removal materials. In various aspects, the structured powder for removing $CO_2$ of the present disclosure can have less or no binder compared to other structured powders, thereby providing a structured powder with a greater concentration of $CO_2$-removing material than other structured powders. In various aspects, the structured powder for removing $CO_2$ of the present disclosure can be manufactured using lower-energy manufacturing techniques than other structured powders or $CO_2$-removal materials. In various aspects, the structured powder for removing $CO_2$ of the present disclosure can be formed from more cost-effective raw materials than other structured powders or other $CO_2$-removal materials. In various aspects, the structured powder for removing $CO_2$ of the present disclosure can have more efficient material utilization for $CO_2$ removal than other structured powders or $CO_2$-removal materials.

In various aspects, the structured powder for removing $CO_2$ of the present disclosure can have various technical performance advantages over other $CO_2$ removal materials. For example, in various aspects, the structured powder for removing $CO_2$ of the present disclosure can have greater reaction rates with $CO_2$ compared to other structured powders or other $CO_2$-removal materials. In various aspects, the structured powder for removing $CO_2$ of the present disclosure can have superior packed bed performance as compared to other structured powders, powders, or other $CO_2$-removal materials. In various aspects, the structured powder for removing $CO_2$ of the present disclosure can have more complete reaction extent before requiring replacement as compared to other structured powders, powders, or other $CO_2$-removal materials. In various aspects, the structured powder for removing $CO_2$ of the present disclosure can be formed from powders having a more optimal particle size distribution than other structured powders or other structured materials, such as compared structured materials including coarser or finer powders. In various aspects, the structured powder for removing $CO_2$ of the present disclosure can have higher surface area than other structured powders. In various aspects, the structured powder for removing $CO_2$ of the present disclosure can have a greater porosity than other structured powders or other structured materials while achieving high compressive strength. In various aspects, the structured powder for removing $CO_2$ of the present disclosure have a reduced chance of gas fingering than powders and are therefore more reactive than powders. In various aspects, the structured powder for removing $CO_2$ of the present disclosure provide a reduced pressure drop compared to powders and therefore provide less energy consumption than powders. In various aspects, the structured powder for removing $CO_2$ of the present disclosure provide reduced instance of concretion compared to powders and therefore provide more even gas glow and material handling than powders.

In various aspects, the structured powder for removing $CO_2$ of the present disclosure can have various physical and/or handling advantages over other $CO_2$ removal materials. For example, in various aspects, the structured powder for removing $CO_2$ of the present disclosure can have more optimal structured powder size and/or shape than other structured powders or other structured materials. In various aspects, the structured powder for removing $CO_2$ of the present disclosure can have higher compressive strength than other structured powders, thereby providing easier transport and handling. In various aspects, the higher compressive strength of the structured powder for removing $CO_2$ of the present disclosure can enable the use of a taller bed of structured powder bodies which can result in reduced site footprint and capital expenditure compared to other structured materials. In various aspects, the structured powder for removing $CO_2$ of the present disclosure can have reduced dust generation compared to other powders or structured powders, thereby providing reduced worker and equipment hazard. In various aspects, the structured powder for removing $CO_2$ of the present disclosure can have improved handling compared to other powders or structured powders. In various aspects, the structured powder for removing $CO_2$ of the present disclosure can have more homogeneous structure than other structured powders.

In various aspects, the structured powder for removing $CO_2$ of the present disclosure can have various manufacturing advantages over other $CO_2$ removal materials. For example, in various aspects, the structured powder for removing $CO_2$ of the present disclosure can have a simpler production process than other $CO_2$-removal materials. In various aspects, the structured powder for removing $CO_2$ of the present disclosure can be formed under ambient conditions, providing higher energy efficiency fabrication than other structured materials such as ones requiring high-temperature or high-pressure processing. In various aspects, the structured powder for removing $CO_2$ of the present disclosure can be formed using natural aggregation, providing more efficient formation than other structured powders such as structured powders requiring forced agglomeration methods. In various aspects, the structured powder for removing $CO_2$ of the present disclosure can have more consistent and more highly optimized size than other structured powders. In various aspects, the structured powder for removing $CO_2$ of the present disclosure can be formed using a shorter aging time than other structured powders or $CO_2$-removal materials, such as compared to structured powders processes requiring extended curing processes. In various aspects, the structured powder for removing $CO_2$ of the present disclosure can be aged under ambient conditions, providing energy savings over structured powders or $CO_2$-removal materials that require heated curing processes.

In various aspects, the structured powder for removing $CO_2$ a of the present disclosure can have various chemical and/or mineralogical advantages over other $CO_2$ removal materials. For example, in various aspects, the structured powder for removing $CO_2$ of the present disclosure can provide more stable carbonate formation than other powders or structures powders. In various aspects, the structured powder for removing $CO_2$ of the present disclosure can have higher brucite content than other structured powders or $CO_2$-removal materials. In various aspects, the structured powder for removing $CO_2$ of the present disclosure can have a more natural mineral composition than other structured powders or $CO_2$-removal materials. In various aspects, the structured powder for removing $CO_2$ of the present disclosure can provide more permanent mineralization of $CO_2$ than other structured powders or $CO_2$-removal materials.

BRIEF DESCRIPTION OF THE FIGURES

The drawings illustrate generally, by way of example, but not by way of limitation, various aspects of the present invention.

FIG. 1 is a flowchart of an example process of direct-air carbon capture and sequestration, in accordance with various aspects of the present disclosure.

FIG. 2 is a flow chart depicting processing of alkaline minerals for use in direct-air carbon capture and sequestration, in accordance with various aspects of the present disclosure.

DETAILED DESCRIPTION OF THE INVENTION

Figure 3:
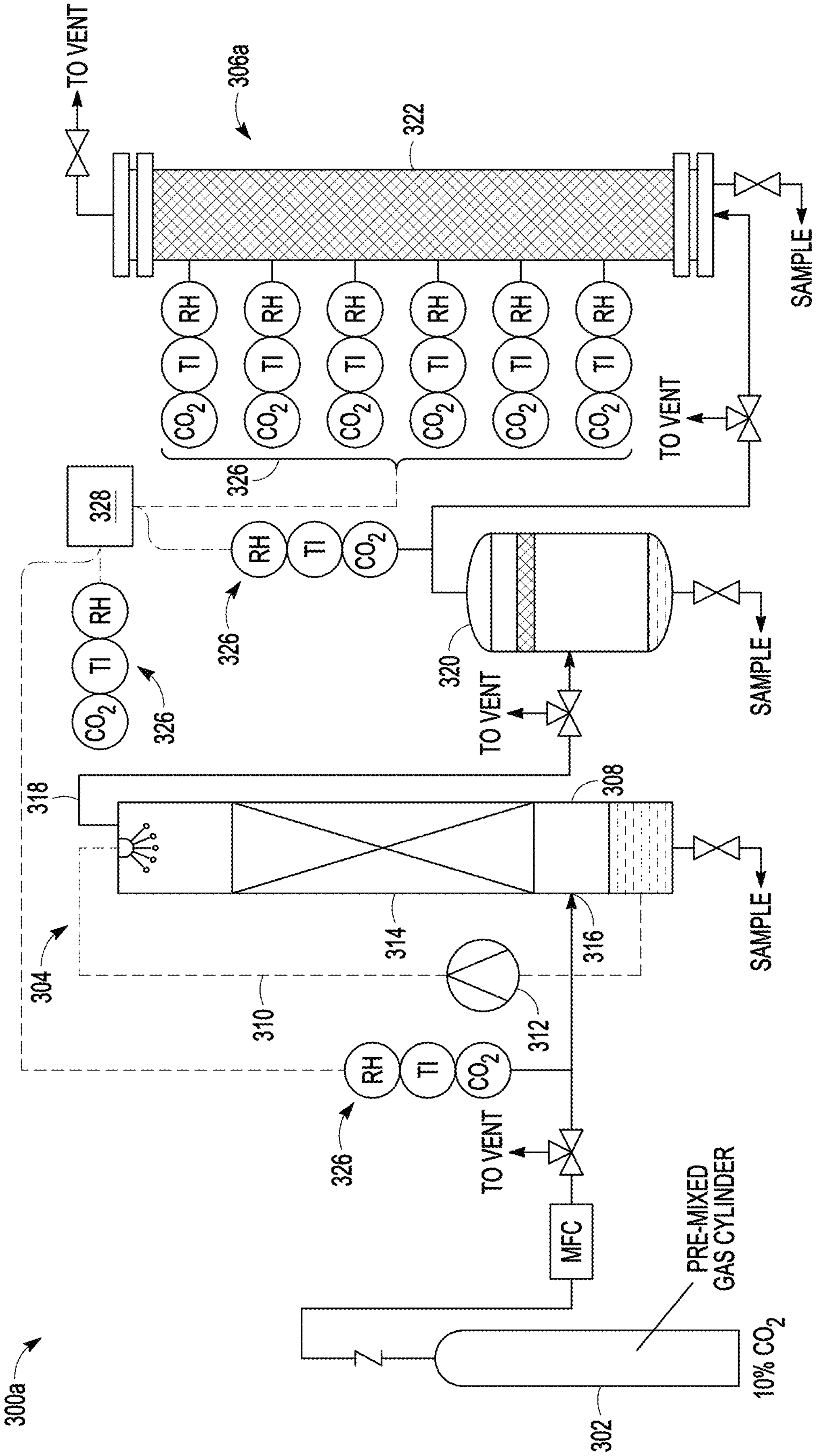
FIG. 3 illustrates a reactor system that can be used to directly capture carbon from and sequester the carbon through a reaction with minerals, in accordance with various aspects of the present disclosure.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in a specific order as recited herein. Alternatively, in any aspect(s) disclosed herein, specific acts may be carried out in any order without departing from the principles of the invention, except when a temporal or operational sequence is explicitly recited. Furthermore, specified acts can be carried out concurrently unless explicit claim language recites that they be carried out separately or the plain meaning of the claims would require it. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Method for Sequestering Carbon Dioxide.

Various aspects of the present disclosure provide a method for sequestering carbon dioxide. The method includes contacting a first feedstock that is a gaseous feedstock including carbon dioxide with a second feedstock including one or more minerals. The contacting is performed such that at least a portion of the carbon dioxide in the first feedstock reacts with the one or more minerals in the second feedstock to form a first output including one or more carbonate minerals and a second output that is a gaseous output having a lower concentration of carbon dioxide than a concentration of carbon dioxide in the first feedstock.

The first and second feedstock can be substantially free of liquid water. Liquid water can be 0 wt % to 30 wt % of the first feedstock, 0 wt % to 15 wt %, or 0 wt % to 10 wt %, or 0 wt % to 5 wt %, or 0 wt % to 1 wt %, or 0 wt % to 0.5 wt % of the first feedstock, or less than or equal to 30 wt % and greater than or equal to 0 wt % and less than, equal to, or greater than 0.01 wt %, 0.05, 0.1, 0.2, 0.3, 0.4, 0.5, 0.6, 0.8, 1, 1.5, 2, 2.5, 3, 3.5, 4, 4.5, 5, 6, 7, 8, 9, 10, 11, 12, 13, 14, 15, 16, 18, 20, 22, 24, 26, 28, or 29 wt %. Liquid water (e.g., absorbed liquid water) can be 0 wt % to 30 wt % of the second feedstock, 0 wt % to 15 wt %, or 0 wt % to 10 wt %, or 0 wt % to 5 wt %, or 0 wt % to 1 wt %, or 0 wt % to 0.5 wt % of the second feedstock, or less than or equal to 30 wt % and greater than or equal to 0 wt % and less than, equal to, or greater than 0.01 wt %, 0.05, 0.1, 0.2, 0.3, 0.4, 0.5, 0.6, 0.8, 1, 1.5, 2, 2.5, 3, 3.5, 4, 4.5, 5, 6, 7, 8, 9, 10, 11, 12, 13, 14, 15, 16, 18, 20, 22, 24, 26, 28, or 29 wt %. Prior to the contacting of the first feedstock and the second feedstock, the one or more minerals can be substantially free of liquid water. Prior to contacting the first feedstock and the second feedstock, liquid water can be 0 wt % to 30 wt % of the one or more minerals (e.g., absorbed water), or 0 wt % to 15 wt %, or 0 wt % to 10 wt %, or 0 wt % to 5 wt %, or 0 wt % to 1 wt %, or 0 wt % to 0.5 wt % of the one or more minerals, or less than or equal to 30 wt % and greater than or equal to 0 wt % and less than, equal to, or greater than 0.01 wt %, 0.05, 0.1, 0.2, 0.3, 0.4, 0.5, 0.6, 0.8, 1, 1.5, 2, 2.5, 3, 3.5, 4, 4.5, 5, 6, 7, 8, 9, 10, 11, 12, 13, 14, 15, 16, 18, 20, 22, 24, 26, 28, or 29 wt %. After the first feedstock and the second feedstock are contacted, water can condense from the first feedstock onto the one or more minerals. During the contacting of the first feedstock and the second feedstock the one or more minerals can be substantially free of liquid water other than any additional water that condenses on the one or more minerals from humidity present in the first feedstock.

The one or more minerals can be any suitable one or more minerals that can react with $CO_2$ in the first feedstock to form a solid mineralized form of the $CO_2$. The one or more minerals can include $Mg(OH)_2$, $CaSiO_3$, $Mg_3Si_2O_5(OH)_4$, $Mg_{10}Fe_2(CO_3)(OH)_{24}\cdot 2H_2O$, $Mg_6Fe_3(OH)_{16}(CO_3)(H_2O)_4$, $Ca(OH)_2$, $Fe(OH)_2$, $Mn(OH)_2$, $Sr(OH)_2$, $Ba(OH)_2$, CaO, MgO, SrO, BaO, $Ca_2SiO_4$, $Ca_3SiO_5$, $Ca_3Si_2O_7$, $Ca_7MgSi_4O_{16}$, $Ca_3MgSi_2O_8$, $Ca_2MgSi_2O_7$, $CaMgSi_2O_6$, $CaFeSiO_4$, $Mg_2SiO_4$, $MgSiO_3$, $Ca_2Fe_2O_5$, $Ca_3Al_2O_6$, $Ca_{12}Al_{14}O_{33}$, $CaAl_4O_7$, $CaAl_{12}O_{19}$, $MgFe_2O_4$, $Ca_2Al_2SiO_7$, or a combination thereof. The one or more minerals can include $Mg(OH)_2$, $CaSiO_3$, $Mg_3Si_2O_5(OH)_4$, or a combination thereof. The one or more minerals can include brucite, which is a mineral (i.e., a naturally occurring inorganic solid) having the chemical formula $Mg(OH)_2$. The first feedstock can optionally include other one or more minerals that are unreactive with $CO_2$, in addition to the one or more minerals that are reactive with $CO_2$ to form the solid mineralized form of the $CO_2$.

The one or more minerals can include magnesium hydroxide. The magnesium hydroxide can be 1 wt % to 100 wt % of the one or more minerals, or 5 wt % to 90 wt % of the one or more minerals, or less than or equal to 100 wt % and greater than or equal to 1 wt % and less than, equal to, or greater than 2 wt %, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99 wt %.

The one or more minerals can react with $CO_2$ in the first feedstock to form a solid mineralized form of the $CO_2$ (i.e., one or more carbonate minerals). The first output includes the solid mineralized form of the $CO_2$. For example, depending on the type or types of the one or more minerals in the second feedstock, the first output can include nesquehonite, hydromagnesite, dypingite, amorphous hydrated magnesium carbonate, amorphous magnesium carbonate, artinite, barringtonite, giorgiosite, landsfordite, magnesite, pokrovskite, calcite, aragonite, vaterite, amorphous calcium carbonate, siderite, other thermodynamically stable carbonate minerals, or a combination thereof. For example, balanced chemical equations to produce hydrated magnesium carbonates from $Mg(OH)_2$ are shown in Eq. 1-3.

$$Mg(OH)_2(s) + CO_2(g) + 2H_2O(g) \longrightarrow MgCO_3\cdot 3H_2O \text{ (nesquehonite)} \quad (1)$$

$$5Mg(OH)_2(s) + 4CO_2(g) \longrightarrow 4MgCO_3\cdot Mg(OH)_2\cdot 4H_2O \text{ (hydromagnesite)} \quad (2)$$

$$5Mg(OH)_2(s) + 4CO_2(g) + H_2O(g) \longrightarrow 4MgCO_3\cdot Mg(OH)_2\cdot 5H_2O \text{ (dypingite)} \quad (3)$$

The one or more minerals can be in any suitable form during the contacting with the first feedstock. In various aspects, the one or more minerals can be in the form of structured powder bodies, wherein each of the structured powder bodies includes an agglomerated powder. The structured powder bodies can be any suitable type of structured powder bodies described herein for use with the method or apparatus of the present disclosure.

The first feedstock can have any suitable carbon dioxide content. The first feedstock can have a carbon dioxide concentration of 0.01 vol % to 100 vol %, 0.03 vol % to 0.1 vol %, or 0.01 vol % to 3 vol %, or 0.01 vol % to 5 vol %, or 0.01 wt % to 15 vol %, or 0.01 vol % to 40 vol %, or 0.01 vol % to 95 vol %, or less than or equal to 100 vol % and greater than or equal to 0.01 vol % and less than, equal to, or greater than 0.02, 0.03, 0.04, 0.05, 0.06, 0.07, 0.08, 0.09, 0.1, 0.12, 0.14, 0.16, 0.18, 0.2, 0.3, 0.4, 0.5, 0.6, 0.8, 1, 1.5, 2, 2.5, 3, 3.5, 4, 4.5, 5, 6, 7, 8, 9, 10, 12, 14, 16, 18, 20, 25, 30, 35, 40, 45, 50, 55, 60, 65, 70, 75, 80, 85, 90, or 95%. The first feedstock can have a carbon dioxide content that is ambient atmospheric carbon dioxide concentration, or below ambient atmospheric carbon dioxide concentration, or above ambient atmospheric carbon dioxide concentration. The first feedstock can be or include an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof. The first feedstock can be ambient atmospheric air.

The contacting of the first feedstock and the second feedstock can be performed in a reactor. The reactor can be any suitable reactor that is capable of containing the first feedstock and the second feedstock and allowing them to react with one another to form the one or more carbonate minerals from the carbon dioxide in the first feedstock. The method can include introducing the first feedstock to the reactor to contact the second feedstock within the reactor and to form the first and second output in the reactor. The method can include removing the second output from the reactor. The method can include periodically removing the first output from the reactor and replacing the second feedstock with fresh second feedstock (i.e., replacing the used one or more minerals with fresh one or more minerals).

The reactor can include a reactor cavity configured to house structured powder bodies including the one or more minerals. The reactor cavity can be configured to directly house the structured powder bodies, or the reactor cavity can be configured to house a cassette that contains the one or more structured powder bodies. The reactor can include a gas inlet extending through a wall of the reactor and into the reactor cavity or into a portion of the reactor that is fluidly connected to the reactor cavity. The gas inlet can be configured to accept the first feedstock. The reactor can include a gas outlet extending through the wall of the reactor and into the reactor cavity or into a portion of the reactor that is fluidly connected to the reactor cavity. The gas outlet can be configured to release the second output from the reactor.

The reactor cavity can include a removable cassette that is configured to house the one or more minerals. The removable cassette can be removed from the reactor cavity, allowing the one or more minerals to be easily changed out and replaced with fresh one or more minerals. For example, in an aspect wherein the one or more minerals are in the form of structured powder bodies, the used structured powder bodies can be periodically changed out for fresh structured powder bodies. The cassette can include at least one side that is porous and that has openings that are smaller than a mean diameter of the structured powder bodies (e.g., having a size that is equal to the mean diameter of the structured powder bodies minus 0.5-3 standard deviations, such as minus one standard deviation, or minus two standard deviations), such as a screen or mesh having openings that are smaller than a mean diameter or mean largest dimension size of the structured powder bodies. In a reactor configuration wherein the first feedstock flows vertically through the cassette, the cassette can include at least a bottom surface that is porous such as including a screen or mesh having openings that are smaller than a mean diameter or mean largest dimension size of the structured powder bodies, to prevent the structured powder bodies from falling out of the cassette; optionally, such a cassette can also include a top surface that is porous such as including a screen or mesh having openings that are smaller than a mean diameter or mean largest dimension size of the structured powder bodies. In a reactor configuration wherein the first feedstock flows horizontally through the cassette, the cassette can include two opposite sides that are porous such as including a screen or mesh having openings that are smaller than a mean diameter or mean largest dimension size of the structured powder bodies, wherein the opposite sides are perpendicular to the direction of the flow of the first feedstock through the cartridge, to allow the first feedstock to flow through the porous opposite sides and to prevent the structured powder bodies from falling out of the cartridge. The reactor can be configured such that the removable cassette can be slid into and out of the reactor. The reactor can be configured such that the cassette forms a substantially airtight seal with an interior of the wall of the reactor such that gas entering from the gas inlet is substantially prevented from bypassing the cassette in the reactor cavity as it flows through the cassette and toward the gas outlet. The gas inlet is located at or proximate to a portion of the reactor that is at one end of the reactor, and the gas outlet is located at or proximate to a portion of the reactor at an opposite end of the reactor, such that the reactor is configured for the gas source to pass through the cassette toward the gas outlet.

The contacting can be achieved by and can include flowing the first feedstock through a bed of the one or more minerals having a depth of 0.5 m to 5 m, or 1 m to 1.5 m, or 0.5 m to 1 m, or 1.5 m to 2 m, or 2 m to 3 m, or 3 m to 5 m, or less than or equal to 5 m and greater than or equal to 0.5 m and less than, equal to, or greater than 1 m, 1.1, 1.2, 1.3, 1.4, 1.5, 1.6, 1.7, 1.8, 1.9, 2, 2.1, 2.2, 2.3, 2.4, 2.5, 2.6, 2.8, 3, 3.2, 3.4, 3.5, 3.6, 3.8, 4, or 4.5 m. Prior to the contacting of the first feedstock and the second feedstock, the bed of the one or more minerals can be substantially free of liquid water. Prior to contacting the first feedstock and the second feedstock, liquid water can be liquid water can be 0 wt % to 30 wt % of the bed of the one or more minerals (e.g., absorbed water), or 0 wt % to 15 wt %, or 0 wt % to 10 wt %, or 0 wt % to 5 wt %, or 0 wt % to 1 wt %, or 0 wt % to 0.5 wt % of the bed of the one or more minerals, or less than or equal to 30 wt % and greater than or equal to 0 wt % and less than, equal to, or greater than 0.01 wt %, 0.05, 0.1, 0.2, 0.3, 0.4, 0.5, 0.6, 0.8, 1, 1.5, 2, 2.5, 3, 3.5, 4, 4.5, 5, 6, 7, 8, 9, 10, 11, 12, 13, 14, 15, 16, 18, 20, 22, 24, 26, 28, or 29 wt %. After the first feedstock and the second feedstock are contacted, additional water can condense from the first feedstock onto the bed of the one or more minerals. During the contacting of the first feedstock and the second feedstock the bed of one or more minerals can be substantially free of liquid water other than any water that condenses on the one or more minerals from humidity present in the first feedstock. After condensation has occurred, the bed of the one or more minerals may be moist but is still a substantially dry bed and at no point becomes immersed in water or a slurry of the one or more minerals.

If reduction of condensation is desired, the method can include using a temporarily high flow rate of the first feedstock past the one or more minerals to evaporate residual water from the bed of the one or more minerals. The method can include halting the humidification of the first feedstock to provide the same de-condensation effect without increasing the flowrate of the first feedstock. The method can include altering the cross-sectional contact area for the first feedstock in the humidification unit to impact the wetted surface area, velocity through the humidification section, and time in the humidification section. The method can include altering the temperature of the water or air to impact the humidification of the first feedstock.

The method can include introducing the first feedstock to a portion of the reactor that is at or proximate to one end of the reactor and removing the second output from a portion of the reactor that is at or proximate to an opposite end of the reactor, such that the first feedstock flows through the second feedstock. The first feedstock can have any suitable average superficial space velocity through the reactor such that a desired amount of carbon dioxide removal from the first feedstock is achieved. The first feedstock can have an average superficial space velocity through the reactor of 0.001 m/s to 10 m/s, or 2 m/s to 10 m/s, or 1 m/s to 2 m/s, or 0.2 m/s to 1 m/s, or 0.1 m/s to 0.2 m/s, or 0.001 m/s to 0.01 m/s, or 0.01 m/s to 0.1 m/s, or less than or equal to 10 m/s and greater than or equal to 0.001 m/s and less than, equal to, or greater than 0.005, 0.001, 0.01, 0.05, 0.1, 0.5, 1, 1.5, 2, 2.5, 3, 3.5, 4, 4.5, 5, 6, 7, 8, or 9 m/s. The pressure of the first feedstock and the second output within the reactor can be approximately equal to atmospheric pressure, with a slight pressure differential to allow the first feedstock to flow through the one or more minerals. The pressure differential can be applied by a fan or blower that blows the first feedstock into the reactor, a fan or blower that blows or sucks the second output out of the reactor, or a combination thereof. The contacting of the first feedstock and the second feedstock in the reactor can be conducted at a temperature of −15° C. to 60° C., or 15° C. to 30° C., or less than or equal to 60° C. and greater than or equal to −15° C. and less than, equal to, or greater than −14° C., −12, −10, −8, −6, −4, −2, 0, 2, 4, 6, 8, 10, 12, 14, 16, 18, 20, 22, 24, 26, 28, 30, 32, 34, 36, 38, 40, 45, 50, or 55° C. The contacting of the first feedstock and the second feedstock can be conducted at about ambient temperature.

The first feedstock can be flowed through the second feedstock continuously. The method can include refreshing the second feedstock after contacting the second feedstock with the continuously flowing first feedstock for at least 1 day and less than or equal to 180 days, or for at least 60 days and less than or equal to 90 days, or for 30 to 60 days, or for 15 to 30 days, or for 1 day to 15 days, or for 90 to 120 days, or for 120 days to 180 days, or for greater than or equal to 1 day and for less than or equal to 180 days and less than, equal to, or greater than 2 days, 4, 6, 8, 10, 12, 14, 15, 16, 18, 20, 22, 24, 26, 28, 30, 32, 34, 36, 38, 40, 42, 44, 46, 48, 50, 52, 54, 56, 58, 60, 65, 70, 75, 80, 85, 90, 95, 100, 105, 110, 115, 120, 125, 130, 135, 140, 145, 150, 155, 160, 165, 170, or 175 days.

The reaction between the carbon dioxide in the first feedstock and the second feedstock can be more effective when the first feedstock has a relative humidity of 50% or more. The first feedstock can have a relative humidity of 50% to 100%, or greater than or equal to 70% to less than 100%, or greater than or equal to 90% to less than 100%, or 85% to 90%, or 80% to 85%, or 70% to 80%, or less than or equal to 100% and greater than or equal to 50% and less than, equal to, or greater than 51%, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9, or 99.99%.

The method can further include adjusting relative humidity of a first feedstock precursor to form the first feedstock. Adjusting the relative humidity of the first feedstock precursor to form the first feedstock can include raising the relative humidity of the first feedstock. The first feedstock precursor can include an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof. The first feedstock precursor can be atmospheric air. The first feedstock precursor can have a relative humidity of 0% to 99%, or 0% to 90%, or less than or equal to 99% and greater than or equal to 0% and less than, equal to, or greater than 2%, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, or 98%.

Adjusting the relative humidity of the first feedstock precursor can include passing the first feedstock precursor through a humidifying apparatus. The first feedstock precursor can be passed through the humidifying apparatus horizontally or vertically. The humidifying apparatus can include relative humidity of the first feedstock precursor. The humidifying apparatus can include a humidifying packed column that increases relative humidity of the first feedstock precursor. The humidifying packed column can be oriented with the longitudinal direction of the packed column aligned with a horizontal or vertical direction. The method can include flowing the first feedstock precursor through the humidifying packed column while flowing water through packing of the column. The humidifying apparatus can include a knockout portion that extracts excess moisture from the first feedstock precursor after treatment with moistened packing of the humidifying packed column. The humidifying apparatus can include structured packing with water flowing in either a crossflow or counterflow arrangement with respect to the flow of the first feedstock.

The method can remove any suitable amount of carbon dioxide from the first feedstock. The second output can have a carbon dioxide concentration, on average, that is 0% to 99% of the carbon dioxide concentration of the first feedstock, or 0% to 50%, or 0% to 20% of the carbon dioxide concentration of the first feedstock, or less than or equal to 99% and greater than or equal to 0% and less than, equal to, or greater than 1%, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, 48, 50, 55, 60, 65, 70, 75, 80, 85, 90, or 95% of the carbon dioxide concentration of the first feedstock.

The method can include measuring $CO_2$ concentration in the first feedstock and/or the second output, which can allow quantification of $CO_2$ removal. The method can include measuring $CO_2$ in the pre-reacted one or more minerals and the reacted one or more minerals, which can allow quantification of $CO_2$ removal. The method can include measuring temperature, relative humidity, $CO_2$ concentration, or a combination thereof, of the first feedstock and/or the second output and using these measurements to adjust the velocity of the first feedstock through the second feedstock (e.g., adjust fan speed), adjust the pump speed of the water pump recirculating water in the humidification apparatus, adjust the water distribution in the humidification apparatus, adjust the air distribution in the humidification apparatus, or a combination thereof, in order to increase or optimize $CO_2$ removal.

FIG. 1 is a flowchart of an example process that can be used for direct air carbon dioxide capture and sequestration. At 102, a first feedstock is introduced into a reactor, the first feedstock includes carbon dioxide. Such a feedstock can be drawn from ambient air, an exhaust of an industrial process, or any other gas mixture that includes carbon dioxide. At 104, the first feedstock is contacted with a second feedstock within the reactor. The second feedstock includes one or more minerals arranged such that at least a portion of the carbon reacts with the one or more minerals to produce first and second products or outputs. The first output includes one or more carbonate minerals formed from the initial one or more minerals. The second output is a gaseous output that includes a lower concentration of carbon dioxide than a concentration of carbon dioxide in the first feedstock. For example, in instances where ambient air is the first feedstock, the output can include air with a lower amount of concentration of carbon dioxide than air that entered the reactor. In some instances, the carbon dioxide can be completely removed.

In various aspects, brucite can be the primary mineral used for carbon dioxide removal. The brucite can be processed and conditioned prior to entering a reactor to contact with the first feedstock. FIG. 2 illustrates a method 200 to condition, refine, and/or otherwise prepare the brucite or brucite-bearing ore for insertion into a reactor. At 202, the brucite is first extracted from a quarry or other mining operation. In some instances, the brucite or brucite-bearing ore is extracted as a secondary mining product. That is, brucite is not the intended material being mined or quarried but is inherently produced as a result of mining other material.

Once the brucite is mined, at 204, the brucite is crushed and ground into a powder. The mining, crushing, and grinding can occur at the quarry or mining facility, or these steps can be performed at separate facilities or sites.

In various aspects, at 206, the powdered brucite can be formed into structured powder bodies. Once the structured powder bodies are produced, at 208, they can be added to a reactor to perform the carbon capture and sequestration process. After the structured powder bodies have sufficiently reacted with the first feedstock, at 210, the structured powder bodies can be stored or buried in accordance with industry storage standards.

Apparatus for Sequestering Carbon Dioxide.

Various aspects of the present disclosure provide an apparatus for sequestering carbon dioxide. The apparatus can be any suitable apparatus that can perform the method of the present disclosure. The apparatus can include a reactor including a reactor cavity configured to house structured material bodies including one or more minerals. The reactor can include a gas inlet extending through a wall of the reactor and into the reactor cavity. The reactor can include a gas outlet extending through the wall of the reactor and into the reactor cavity, the gas outlet configured to release a product gas from the reactor. The reactor can be configured such that a gas source including carbon dioxide provided to the reactant gas inlet passes through the reactor cavity such that at least some of the carbon dioxide reacts with the structured powder bodies to form used structured powder bodies that are the structured powder bodies after reaction with the carbon dioxide to form one or more magnesium carbonates and forms the product gas having a lower concentration of carbon dioxide than the gas source.

The structured powder bodies can be any suitable type of structured powder bodies described herein for use with the method or apparatus of the present disclosure.

The reaction between the carbon dioxide in the gas source and the structured powder bodies can be more effective when the gas source has a relative humidity of 50% or more. The gas source can have a relative humidity of 50% to 100%, or greater than or equal to 70% to less than 100%, or greater than or equal to 90% to less than 100%, or 85% to 90%, or 80% to 85%, or 70% to 80%, or less than or equal to 100% and greater than or equal to 50% and less than, equal to, or greater than 51%, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9, or 99.99%.

The gas source can have any suitable carbon dioxide content. The gas source can have a carbon dioxide concentration of 0.01 vol % to 100 vol %, 0.03 vol % to 0.1 vol %, or 0.01 vol % to 3 vol %, or 0.01 vol % to 5 vol %, or 0.01 wt % to 15 vol %, or 0.01 vol % to 40 vol %, or 0.01 vol % to 95 vol %, or less than or equal to 100 vol % and greater than or equal to 0.01 vol % and less than, equal to, or greater than 0.02, 0.03, 0.04, 0.05, 0.06, 0.07, 0.08, 0.09, 0.1, 0.12, 0.14, 0.16, 0.18, 0.2, 0.3, 0.4, 0.5, 0.6, 0.8, 1, 1.5, 2, 2.5, 3, 3.5, 4, 4.5, 5, 6, 7, 8, 9, 10, 12, 14, 16, 18, 20, 25, 30, 35, 40, 45, 50, 55, 60, 65, 70, 75, 80, 85, 90, or 95%. The gas source can have a carbon dioxide content that is ambient atmospheric carbon dioxide concentration, or below ambient atmospheric carbon dioxide concentration, or above ambient atmospheric carbon dioxide concentration. The gas source can be or include an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof. The gas source can be ambient atmospheric air.

The reactor can be configured such that the gas source is flowed through the reactor cavity with an average superficial space velocity through of 0.001 m/s to 10 m/s, or 2 m/s to 10 m/s, or 1 m/s to 2 m/s, or 0.2 m/s to 1 m/s, or 0.1 m/s to 0.2 m/s, or 0.001 m/s to 0.01 m/s, or 0.01 m/s to 0.1 m/s, or less than or equal to 10 m/s and greater than or equal to 0.001 m/s and less than, equal to, or greater than 0.005, 0.001, 0.01, 0.05, 0.1, 0.5, 1, 1.5, 2, 2.5, 3, 3.5, 4, 4.5, 5, 6, 7, 8, or 9 m/s.

The reactor can be configured to house a bed of the structured powder bodies having a depth of 0.5 m to 5 m, or 1 m to 1.5 m, or 0.5 m to 1 m, or 1.5 m to 2 m, or 2 m to 3 m, or 3 m to 5 m, or less than or equal to 5 m and greater than or equal to 0.5 m and less than, equal to, or greater than 1 m, 1.1, 1.2, 1.3, 1.4, 1.5, 1.6, 1.7, 1.8, 1.9, 2, 2.1, 2.2, 2.3, 2.4, 2.5, 2.6, 2.8, 3, 3.2, 3.4, 3.5, 3.6, 3.8, 4, or 4.5 m. Prior to the contacting of the gas source and the structured powder bodies, the bed of the structured powder bodies can be substantially free of liquid water. Prior to contacting the gas source and the structured powder bodies, liquid water (e.g., absorbed water) can be 0 wt % to 30 wt % of the bed of the structured powder bodies, or 0 wt % to 15 wt %, or 0 wt % to 10 wt %, or 0 wt % to 5 wt %, or 0 wt % to 1 wt %, or 0 wt % to 0.5 wt % of the bed of the structured powder bodies, or less than or equal to 30 wt % and greater than or equal to 0 wt % and less than, equal to, or greater than 0.01 wt %, 0.05, 0.1, 0.2, 0.3, 0.4, 0.5, 0.6, 0.8, 1, 1.5, 2, 2.5, 3, 3.5, 4, 4.5, 5, 6, 7, 8, 9, 10, 11, 12, 13, 14, 15, 16, 18, 20, 22, 24, 26, 28, or 29 wt %. After the gas source and the structured powder bodies are contacted, additional water can condense from the gas source onto the bed of the structured powder bodies. During the contacting of the gas source and the structured powder bodies the bed of structured powder bodies can be substantially free of liquid water other than any additional water that condenses on the structured powder bodies from humidity present in the gas source.

The reactor can be configured to contact the gas source with the structured powder bodies at a pressure approximately equal to atmospheric pressure, with a slight pressure differential to allow the gas source to flow through the structured powder bodies. The apparatus can include a fan or blower that is configured to blow the gas source into the reactor, a fan or blower that is configured to blow or suck the product gas out of the reactor, or a combination thereof, to provide the pressure differential. The apparatus can be configured to contact of the gas source and the structured powder bodies in the reactor at a temperature of −15° C. to 60° C., or 15° C. to 30° C., or less than or equal to 60° C. and greater than or equal to −15° C. and less than, equal to, or greater than −14° C., −12, −10, −8, −6, −4, −2, 0, 2, 4, 6, 8, 10, 12, 14, 16, 18, 20, 22, 24, 26, 28, 30, 32, 34, 36, 38, 40, 45, 50, or 55° C. The apparatus can be configured to contact the gas source and the structured powder bodies at about ambient temperature.

The apparatus can be configured to introduce the gas source to a portion of the reactor that is at or proximate to one end of the reactor to remove the product gas from a portion of the reactor that is at or proximate to an opposite end of the reactor, such that the gas source flows through the structured powder bodies in the reactor cavity. The gas inlet can be located in a portion of the reactor that is at or proximate to one end of the reactor, and the gas outlet can be located in a portion of the reactor that is at or proximate to an opposite end of the reactor.

The reactor cavity can include a removable cassette that is configured to house the structured powder bodies in the reactor cavity. The gas inlet can be located at a portion of the reactor at one end of the reactor, and the gas outlet can be located at a portion of the reactor that is at an opposite end of the reactor, such that the apparatus is configured for the gas source to pass through the cassette and the structured powder bodies therein toward the gas outlet. The reactor can be configured such that the cassette forms a substantially airtight seal with an interior of the wall of the reactor such that gas entering from the gas inlet is substantially prevented from bypassing the reactor cavity as it flows through the cassette and toward the gas outlet. The reactor and the removable cassette can be configured such that the removable cassette can be slid into and out of the reactor. The cassette can include at least one side that is porous and that has openings that are smaller than a mean diameter or mean largest dimension size of the structured power bodies, such as a screen or mesh having openings that are smaller than a mean diameter or mean largest dimension size of the structured powder bodies. In a reactor configuration wherein the gas source is configured to flow vertically through the cassette, the cassette can include at least a bottom surface that is porous such as including a screen or mesh having openings that are smaller than a mean diameter or mean largest dimension size of the structured powder bodies, to prevent the structured powder bodies from falling out of the cassette; optionally, such a cassette can also include a top surface that is porous such as including a screen or mesh having openings that are smaller than a mean diameter or mean largest dimension size of the structured powder bodies. In a reactor configuration wherein the gas source is configured to flow horizontally through the cassette, the cassette can include two opposite sides that are porous such as including a screen or mesh having openings that are smaller than a mean diameter or mean largest dimension size of the structured powder bodies, wherein the opposite sides are perpendicular to the direction of the flow of the gas source through the cartridge, to allow the gas source to flow through the porous opposite sides and to prevent the structured powder bodies from falling out of the cartridge.

The apparatus can be configured to measure $CO_2$ concentration in the first feedstock and/or the second output, which can allow quantification of $CO_2$ removal. The apparatus can be configured to measure $CO_2$ in the pre-reacted one or more minerals and the reacted one or more minerals, which can allow quantification of $CO_2$ removal. The apparatus can be configured to measure temperature, relative humidity, $CO_2$ concentration, or a combination thereof, of the first feedstock and/or the second output and using these measurements to adjust the velocity of the first feedstock through the second feedstock (e.g., adjust fan speed), adjust the pump speed of the water pump recirculating water in the humidification apparatus, adjust the water distribution in the humidification apparatus, adjust the air distribution in the humidification apparatus, or a combination thereof, in order to increase or optimize $CO_2$ removal.

FIG. 3 illustrates a test reactor apparatus 300*a*. The test reactor apparatus 300*a* has been used to verify parameters relating the carbon dioxide sequestration method described herein. A test gas canister 302 is fluidically coupled by a conduit arranged to direct test gas from the test gas canister 302 to a humidifying packed column 304. The test gas in the illustrated example includes substantially 10% $CO_2$ (within standard manufacturing tolerances). The test gas can include any percentage of $CO_2$ depending upon the desired test conditions. In some instances, the test gas is substantially dry (less than a target humidity). The humidifying packed column 304 is used to adjust the relative humidity of the test gas prior to entering the packed column reactor 306*a*. The humidifying packed column 304 includes a vertical column 308 with a recirculation line 310 circulating water, by a recirculation pump 312, from a lower end of the vertical column 308 to an upper end of the vertical column 308. The water sprays within the column 308 from the upper end, and the water then sinks, due to gravity, to the lower end of the column 308 before being recirculated by the recirculation pump 312. In some aspects, the column 304 can include packing 314, such as plastic Raschig rings. The packing 314 increases the surface area of water contacted by the test gas as the test gas passes through the column 304. The column 308 defines a gas inlet 316 nearer a bottom of the column than the top of the column 308. The gas column 308 also defines a gas outlet 318 nearer a top of the column 308 than the bottom of the column 308. After leaving the humidifying packed column 304, the test gas includes humidity (moisture) and is directed to a knockout drum 320. The knockout drum receives the humid test gas and removes any excess moisture that may have caused the test gas to be saturated (100% humidity). The humid, unsaturated test gas is then directed to the packed column reactor 306*a* that defines a test gas inlet on a lower end of the packed column reactor 306*a*. The packed column reactor 306*a* is filed with structured powder bodies 322. The packed column reactor 306*a* defines a gas inlet at a lower end of the packed column reactor 306*a* and defines a vent at an upper end of the packed column reactor 306*a*. The test gas passes from the lower inlet, through the packed column filled with structured powder bodies, and exits the reactor through the upper vent 324.

Throughout the apparatus 300*a*, various sensors 326 are arranged throughout to measure relative humidity, temperature, and $CO_2$ content. Such sensors 326 can be used for closed loop control, for example, to adjust the relative humidity of the test gas to a target relative humidity. In such implementations, the sensors 326 are coupled to a controller 328. The sensors send a signal indicative of a relative humidity to the controller. In instances where the relative humidity is outside of a desired range, the controller receives a signal indicative of the relative humidity, then determines that the relative humidity is outside of the desired range based on the received signal. The controller then sends a signal to the recirculation motor. The signal causes the recirculate pump to adjust a flow rate of the recirculation line.

Alternatively or in addition, the sensors 326 are used to determine an absorption rate or other property of the packed column reactor 306*a*. To gather such data, sensors 326 are positioned at set vertical distances along a length of the packed column reactor 306*a*. The controller 328 is then used to store data characterizing sensor data over time. Such data can be verified by opening the packed column reactor 306*a* and removing the resulting products for analysis.

Structured Powder Bodies for Removing Carbon Dioxide, for Use in the Method and/or Apparatus.

Various aspects of the method or apparatus can employ a plurality of structured powder bodies used for carbon dioxide capture. The structured powder bodies include an agglomerated powder. Magnesium hydroxide can be 5 wt % to 90 wt % of the powder. Particles of the powder can have a mean diameter of 1 micron to 40 microns. The structured powder bodies can have a mean largest dimension size of 1 mm to 250 mm. The structured powder bodies can have an internal porosity of 10 vol % to 50 vol %.

The powder can be 80 wt % to 100 wt % of the structured powder bodies, or 95 wt % to 100 wt % of the structured powder bodies, or less than or equal to 100 wt % and greater than or equal to 80 wt % and less than, equal to, or greater than 81 wt %, 82, 83, 84, 85, 86, 87, 88, 89, 90, 91, 92, 93, 94, 95, 96, 97, 98, 99, 99.5, 99.9, or 99.99 wt %. The powder can form substantially all of the structured powder bodies. The structured powder bodies can include particles of the powder directly fused to one another, the particles of the powder fused to one another via a connective matrix that extends between the particles and that has the same composition as the powder particles, or a combination thereof.

Added binders can have 0 wt % to 10 wt % of the structured powder bodies, or 0 wt % to 3 wt %, or 0 wt % to 1 wt %, or less than or equal to 10 wt % and greater than or equal to 0 wt % and less than, equal to, or greater than 0.01 wt %, 0.05, 0.1, 0.2, 0.4, 0.6, 0.8, 1, 1.5, 2, 2.5, 3, 3.5, 4, 5, 6, 7, 8, or 9 wt % of the structured powder bodies. The structured powder bodies can be substantially free of added binders.

The structured powder bodies can have a moisture content of 0 wt % to 30 wt %, or 0 wt % to 15 wt %, or 0 wt % to 10 wt %, or 0 wt % to 3 wt %, or 0 wt % to 1 wt %, or less than or equal to 30 wt % and greater than or equal to 0 wt % and less than, equal to, or greater than 0.01 wt %, 0.05, 0.1, 0.2, 0.4, 0.6, 0.8, 1, 1.5, 2, 2.5, 3, 3.5, 4, 5, 6, 7, 8, 9, 10, 11, 12, 13, 14, 15, 16, 18, 20, 22, 24, 26, 28, or 29 wt %. The structured powder bodies can be substantially free of water.

The powder can include any suitable one or more minerals. The one or more minerals can include $Mg(OH)_2$, $CaSiO_3$, $Mg_3Si_2O_5(OH)_4$, $Mg_{10}Fe_2(CO_3)(OH)_{24}{\cdot}2H_2O$, $Mg_6Fe_3(OH)_{16}(CO_3)(H_2O)_4$, $Ca(OH)_2$, $Fe(OH)_2$, $Mn(OH)_2$, $Sr(OH)_2$, $Ba(OH)_2$, CaO, MgO, SrO, BaO, $Ca_2SiO_4$, $Ca_3SiO_5$, $Ca_3Si_2O_7$, $Ca_7MgSi_4O_{16}$, $Ca_3MgSi_2O_8$, $Ca_2MgSi_2O_7$, $CaMgSi_2O_6$, $CaFeSiO_4$, $Mg_2SiO_4$, $MgSiO_3$, $Ca_2Fe_2O_5$, $Ca_3Al_2O_6$, $Ca_{12}Al_{14}O_{33}$, $CaAl_4O_7$, $CaAl_{12}O_{19}$, $MgFe_2O_4$, $Ca_2Al_2SiO_7$, or a combination thereof. The one or more minerals can include $Mg(OH)_2$, $CaSiO_3$, $Mg_3Si_2O_5(OH)_4$, or a combination thereof. The one or more minerals can include brucite. The one or more minerals can be 1 wt % to 100 wt % of the powder, or 5 wt % to 100 wt % of the powder, or 10 wt % to 100 wt % of the powder, or 15 wt % to 100 wt % of the powder, or less than or equal to 100 wt % and greater than or equal to 1 wt % and less than, equal to, or greater than 2 wt %, 4, 6, 8, 10, 12, 14, 15, 16, 18, 20, 25, 30, 35, 40, 45, 50, 55, 60, 65, 70, 75, 80, 82, 84, 85, 86, 88, 90, 91, 92, 93, 94, 95, 96, 97, 98, 99, 99.9, or 99.99 wt % of the powder.

Magnesium hydroxide can be 1 wt % to 90 wt % of the powder, or 5 wt % to 90 wt % of the powder, or 15 wt % to 70 wt % of the powder, or 1 wt % to 20 wt % of the powder, or 5 wt % to 15 wt % of the powder, or less than or equal to 90 wt % and greater than or equal to 1 wt % and less than, equal to, or greater than 2 wt %, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, or 85 wt % of the powder. The one or more minerals can include the magnesium hydroxide. The one or more minerals can supply 100 wt % of the magnesium hydroxide in the powder. The one or more minerals can include brucite, which is a mineral (i.e., a naturally occurring inorganic solid) having the chemical formula $Mg(OH)_2$. Brucite can be 1 wt % to 100 wt % of the powder, or 1 wt % to 90 wt % of the powder, or 5 wt % to 90 wt % of the powder, or 15 wt % to 70 wt % of the powder, or 1 wt % to 20 wt % of the powder, or 5 wt % to 15 wt % of the powder, or less than or equal to 100 wt % and greater than or equal to 1 wt % and less than, equal to, or greater than 2 wt %, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 92, 94, 96, 98, 99, 99.9, or 99.99 wt % of the powder. Brucite can be about 100 wt % of the powder.

The particles of the powder can have a mean diameter of 1 micron to 40 microns, or 1 micron to 10 microns, or 4 microns to 6 microns, or less than or equal to 40 microns and greater than or equal to 1 micron and less than, equal to, or greater than 1.5 microns, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 24, 26, 28, 30, 32, 34, 36, or 38 microns. The particles of the powder can have a $d_{80}$ diameter of 0.1 micron to 100 microns, or 1 micron to 20 microns, or 1 microns to 10 microns, or 1 micron to 5 microns, or 5 microns to 10 microns, or less than or equal to 100 microns and greater than or equal to 0.1 microns and less than, equal to, or greater than 0.5 microns, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 24, 26, 28, 30, 32, 34, 36, 38, 40, 42, 44, 46, 48, 50, 55, 60, 65, 70, 75, 80, 85, 90, or 95 microns. The particles of the powder can have a $d_{99}$ diameter of 1 micron to 200 microns, or 5 micron to 20 microns, or less than or equal to 200 microns and greater than or equal to 5 microns and less than, equal to, or greater than 2 microns, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 100, 110, 120, 130, 140, 150, 160, 170, 180, or 190 microns. The particles of the powder can have a Sauter mean diameter (D[3,2]) of 0.5 micron to 10 microns, or 2 microns to 4 microns, or 2.5 microns to 3.5 microns, or less than or equal to 10 microns and greater than or equal to 0.5 microns and less than, equal to, or greater than 1 microns, 1.5, 2, 2.2, 2.4, 2.6, 2.8, 3, 3.2, 3.4, 3.6, 3.8, 4, 4.5, 5, 5.5, 6, 6.5, 7, 7.5, 8, 8.5, 9, or 9.5 microns. The particles of the powder can have a De Brouckere mean diameter (D[4,3]) of 0.5 micron to 10 microns, or 2 microns to 5 microns, or 3 microns to 4.5 microns, or less than or equal to 10 microns and greater than or equal to 0.5 microns and less than, equal to, or greater than 1 microns, 1.5, 2, 2.2, 2.4, 2.6, 2.8, 3, 3.2, 3.4, 3.6, 3.8, 4, 4.2, 4.4, 4.6, 4.8, 5, 5, 5.5, 6, 6.5, 7, 7.5, 8, 8.5, 9, or 9.5 microns. The particles of the powder can have a surface area of $1\times10^3$ $m^2/m^3$ to $1\times10^8$ $m^2/m^3$, or $0.5\times10^6$ $m^2/m^3$ to $5\times10^6$ $m^2/m^3$, or less than or equal to $1\times10^8$ $m^2/m^3$ and greater than or equal to $1\times10^3$ $m^2/m^3$ and less than, equal to, or greater than $2\times10^3$ $m^2/m^3$, $3\times10^3$, $4\times10^3$, $5\times10^3$, $6\times10^3$, $7\times10^3$, $8\times10^3$, $9\times10^3$, $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, or $9\times10^7$ $m^2/m^3$. The mean diameter, dao diameter, $d_{99}$ diameter, Sauter mean diameter, and De Brouckere mean diameter can be determined from the particle size distribution which can be measured using laser diffraction. The surface area can be determined from the volumetric particle size distribution which can be measured using laser diffraction. The surface area can be determined for each diameter of particle and the summation over the sample can provide the total surface area per volume.

The structured powder bodies can be formed of an agglomerated powder. The agglomerated powder can be agglomerated in any suitable way, such as via compression, pelletization, or another method. The structured powder bodies can have a mean largest dimension size of 1 mm to 250 mm, or 1 mm to 200 mm, or 1 mm to 150 mm, or 1 mm to 100 mm, or 1 mm to 50 mm, or 1 mm to 30 mm, or 2 mm to 4 mm, or 6 mm to 8 mm, or 1 mm to 2 mm, or 8 mm to 12 mm, or 4 mm to 6 mm, or less than or equal to 250 mm and greater than or equal to 1 mm and less than, equal to, or greater than 1.5 mm, 2, 2.5, 3, 3.5, 4, 4.5, 5, 5.5, 6, 6.5, 7, 7.5, 8, 8.5, 9, 9.5, 10, 10.5, 11, 11.5, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 110, 120, 130, 140, 150, 160, 170, 180, 190, 200, 210, 220, 230, or 240 mm.

Each structured powder body can have any suitable three-dimensional shape. The structured powder bodies can have the same three-dimensional shape or a combination of two or more different three-dimensional shape. The structured powder body can have an equivalent length in all dimensions, an equivalent length in two dimensions, or no equivalent length dimensions. The structured powder body can have a three-dimensional shape that is ellipsoidal, spheroidal, spherical, planar, or a combination thereof. The structured powder body can have a three-dimensional shape that is a sphere, cylinder, cube, tetrahedron, octahedron, icosahedron, dodecahedron, ellipse, cuboid, tube, torus, sheet, a three-dimensional projection of a two-dimensional shape, or a combination thereof.

The structured powder bodies can be pellets. A structured powder body that is a pellet can be a pelletized powder.

The pellets can have a shape that is spherical, spheroidal, ellipsoidal, or a combination thereof. The pellets can have a spherical shape.

The pellets can have a mean diameter of 1 mm to 30 mm, or 2 mm to 4 mm, or 6 mm to 8 mm, or 1 mm to 2 mm, or 8 mm to 12 mm, or 4 mm to 6 mm, or less than or equal to 30 mm and greater than or equal to 1 mm and less than, equal to, or greater than 1.5 mm, 2, 2.5, 3, 3.5, 4, 4.5, 5, 5.5, 6, 6.5, 7, 7.5, 8, 8.5, 9, 9.5, 10, 10.5, 11, 11.5, 12, 13, 14, 15, 16, 17, 18, 19, 20, 21, 22, 23, 24, 25, 26, 27, 28, or 29 mm.

The structured powder bodies can include pores. The pores can be homogeneously distributed throughout the structured powder bodies. The structured powder bodies can have an internal porosity (i.e., void space) of 5 vol % to 50 vol %, or 10 vol % to 50 vol %, or 20 vol % to 40 vol %, or 30 vol % to 35 vol %, or less than or equal to 50 vol % and greater than or equal to 10 vol % and less than, equal to, or greater than 6 vol %, 8, 10, 12, 14, 15, 16, 18, 20, 22, 24, 25, 26, 27, 28, 29, 30, 31, 32, 33, 34, 35, 36, 37, 38, 39, 40, 42, 44, 46, or 48 vol %. The pores can be open pores, wherein open pores are interconnected and fluidly connect to the surface of the structured powder bodies. For example 50 vol % to 100 vol % of the pores can be open pores instead of closed pores, or 80 vol % to 100 vol %, or 90 vol % to 100 vol %, or 95 vol % to 100 vol %, or less than or equal to 100 vol % and greater than or equal to 50 vol % and less than, equal to, or greater than 52 vol %, 54, 56, 58, 60, 62, 64, 66, 68, 70, 72, 74, 76, 78, 80, 82, 84, 86, 88, 90, 91, 92, 93, 94, 95, 96, 97, 98, 99, 99.5, 99.9, or 99.99 vol %.

The structured powder bodies can have any suitable compressive strength. The structured powder bodies can have a compressive strength of 1 kPa to 500 kPa, or 10 kPa to 400 kPa, or 30 kPa to 300 kPa, or 50 kPa to 200 kPa, or less than or equal to 500 kPa and greater than or equal to 1 kPa and less than, equal to, or greater than 2 kPa, 4, 6, 8, 10, 12, 14, 16, 18, 20, 22, 24, 26, 28, 30, 32, 34, 36, 38, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 320, 340, 360, 380, 400, 420, 440, 460, or 480 kPa.

In various aspects, the structured powder bodies can be pellets that include a pelletized powder. The powder can include brucite, and magnesium hydroxide can be 5 wt % to 90 wt % of the powder. Particles of the powder can have a mean diameter of 1 micron to 40 microns. The pellets can have a spherical shape, a mean diameter of 1 mm to 30 mm, and an internal porosity of 10 vol % to 50 vol %. The pellets can be substantially free of added binders.

In various aspects, the structured powder bodies can be pellets that include a pelletized powder that is 90-100 wt % of the pellets. The powder can include brucite and magnesium hydroxide can be 5 wt % to 90 wt % of the powder. Particles of the powder can have a do diameter of 5 microns to 10 microns, and the particles can have a mean diameter of 1 micron to 10 microns. The pellets can have a spherical shape, a mean diameter of 1 mm to 10 mm, pores homogeneously distributed throughout, an internal porosity of 10 vol % to 50 vol %, and a compressive strength of 50 kPa to 500 kPa. The pellets can be substantially free of added binders.

EXAMPLES

Various aspects of the present invention can be better understood by reference to the following Examples which are offered by way of illustration. The present invention is not limited to the Examples given herein.

Throughout the Examples, all references to a ton indicate a metric ton.

The mean particle diameter, the $d_{80}$ particle diameter, doo particle diameter, Sauter mean diameter of the particles, and De Brouckere mean diameter of the particles were determined from the particle size distribution (PSD) which was measured using a Malvern Analytical Mastersizer 3000, which uses laser diffraction to measure particle size and size distribution. From the full PSD the $d_{80}$ and $d_{90}$ were directly obtained, and the Malvern Analytical Mastersizer computed the Sauter (representing the diameter of a sphere that has the same volume-to-surface area ratio as the measured particle sample) and De Brouckere (volume-weighted mean) mean diameters from the full PSD. The surface area was determined from the volumetric particle size distribution which was measured using laser diffraction.

Mean diameter of the pellets was determined by way of sieve screening.

Internal porosity was measured via two methods. In the first method, true density and tapped bulk density were measured, with the porosity of the pellet bed (i.e., ignoring pellet internal porosity) was assumed as a random tight packing. The internal porosity was then determined to match the measured bulk density. In the second method, thin sections of pellets were taken, and automated image analysis of the pore space were run using ImageJ (an open-source image processing program). These two methods converged to the same values.

Compressive strength of the pellets was measured using two methods. In the first method, pellets were poured into a large cylinder and subjected to an increasing weight while measuring displacement, wherein displacement indicated the fracture pressure. In the second method, single pellets were placed into a load cell and the force was increased until failure. These two methods converged to the same values.

Equipment Description for Examples 1-3

Figure 4:
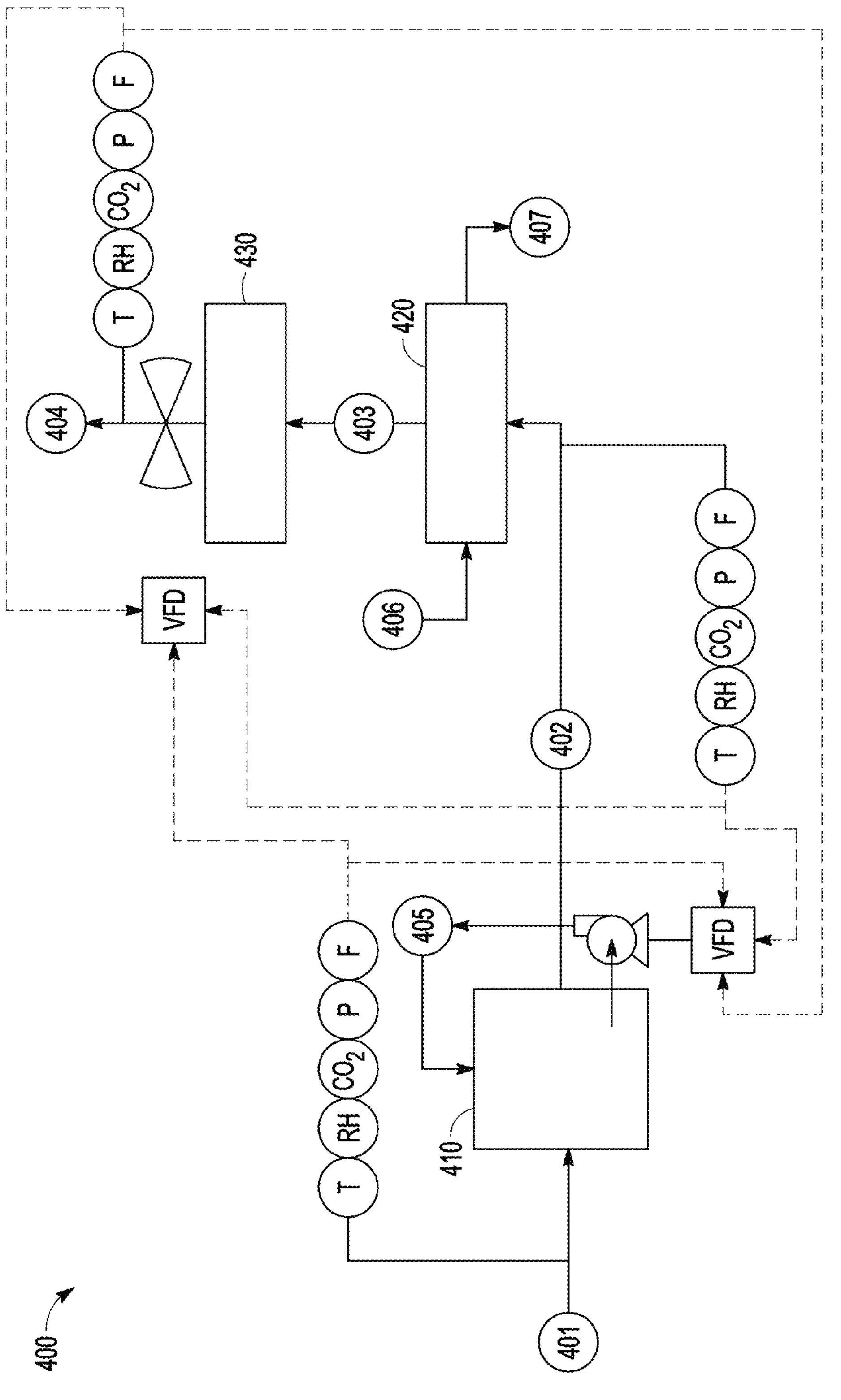
FIG. 4 illustrates an apparatus for removal of $CO_2$ from air, in accordance with various aspects of the present disclosure.

The apparatus used is shown as 400 in FIG. 4. Ambient air or other $CO_2$ containing gas 401 was passed through a structured packing with a crossflow or counterflow of water within pre-conditioning unit 410. Unless otherwise indicated, the water and air temperature were controlled between 9° C. and 28° C. Water 405 was gravity feed through the packing with a pump pulling water from a sump below the packing to a distribution header above the packing. The pump flowrate was controlled to meet the desired relative humidity (RH) of the air exiting pre-conditioning unit 410. A bypass valve (not shown) was able to be opened to allow a portion or all of the ambient air or other $CO_2$ containing gas 401 to bypass the structured packing.

High relative humidity air 402 was passed through a packed bed of structured powders held in cassette 420. In the direction of gas flow, the cassette was largely open to the gas stream but had a screen structure across the bottom of the cassette to hold the structured powders in place. Carbon dioxide in the gas stream chemically reacted with the structured powders, becoming an integral part of the solid mineral structure. Gas 403 exiting equipment cassette 420 was partially or wholly stripped of its $CO_2$ content. $CO_2$ sensors upstream and downstream of the structured powder cassette measured the change in $CO_2$ concentration. This information along with a measurement of gas flow meters determined the quantity of $CO_2$ removed from the gas stream. Structured powders remained in cassette 420 for an extended period of time and were removed based on measured $CO_2$ removal from the gas stream. Cassette 420 allowed for the rapid removal of reacted structured powders 407 and rapid introduction of unreacted structured powders 406.

Gas flow was achieved via one or more induced draft fans 430, though forced draft fans may also be used, which outputted final gas stream 404. Fan speed was used to control the air flow based on measurements of $CO_2$ concentration and RH throughout the process.

Relative humidity sensors are illustrated as "RH" within a circle. Temperature sensors are illustrated as "T" within a circle. Carbon dioxide concentration sensors are illustrated as "$CO_2$" within a circle. The sensors were present on lines 401, 402, 403, and 404. The sensor data was used to determine the rate of $CO_2$ removal and was also used to determine the rate at which the water pump should be run. The pressure data was used to ensure smooth flow was occurring both through the pellet bed and the humidification system. Flow rate data was used to control the fans and in calculating the mass balance for the system including $CO_2$ removal.

A single fan can feed a single or multiple structured powder cassettes. Likewise, a single gas-water contactor can feed a single or multiple structured powder cassettes. A structured powder cassette can be fed by a single or multiple gas-water contactors and a single or multiple fans.

Example 1. Spherical Pellets

Figure 5:
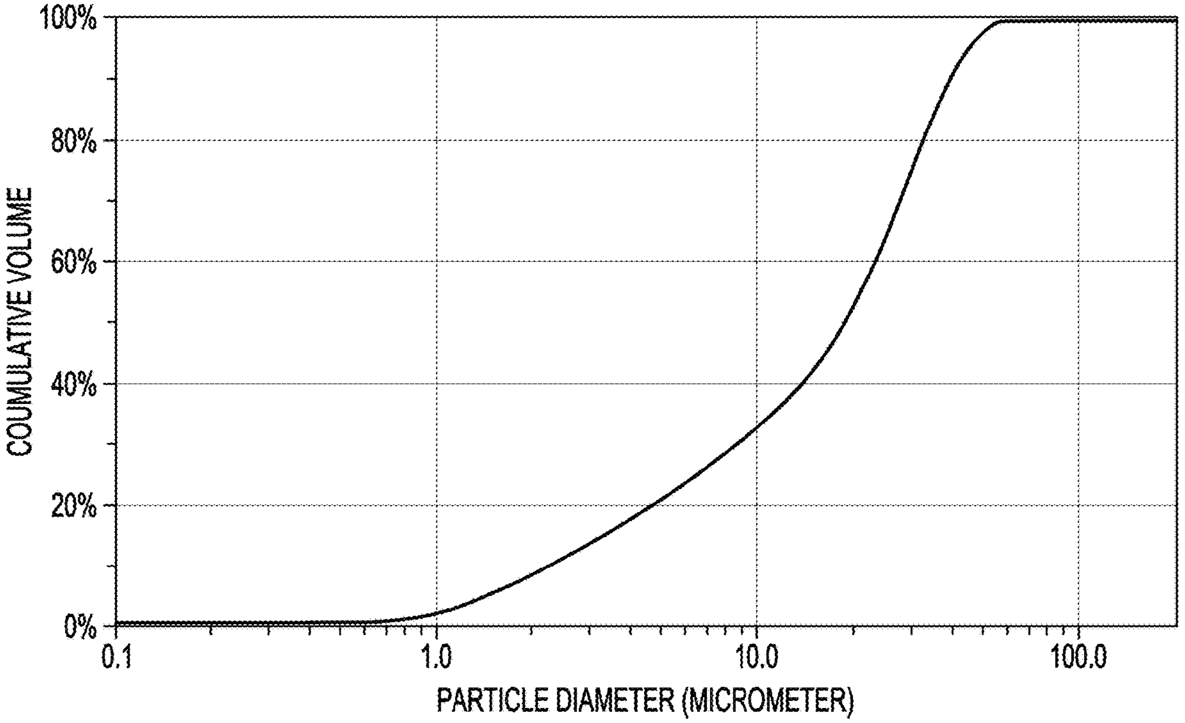
FIG. 5 illustrates cumulative volume as a function of particle size of particles used to form pellets, in accordance with various aspects of the present disclosure.
Figure 6A:
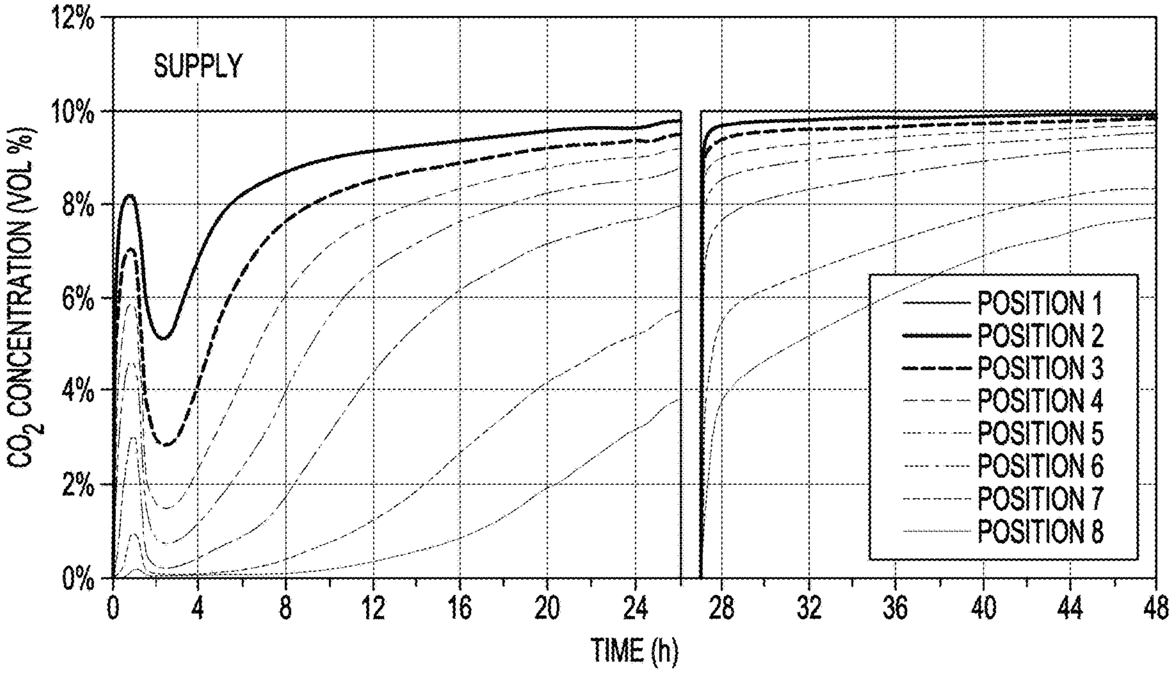
FIG. 6A illustrates $CO_2$ concentration across the length of a pellet bed, in accordance with various aspects of the present disclosure.
Figure 6B:
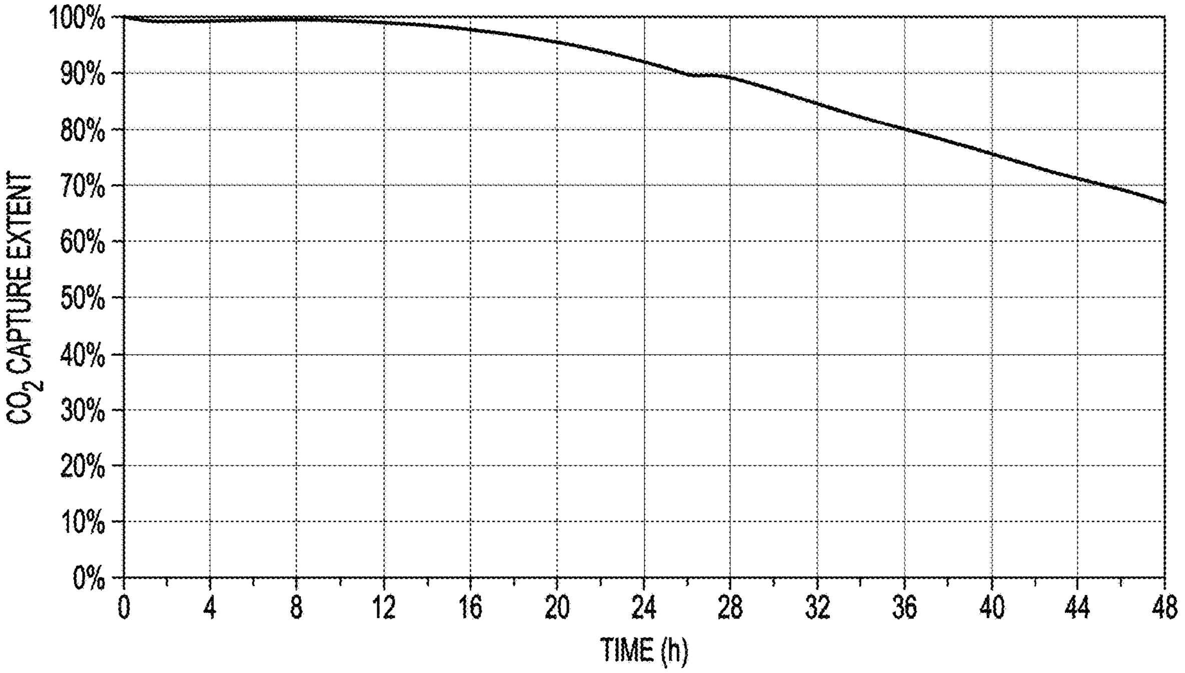
FIG. 6B illustrates total $CO_2$ capture extent, in accordance with various aspects of the present disclosure.
Figure 7:
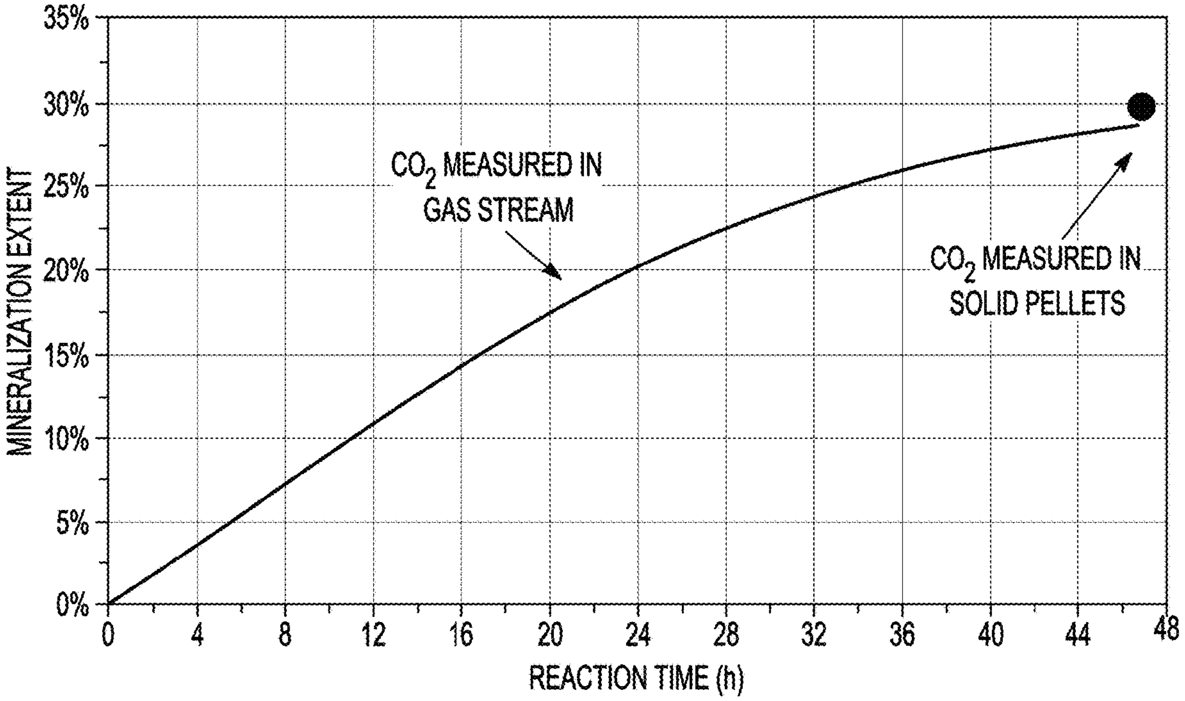
FIG. 7 illustrates a comparison of $CO_2$ capture as measured by gas stream concentration change and as $CO_2$ measured to be newly added to the pellets, in accordance with various aspects of the present disclosure.
Figure 8A:
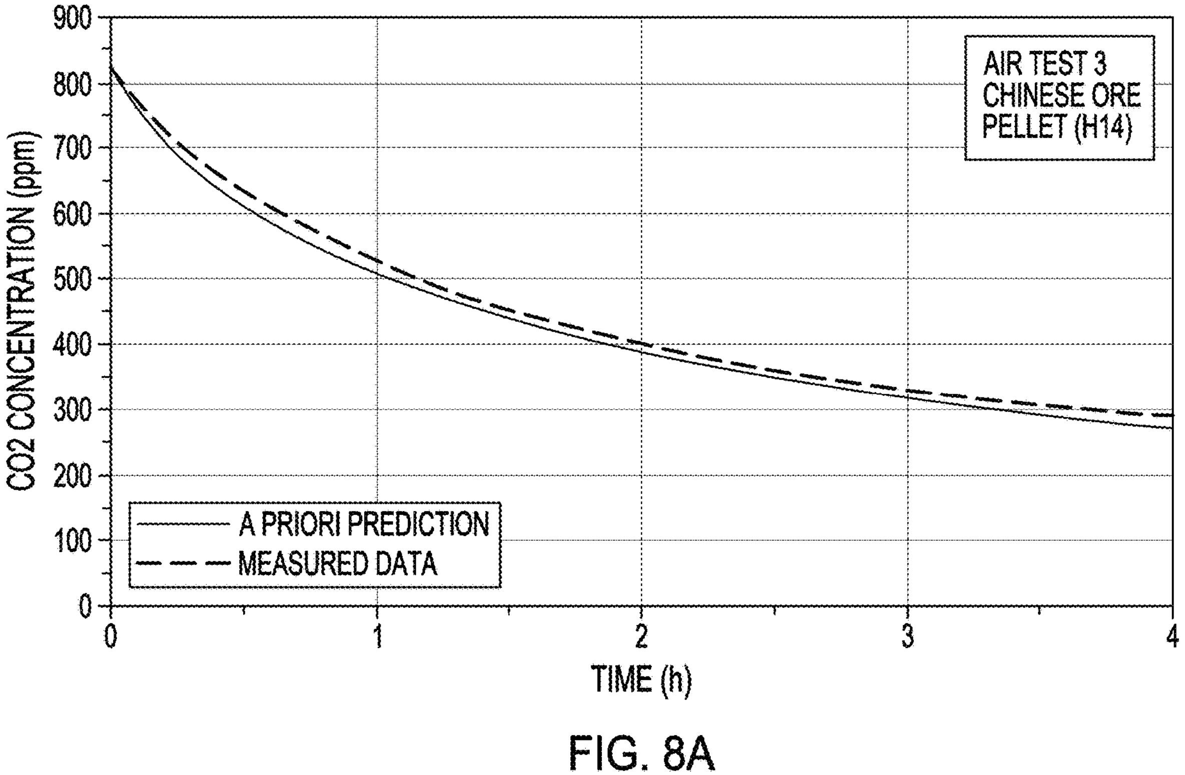
FIGS. 8A-G illustrate the time evolution of gas phase $CO_2$ concentration in a closed reactor filled with air and various structured powders in the form of pellets, with the details of the pellets given in Table 1 and the details of the testing given in Table 2, in accordance with various aspects of the present disclosure.
Figure 8B:
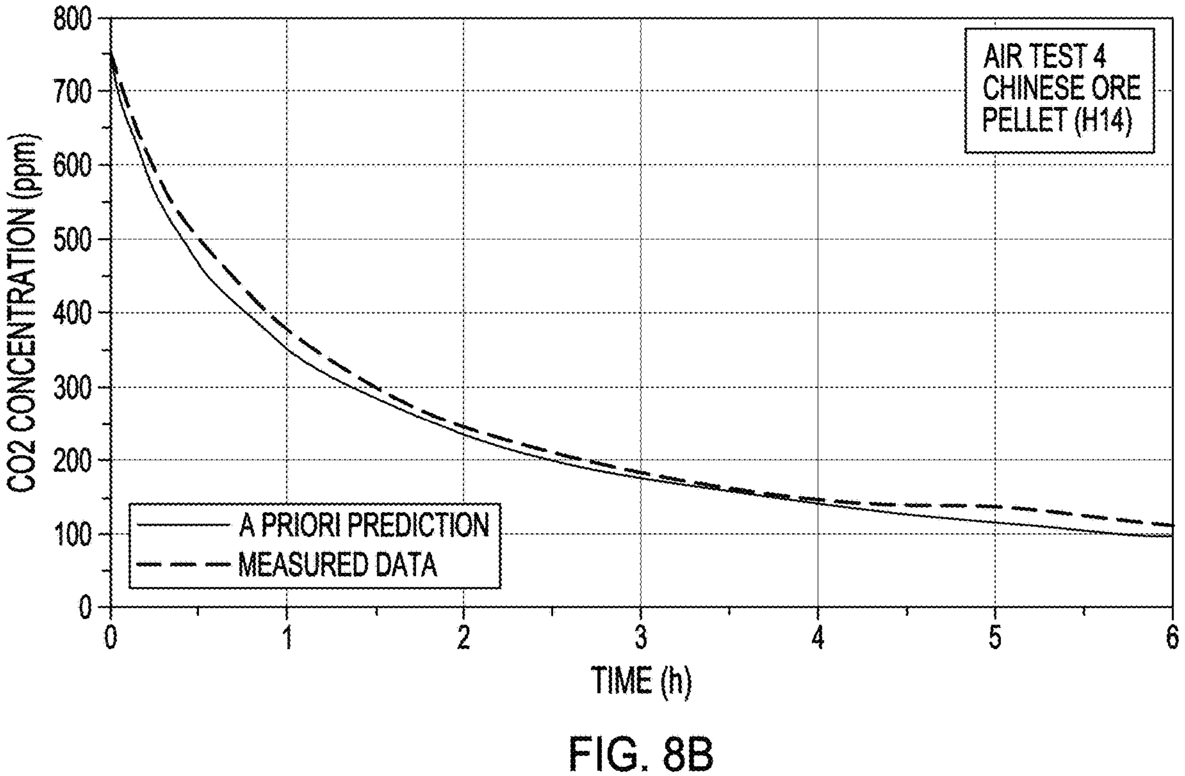
Figure 8C:
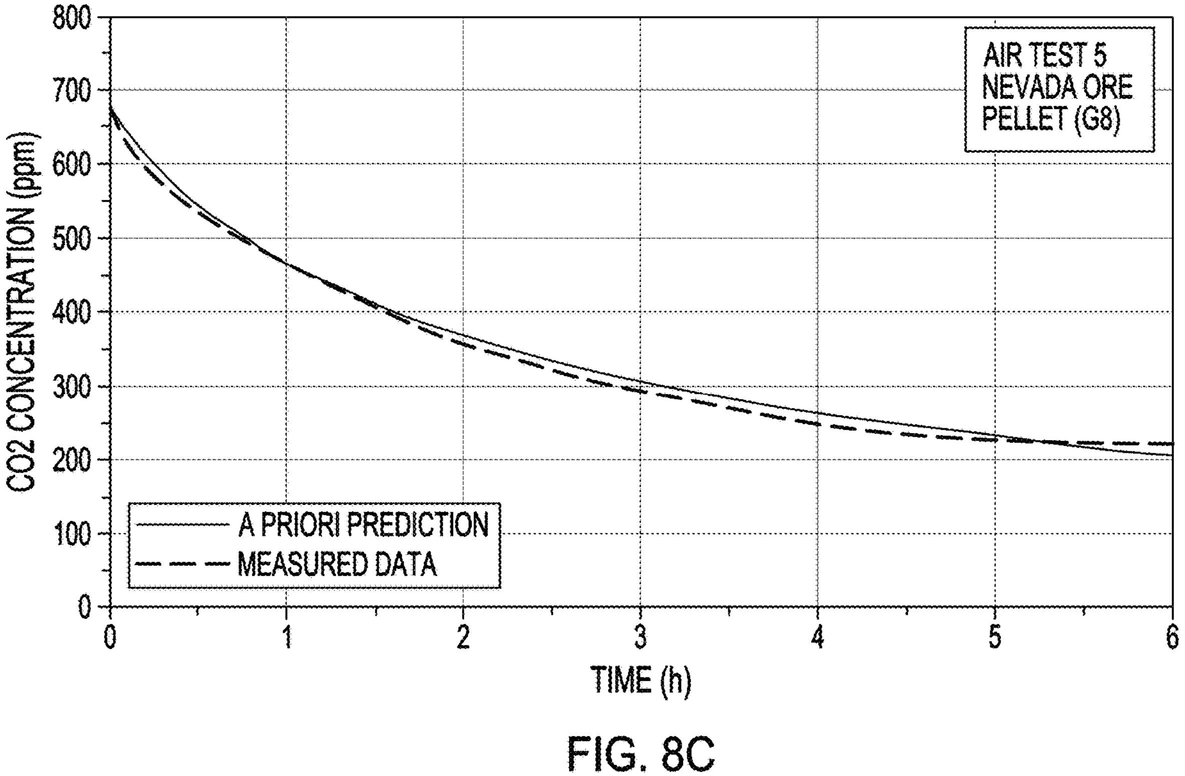
Figure 8D:
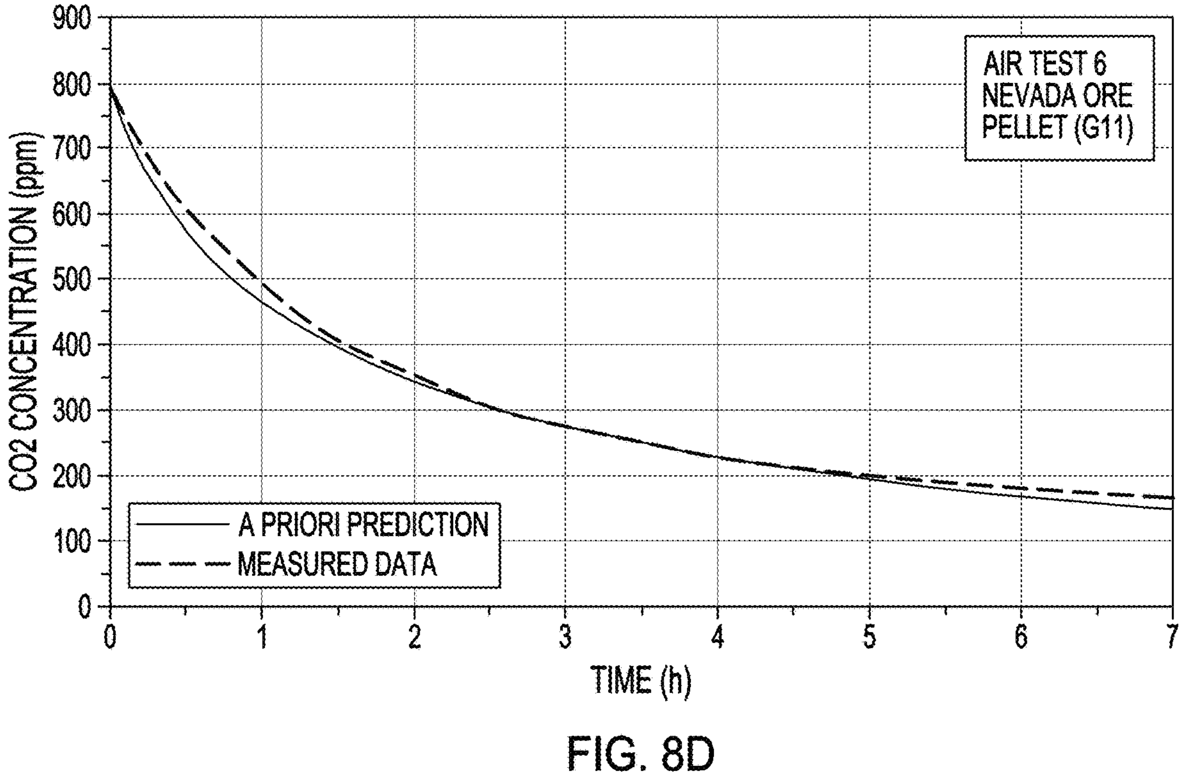
Figure 8E:
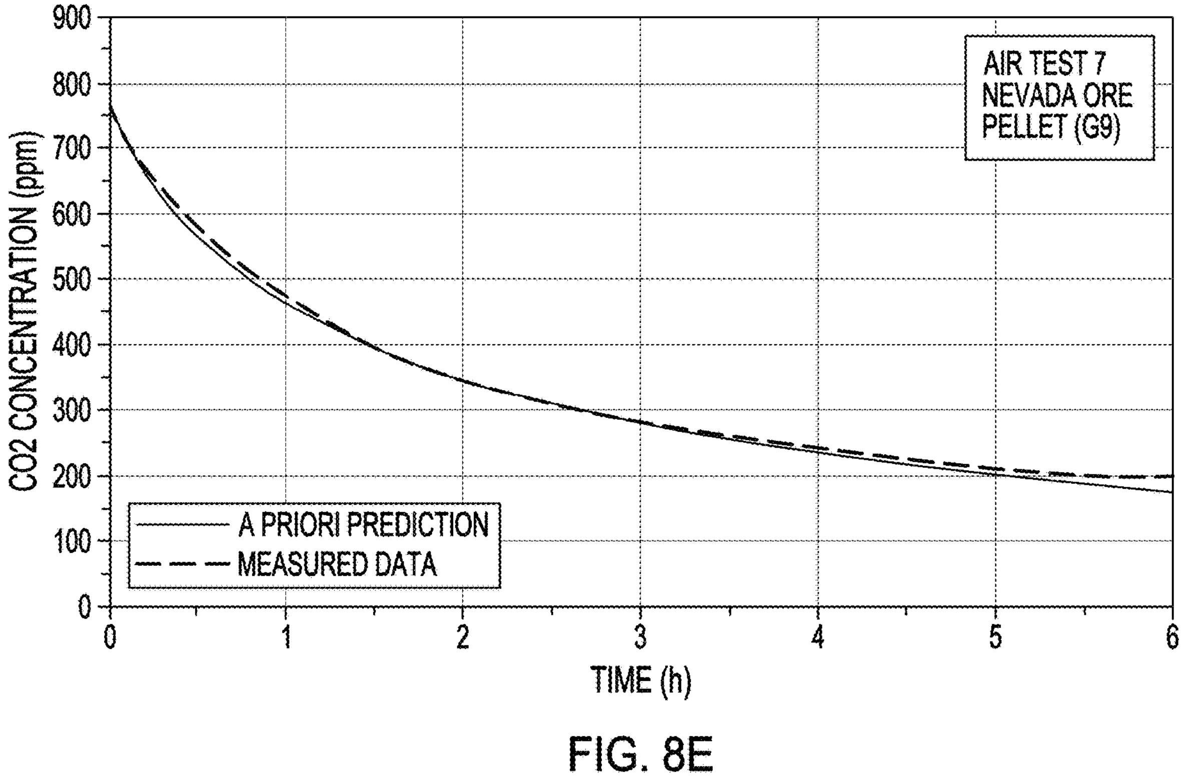
Figure 8F:
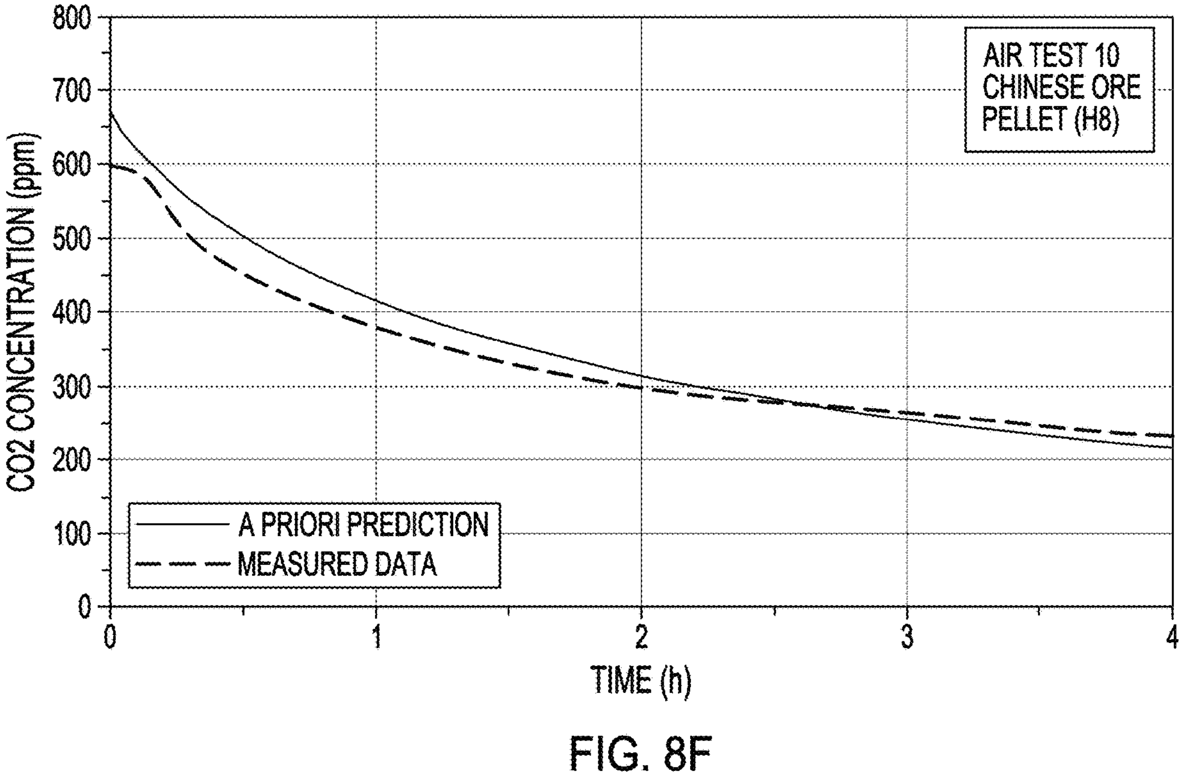
Figure 8G:
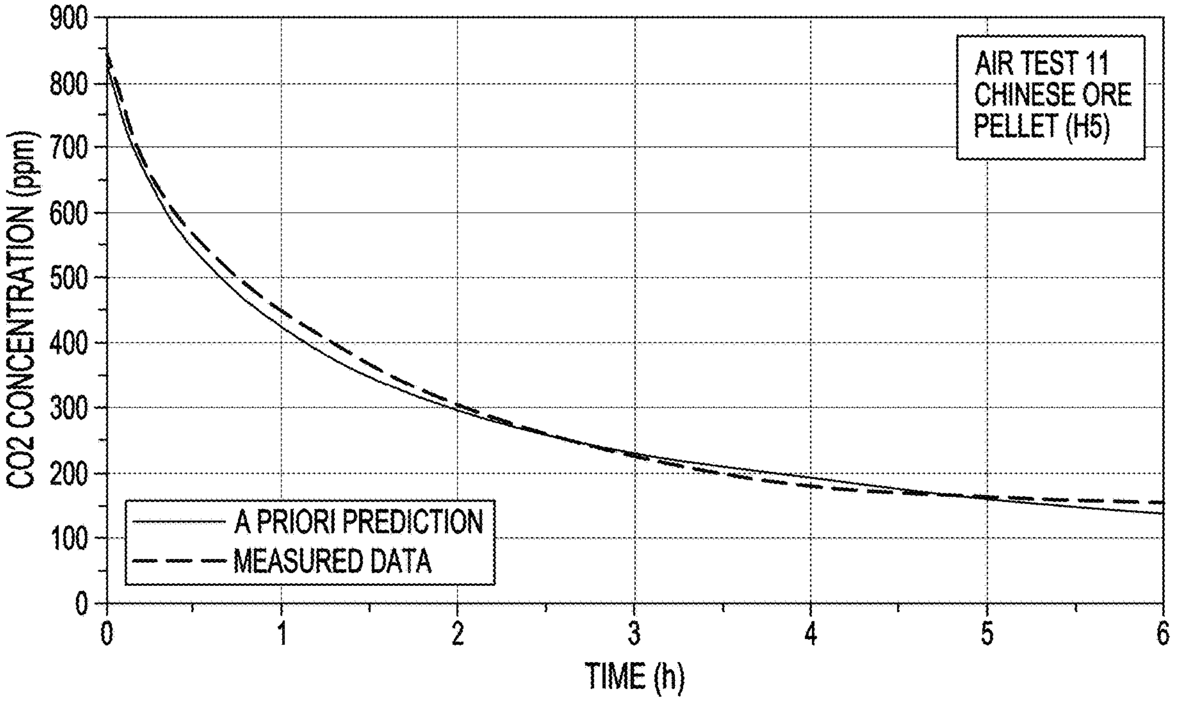

In this Example, structured powders took the form of spherical pellets with a diameter of 5 mm. The pellets were composed of the $CO_2$ reactive mineral brucite, $Mg(OH)_2$, at 70 wt % with the remaining mass split between slow reacting calcium-magnesium silicates ($Ca_xMg_y(SiO_4)_z$) and the unreactive minerals calcium carbonate ($CaCO_3$) and barite ($BaSO_4$). The pellets were composed of particles with the particle size distribution shown in FIG. 5. The pellets were loaded into a packed bed with a depth, parallel to airflow direction, of 3.35 meters. A gas stream that was 90% air and 10% $CO_2$ by volume was supplied at an average rate of 0.005 m/s. Prior to entering the packed pellet bed, the gas stream was humidified with ambient temperature water in a counterflow fashion. The average relative humidity was 93% but was varied from a low of 61% to a high of 100% RH. Neither the temperature of the gas nor the reactor were controlled; average reactor temperature was 18° C. but varied from 16-21° C. over the course of the test. The reactor remained at ambient atmospheric pressure over the course of the test. The test was run for 48 hours. The $CO_2$ concentration was measured across the length of the packed bed (i.e., parallel to the direction of gas flow). The change in $CO_2$ concentration along the length of the packed pellet bed over the course of the test is illustrated in FIG. 6A. Early-stage $CO_2$ removal extent from the gas stream reached 100% but decreased as reactions proceeded as illustrated in FIG. 6B. Over the course of the test, the total removal of supplied $CO_2$ was 67%. After the test, pellets were removed from the column and measured for total solid phase inorganic carbon content. To ensure the mineralized $CO_2$ measured in the solid pellets was derived from the gas stream and not present in the material prior to the reaction, the total solid phase inorganic carbon content of the unreacted material was also measured and excluded from the calculation of mineralized $CO_2$. The total mineralized $CO_2$ measured in the pellets was compared to the $CO_2$ removal measured in the gas stream in FIG. 7.

Example 2. Variation of Powders Used for Pellet Formation

In this Example, several different structured powders in the form of spherical pellets were tested. The details of each pellet group are provided in Table 1. The pellets were composed of the $CO_2$ reactive mineral brucite, $Mg(OH)_2$, with the remaining mass split between slow reacting calcium-magnesium silicates ($Ca_xMg_y(SiO_4)_z$) and the unreactive minerals calcium carbonate ($CaCO_3$) and barite ($BaSO_4$). For each test, pellets were loaded into a packed bed with a depth of 20 mm inside a reactor with an internal volume of 68 liters. A gas stream of ambient air was introduced into the reactor and humidified with ambient temperature water in a crossflow fashion. The average relative humidity for each test is provided in Table 2. Tests were performed under ambient $CO_2$ concentration, and temperature as described in Table 2. All tests occurred at ambient pressure. Once filled with air, the reactor was closed and the change in $CO_2$ concentration was measured over time. Tests lasted several hours as described in Table 2. The evolution of the $CO_2$ concentration for each test is provided in FIGS. 8A-G, with the pellet code provided in each figure corresponding to the pellet details given in Table 1.

TABLE 1

Details of the pellets used in the tests described in Example 2.

| Pellet code | Ore source | Brucite content (wt %) | Particle PSD: $d_{50}$, $d_{80}$, $d_{90}$ (μm) | Pellet diameter (mm) |
|---|---|---|---|---|
| G8 | US | 68% | 18.7, 31.1, 35.3 | 6.3 |
| G9 | US | 64% | 18.7, 31.1, 35.3 | 6.3 |
| G11 | US | 64% | 18.7, 31.1, 35.3 | 4.15 |
| H5 | China | 63% | 5.9, 16.4, 21.2 | 6.3 |
| H8 | China | 63% | 5.9, 16.4, 21.2 | 5.15 |
| H14 | China | 63% | 5.9, 16.4, 21.2 | 5.6 |

TABLE 2

Test conditions for the tests described in Example 2.

| Test # | Pellet code | Sample mass (g) | Temperature (° C.) | Relative Humidity | Starting $CO_2$ concentration (ppm) | Test period (h) |
|---|---|---|---|---|---|---|
| 3 | H14 | 190 | 22 | 88% | 821 | 4 |
| 4 | H14 | 340 | 21 | 88% | 750 | 6 |
| 5 | G8 | 225 | 22 | 90% | 673 | 6 |
| 6 | G11 | 269 | 22 | 92% | 790 | 7 |
| 7 | G9 | 269 | 22 | 91% | 767 | 6 |
| 10 | H8 | 214 | 22 | 87% | 670 | 4 |
| 11 | H5 | 181 | 21 | 93% | 824 | 6 |

Example 3. Carbon Dioxide Uptake of Pellets Over Time

Figure 9:
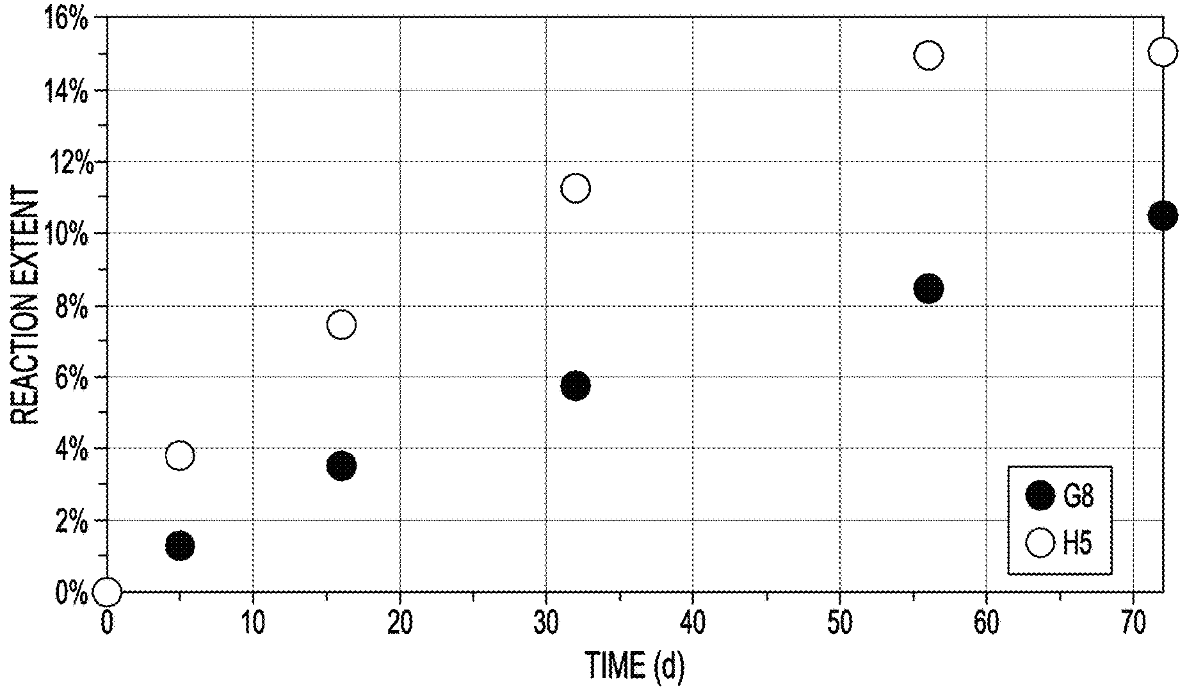
FIG. 9 illustrates increase in $CO_2$ content of pellets over time, shown as a percentage of their potential reaction extent, in accordance with various aspects of the present disclosure.

In this instance, two structured powders in the form of spherical pellets were tested (code G8 and H5 from Table 1). Pellets were loaded into a packed bed with a depth of 20 mm inside a reactor with an internal volume of 68 liters. A continuous supply of ambient air was introduced into the reactor and humidified with ambient temperature water in a crossflow fashion. The $CO_2$ concentration, temperature, and relative humidity varied over time due to fluctuating external conditions; the average, standard deviation, minimum, and maximum conditions over the course of the tests are provided in Table 3. All tests occurred at ambient pressure. Tests lasted 72 days. Pellets were removed at 5, 16, 32, 56, and 72 days to measure the bound $CO_2$ content. The increase in $CO_2$ content of the pellets, as a percentage of their maximum $CO_2$ uptake potential, is provided in FIG. 9. Pellets were also evaluated under scanning electron microscopy (SEM) to determine the form and location of bound $CO_2$. The SEM images showed the formation of solid carbonates in the interparticle void spaces of pellets over time in the reactor.

TABLE 3

Details of the tests described in Example 3.

| | $CO_2$ concentration (ppm) | Relative humidity | Temperature (° C.) |
|---|---|---|---|
| Average | 549 | 83% | 22 |
| Standard deviation | 121 | 3% | 1 |
| Minimum | 395 | 32% | 14 |
| Maximum | 1703 | 89% | 25 |

Example 4. Manufacture of Pellets and Removal of $CO_2$

The process uses structured powders of magnesium hydroxide-bearing material, referred to as pellets. The powder is composed of naturally occurring magnesium hydroxide (i.e., brucite) at a concentration of 30 wt %. The remaining material is composed of naturally co-mingled minerals; no binders are added to form the pellets. The particle size distribution of the powder is characterized by 80% and 99% of the volume being contained in particles with a diameter less than 5 μm and 9 μm, respectively. This corresponds to a surface area of $2\times10^6$ $m^2/m^3$, a Sauter mean diameter (D[3,2]) of 3.0 μm, and a De Brouckere mean diameter (D[4,3]) of 3.7 μm. The powder is fed into a rotating pan pelletizer (i.e., a disc pelletizer) and sprayed with water to induce aggregation and rolling into spheres. The pan pelletizer is set up such that pellets with a diameter of 5 mm naturally exit the pelletizer and pass through a screen where oversize and undersize pellets are deagglomerated and returned to the pelletizer. Properly sized pellets that exit the pelletizer are aged for 6 hours under ambient conditions. The internal porosity of a pellet is 34 vol % and each pellet is homogenous, isotropic, and fully connected. The pellets have an initial compressive strength of 100 kPa to 500 kPa. The pellets do not undergo high temperature curing (otherwise known as induration) as part of their production process.

Figure 10A:
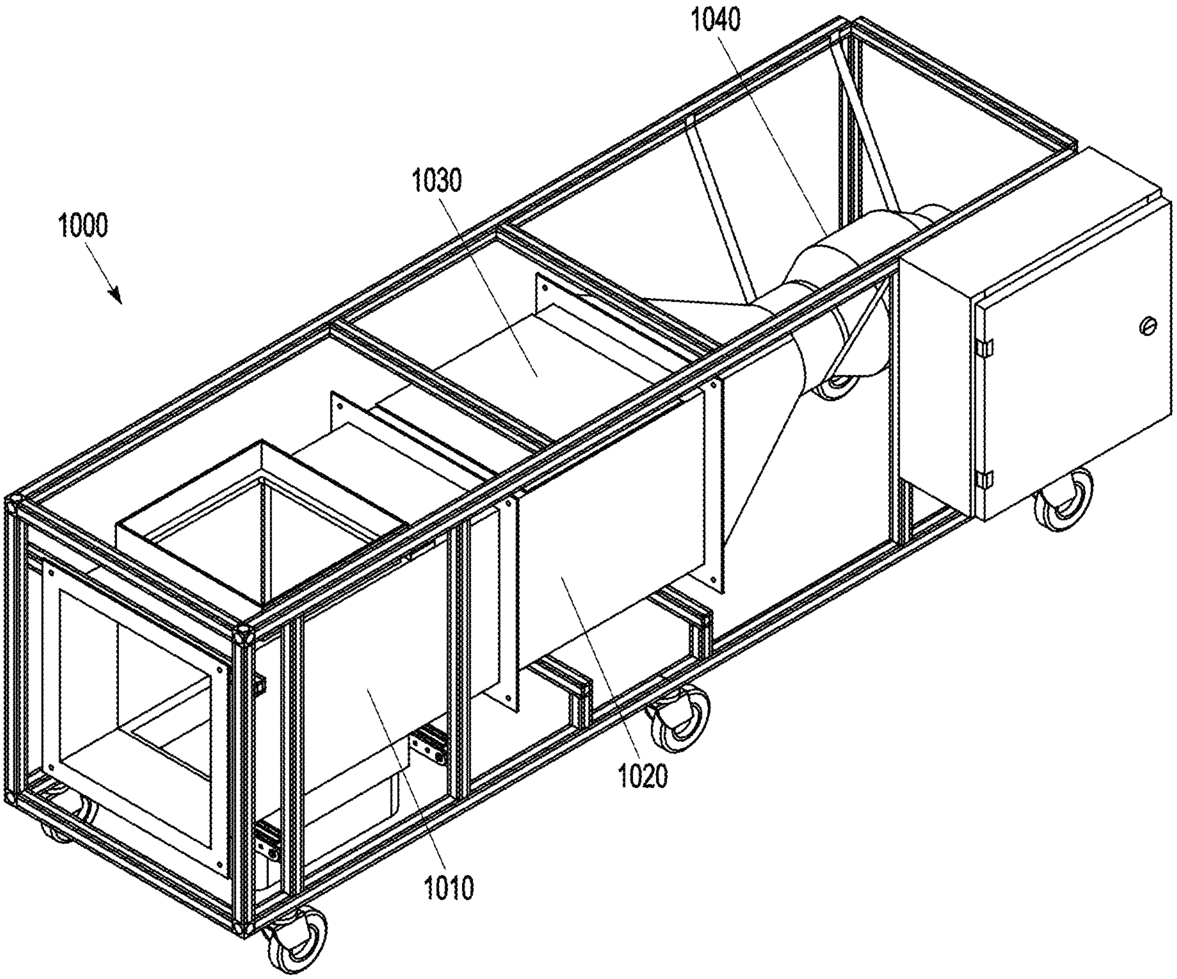
FIGS. 10A-B illustrate an apparatus for sequestering $CO_2$, in accordance with various aspects of the present disclosure.
Figure 10B:
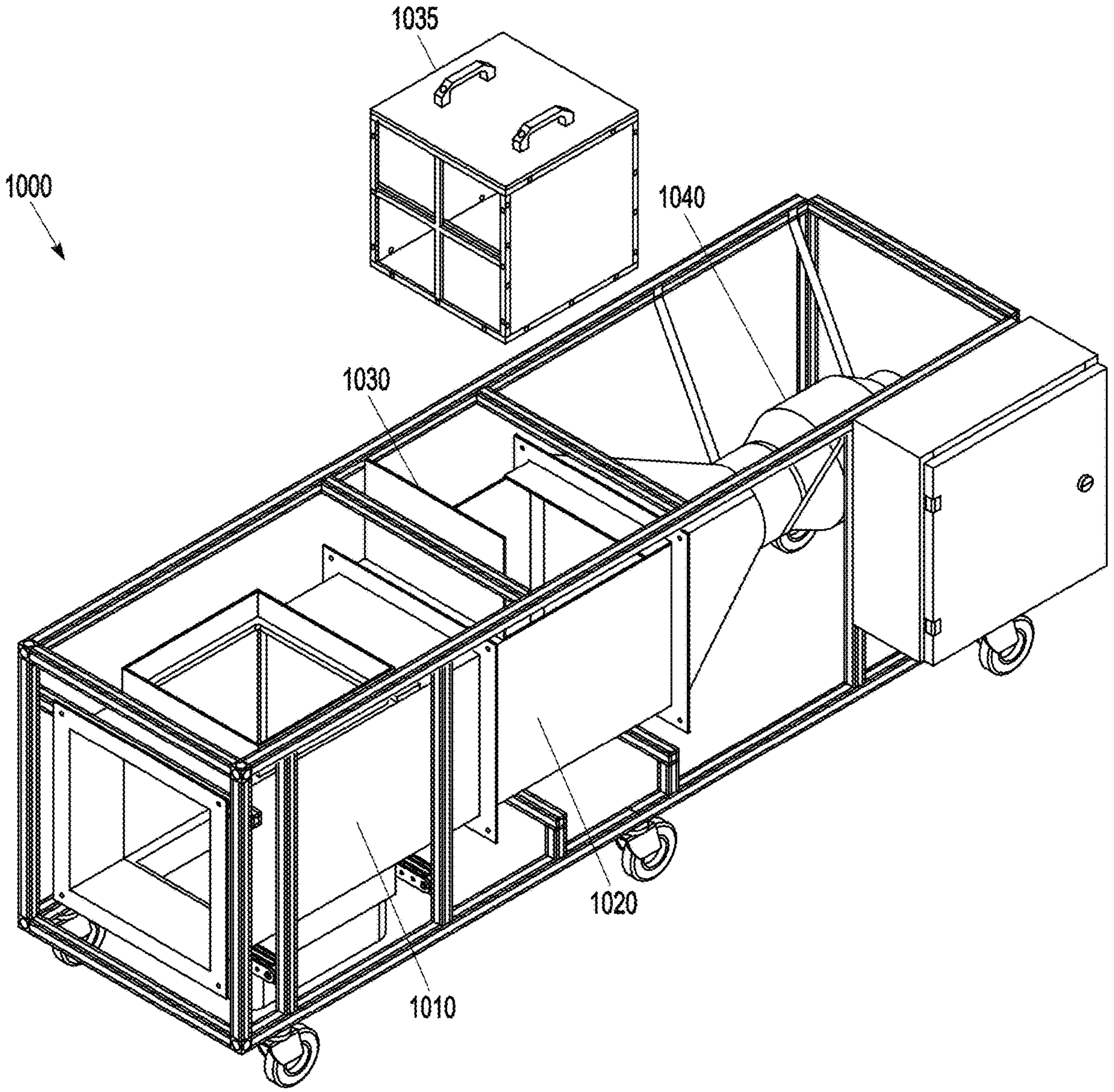

An apparatus similar to that used in Example 1 and illustrated in FIG. 4 is used. The apparatus 1000 is shown in FIG. 10A and includes pre-conditioning unit 1010, reactor 1020 which includes a compartment for a cassette having a door 1030 thereon, and fan 1040. The pellets are loaded into a cassette which acts to maintain the pellets in a packed bed of depth 1.2 m while allowing airflow through the pellet bed. The cassette sits at the core of the reactor, which includes an air pre-conditioning unit and fan system. The apparatus 1000 with the cassette 1035 being removed therefrom is shown in FIG. 10B. The cassette 1035 includes two opposing sides that are screen or mesh and that allow the air to move through the pellets within the cassette in the reactor 1020. Air is transported through the pre-conditioning unit and then through the cassette by a fan. The reaction of $CO_2$ with the pellets is a gas-solid reaction. The pellets in the cassette are used to remove $CO_2$ from the air for 90 days after which time the cassette is removed from the reactor and the pellets are removed from the cassette. The solid pellets act as the permanent storage medium for the captured $CO_2$.

In the air pre-conditioning unit, the relative humidity (RH) of air is increased to 99% by evaporation from supplied water. No active heating or cooling of water or air entering the unit is performed; however, through the effect of vaporization, the temperature of both the water and air exiting the reactor is reduced. The temperature of the air and water can optionally be controlled within the range of greater than 0° C. to 45° C., with the low end of the range to prevent freezing and with the upper end of the range set by ambient conditions; however, the water is generally not heated more than 5° C. greater than ambient temperature. The inlet to the air humidification unit is open to the atmosphere. Air passes horizontally through a section of packing that allows for a concurrent downward flow of water via gravity (i.e., a crossflow exchanger). The packing is designed to provide a large air-water interface without inducing a large pressure drop on the air flow. In the direction of airflow, the outlet of the air humidification units have additional packing which is designed to remove small liquid droplets entrained in the airflow by impact with a surface; this packing also directs the liquid water to a downwards flow under the influence of gravity. At the bottom of the humidification and liquid elimination packing is a sump where the downflowing water collects. A pump is also provided which lifts water from the sump to a distribution basin that sits above the packing material. Water drains through holes in the distribution basin above the packing. Water distribution occurs via gravity through nozzles which evenly distribute water onto the packing. The pump is adjustable to alter the flowrate of water from the sump to the distribution basin. The altered pressure head in the distribution basin changes the flowrate of water through the packing, allowing for control of the relative humidity of air exiting the air humidification unit. The distribution basin is segmented such that water can be provided to a portion or all of the packing material. This alteration of the wetting surface area allows for control of the outlet relative humidity. The airflow rate through the packing is also adjustable via the fan to alter the relative humidity of air exiting the air humidification unit. The packing is segmented into vertical sectors and is provided with vertical louvers such that closure of the louvers removes a section of the packing from the air flow; this decreases the wetted surface area and increases the velocity of air through the packing. This allows for further control of the outlet relative humidity. Downstream of the humidification packing is a valve that allows for ambient air to bypass the humidification packing if desired. This bypass valve is adjustable to allow for humidity control via mixing of ambient and humidified air. At the inlet and outlet of the air humidification unit are sensors that measure temperature, relative humidity, air speed, pressure, and $CO_2$ concentration. There are also temperature sensors for the water entering and exiting the packing. These sensors provide data which is used to determine whether to adjust the pump speed, water distribution, louvers, fan speed, and the bypass valve. The data also provides a basis to quantify the amount of $CO_2$ that enters the reactor unit.

If reduction of humidity or reduction of condensation of water from the $CO_2$ stream onto the pellets is desired, the method can include: using a temporarily high flow rate of the $CO_2$ stream past the one or more minerals to evaporate residual water from the bed of the one or more minerals; halting the humidification of the $CO_2$ stream to provide the same de-condensation effect without increasing the flowrate of the $CO_2$ stream; altering the cross-sectional contact area for the $CO_2$ stream in the humidification unit to impact the wetted surface area, velocity through the humidification section, and time in the humidification section; altering the temperature of the water or $CO_2$ stream to impact the humidification of the $CO_2$ stream; or a combination thereof.

Conditioned air is brought in contact with the cassette filled with pellets. A portion of the water vapor is adsorbed on the surface of the pellets and $CO_2$ reacts with the magnesium hydroxide in the pellets forming solid hydrated magnesium carbonates. Air from the humidification unit passes through the bed of pellets via openings in a screen of the cassette. The openings in the screen of the cassette are smaller than the diameter of the pellets to prevent the loss of pellets. The cassette and the surrounding structure are designed such that the cassette can be slid into and out of the reactor. When inside the reactor, the cassette maintains an airtight seal with the reactor structure to prevent air from bypassing the pellet bed. Downstream of the reactor unit are sensors for temperature, relative humidity, air speed, pressure, and $CO_2$ concentration. These sensors provide data which is used to determine whether to adjust the pump speed, fan speed, and bypass valve. The data also provide a basis to quantify the amount of $CO_2$ that exits the reactor unit and thus to calculate the amount of $CO_2$ bound to the pellets. The velocity of air through the cassette is altered to match the reaction rate of the pellets, which decreases as reaction extent increases. The average superficial space velocity in the cassette is 0.03 m/s. A cassette is kept in the reactor for 90 days of $CO_2$-removing operation.

The fan unit creates the flow of air through the reactor. The fan sits at the end of the apparatus (i.e., induced draft). Air exiting the fan is directed away from the inlet of the apparatus to prevent dilution of ambient air with $CO_2$-stripped air. The fan speed is adjustable to meet requirements of the air humidification unit and/or the reactor unit.

Pre- and post-reaction, the pellets are weighed and a sub-sample of the pellets are measured for total inorganic carbon content. The weight measurement gives an indication of the mass added from the inclusion of $CO_2$ and $H_2O$ into the solid structure of the pellets. The total inorganic carbon content provides a direct measurement of $CO_2$ added to the pellets and is used to verify the measurement of $CO_2$ removed from the air. Additional measurement methods such as thermogravimetry with mass spectroscopy are used intermittently as an independent verification method to verify the results.

The process achieves 97.4% mineralization in 90 days. On average, 90% of the $CO_2$ in the air that passes through the reactor is removed via the mineralization reaction. The net $CO_2$ removal efficiency (i.e., quantity of $CO_2$ mineralized minus the $CO_2$ emitted to achieve mineralization), inclusive of upstream extraction and processing of the brucite-bearing material, is 94%. The process requires 17 kWh/t-$CO_2$ for air movement.

The pellets provide a reaction with gaseous $CO_2$ that is 106-107 times faster than with a non-powdered material of the same diameter as the spherical structured pellets.

In Examples 5-28, various aspects of the Example 4 process are varied and the resulting process is compared to that of Example 4. In Examples 5-28, all aspects of the compared process are the same as Example 4 other than the aspects that are described as varied.

Example 5. Example 4 Versus 10× Larger Particle Size Distribution (PSD)

The PSD $d_{80}$ (i.e., the diameter below which 80% of the volume of a powder sample is contained) of Example 4 is increased from 5 μm to 50 μm, which reduces the grinding energy to prepare the powder used to form the pellets from 46 kWh/t-rock to 6 kWh/t-rock. However, the Example 4 PSD reaches a $CO_2$ mineralization extent of 97.4% in 90 days whereas the larger PSD material requires 7,500 days to reach the same $CO_2$ mineralization extent. Providing a set $CO_2$ removal rate (e.g., 1 Mt—$CO_2$/y) with the larger PSD material increases the site footprint and the number of reactors by a factor of 64 relative to that of Example 4. The $CO_2$ emissions from increased land disturbance and materials usage (e.g., concrete, steel) reduces the net $CO_2$ removal efficiency of the process from 94% for Example 4 to a net emitter of $CO_2$ for the larger PSD.

Example 6. Example 4 Versus 10× Smaller Particle Size Distribution (PSD)

The PSD $d_{80}$ of Example 4 of 5 μm is decreased to 0.5 μm, which decreases the time to reach 97.4% reaction from 90 days to 19 hours and decreases the site footprint and number of reactors to 25% of Example 4. However, achieving the smaller PSD increases the grinding energy from 46 kWh/t-rock to 1.3 MWh/t-rock. For an electricity supply with a $CO_2$ intensity of 300 g-$CO_2$/kWh, the $CO_2$ emissions from the generation of electricity is larger than the $CO_2$ mineralized in the process, making it a net $CO_2$ emitting activity. If the process is powered by a fully decarbonized source of electricity, the cost of grinding alone increases from $21/t-$CO_2$ for Example 4 to $604/t-$CO_2$, assuming an electricity price of $0.10/kWh.

Example 7. Example 4 Versus Powder in a Packed Bed

A fluidized bed of powders of the same PSD as the powders that form the pellets in Example 4 is used as an alternative to the packed bed of pellets used in Example 4. The energy consumption for the movement of air through the fluidized bed of powders is 7.0 MWh/t-$CO_2$ whereas for Example 4's packed bed of pellets it is only 17 kWh/t-$CO_2$.

Example 8. Example 4 Versus Powder in Trays

A structure such as trays to hold a thin layer of powder and to flow air horizontally over the powder is used as an alternative to Example 4's packed bed of pellets. This system allows for good gas-solid contact while maintaining a low pressure drop for air flowing through the system. However, such a system increases the amount of structural material required and the volume of the confining building. A 0.5 mm tray-based system holding a 5 mm depth of powder with a 10 cm air gap between trays increases the amount of structural material relative to the Example 4 system by a factor of 64. The tray-based system also increases the building volume by a factor of 22. The smaller footprint and reduced material usage of Example 4 means it has a lower capital expenditure and associated $CO_2$ footprint.

Example 9. Example 4 Versus Compressed Pellets

Particles are compressed to form an alternative form of pellet having reduced porosity relative to Example 4's pellets. Equivalent diameter pellets (i.e., 5 mm) without internal porosity only reach a $CO_2$ mineralization extent of 0.2% in 90 days, as compared to the 97.4% for Example 4. In a 100-year period, $CO_2$ mineralization extent for the pellets without internal porosity only reaches 3.9%. For compressed pellets with 10 vol % porosity, the early-stage $CO_2$ mineralization rate is the same as Example 4, but the filling of internal pores with solid carbonates, such as nesquehonite, limits the $CO_2$ mineralization extent to ~16% of the material's potential. The pellets of Example 4 allow for full and rapid $CO_2$ mineralization.

Example 10. Example 4 Versus Indurated Pellets

A common step in pellet production is the heat curing of the pellets to increase strength (so-called 'induration'). Typical induration temperatures exceed 1,000° C. and cause the thermal decomposition of $Mg(OH)_2$ to MgO while also forming MgO species that are less reactive (so-called 'burnt magnesia'). Such a technique increases the mineralization time relative to that of Example 4 by several orders of magnitude. Induration below the thermal decomposition temperature of $Mg(OH)_2$ (i.e., 300° C.) comes at a minimum energy expenditure of 366 kWh/t-$CO_2$ (assuming the full $CO_2$ mineralization potential of the rock was subsequently achieved). If the energy was supplied by natural gas, the cradle-to-grave emissions of natural gas reduces the net $CO_2$ removal efficiency of the process due solely to the induration of pellets by 16%. If heat is supplied by electricity with a $CO_2$ intensity of 300 g-$CO_2$/kWh, the $CO_2$ emissions from the generation of electricity for pellet induration alone decreases the net $CO_2$ removal efficiency by 11%. If the process is powered by a fully decarbonized source of electricity, the electricity cost of the pellet induration process adds at least \$37/t-$CO_2$, assuming an electricity price of \$0.10/kWh and full utilization of the rock's $CO_2$ mineralization potential.

Example 11. Example 4 Versus Pellets with Binder

An alternative pellet composition includes one or more chemical binders. Typical binder addition rates for inorganic pellets are ~1 wt %. The production of binders has associated $CO_2$ emissions which must be counted against the gross $CO_2$ removal to determine the net $CO_2$ removal of the process. If the common binder carboxymethyl cellulose is added at 1 wt %, the net $CO_2$ removal efficiency decreases by 47% based on the binder production emissions alone.

Example 12. Example 4 Versus Smaller Pellets

A packed bed of 0.5 mm diameter pellets is used as an alternative to Example 4's packed bed of 5 mm diameter pellets. The smaller pellets induce a larger pressure drop, thereby increasing the energy required to move air through the system from 17 kWh/t-$CO_2$ captured for Example 4 to 1.5 MWh/t-$CO_2$ for the smaller pellets. For an electricity supply with a $CO_2$ intensity of 300 g-$CO_2$/kWh, the $CO_2$ emissions from the generation of electricity reduces the net $CO_2$ removal efficiency by 44%. If the process is powered by a fully decarbonized source of electricity, the cost of air movement alone increases from \$2/t-$CO_2$ for Example 4 to \$146/t-$CO_2$, assuming an electricity price of \$0.10/kWh.

Example 13. Example 4 Versus Weaker Pellets

Pellets with less compressive strength are used as an alternative to the pellets of Example 4. Pellets with an initial compressive strength of 1 kPa undergo compressive distortion and fracture under the weight of Example 4's pellet bed. The resulting bed requires more energy to move air through the system. These weaker pellets require 4.8 MWh/t-$CO_2$ captured to move air through the system as compared to 17 kWh/t-$CO_2$ captured for Example 4. This makes the process a net $CO_2$ emitting activity if electricity with a $CO_2$ intensity of 300 g-$CO_2$/kWh is used. Weaker pellets with a shorter pellet bed height increase the site footprint and reactor number, thereby increasing cost and decreasing the net $CO_2$ removal. An additional benefit of Example 4's pellets is the ease with which they can be transferred into and out of the cassette.

Example 14. Example 4 Versus Lower Relative Humidity (RH)

Reducing the RH of the air from 99% to 90% reduces the $CO_2$ mineralization extent in a 90-day period from 97.4% to 81.0%; this increases the cost of $CO_2$ removal by 22%. To reach the same mineralization extent with the lower RH requires 410 days. To provide a set $CO_2$ removal rate (e.g., 1 Mt—$CO_2$/y) at the lower RH increases the site footprint and the number of reactors by a factor of 3.7. The $CO_2$ emissions from increased land disturbance and materials usage (e.g., concrete, steel) decreases the net $CO_2$ removal efficiency of the process from 94% for Example 4 to 77% for the lower RH. The lower net $CO_2$ removal efficiency and larger land and equipment requirements increase the cost by 63%.

Example 15. Example 4 Versus Saturated Conditions

If the RH is increased to saturation or supersaturated conditions, the $CO_2$ mineralization extent in a 90-day period drops to 3%. To reach the equivalent $CO_2$ mineralization extent as Example 4 (i.e., 97.4% at 90 days) requires >8 years. Providing a set $CO_2$ removal rate (e.g., 1 Mt—$CO_2$/y) while operating in saturated conditions increases the site footprint and the number of reactors such that the $CO_2$ emissions from increased land disturbance and materials usage (e.g., concrete, steel) make the process a net emitter of $CO_2$ whereas Example 4 operates at a 94% net $CO_2$ removal efficiency.

Example 16. Example 4 Versus Increased $CO_2$ Concentration

If the $CO_2$ concentration is actively increased via a direct air capture technology from Example 4's ambient concentration (i.e., 426 ppm) to 95%, the $CO_2$ mineralization rate increases by a factor of 2,230. To reach a $CO_2$ mineralization extent of 97.4% decreases from 90 days for Example 4 to 58 minutes. However, the energy expenditure to create the 95% concentration $CO_2$ is 1.6 MWh/t-$CO_2$. For electricity with a $CO_2$ intensity of 300 g-$CO_2$/kWh, the $CO_2$ emissions from the generation of electricity to concentrate $CO_2$ alone reduces the net $CO_2$ removal efficiency by 48%. If the process is powered by a fully decarbonized source of electricity, the cost of creating the 95% concentration $CO_2$ adds \$161/t-$CO_2$ captured in electricity costs, assuming an electricity price of \$0.10/kWh.

Example 17. Example 4 Versus Higher Temperature

Increasing the temperature of the reaction from an ambient condition of (e.g., 15° C.) to 50° C. while holding the relative humidity (RH) steady at 99% accelerates the $CO_2$ mineralization reaction by a factor of 1.9. To hold the RH steady at 99% while increasing the temperature requires the vaporization of 70.2 g-$H_2O$/kg-air which comes at an energy expenditure of 68 MWh/t-$CO_2$ captured, assuming all 426 ppm of $CO_2$ in the air is captured. For electricity with a $CO_2$ intensity of 300 g-$CO_2$/kWh, the $CO_2$ emissions from the generation of electricity for RH maintenance alone make the process a net emitter of $CO_2$. If the process is powered by a fully decarbonized source of electricity, the electricity cost of maintaining the RH adds \$6,800/t-$CO_2$ captured, assuming an electricity price of \$0.10/kWh.

Example 18. Example 4 Versus Longer Reaction Time

Increasing the reaction time from Example 4's 90 days to 180 days allows the $CO_2$ mineralization extent to increase from 97.4% to 99.9%. However, the extended operation has continuous energy expenditure for the conditioning and movement of air through the system. This continued energy expenditure reduces the net $CO_2$ removal efficiency from 94% in Example 4 to 89%. This reduced efficiency, along with other ongoing operational expenses (e.g., labor), increases the cost per net ton of $CO_2$ removal by 9%.

Example 19. Example 4 Versus Shorter Reaction Time

Reducing the reaction time from Example 4 of 90 days to 3 days yields a $CO_2$ mineralization extent of only 50.8%. The rapid uptake at the early reaction stages means that the net $CO_2$ removal efficiency remains at 94% despite the low utilization of the reactive minerals. However, the reduced $CO_2$ removal per ton of rock means that the capital costs, along with operational costs upstream of the reactor, are amortized over fewer tons of $CO_2$. This results in the cost per net t-$CO_2$ removal increasing by a factor of 2.3.

Example 20. Example 4 Versus Deeper Bed

Increasing the depth of the pellet bed from Example 4 of 1.2 m to 10 m decreases the site footprint by 70% and the number of reactors by 10, reducing the associated capital costs. However, an increased bed depth while maintaining the 97.4% $CO_2$ mineralization rate in 90 days means that a higher air velocity through the beds is necessary to supply sufficient $CO_2$. The pressure drop increase from the higher air velocity comes at an additional energy expenditure of 18.9 MWh/t-$CO_2$ captured. For electricity with a $CO_2$ intensity of 300 g-$CO_2$/kWh, the $CO_2$ emissions from the generation of electricity to provide air flow alone makes the process a net emitter of $CO_2$. If the process is powered by a fully decarbonized source of electricity, the electricity cost of maintaining the higher air velocity adds \$1,885/t-$CO_2$ captured, assuming an electricity price of \$0.10/kWh.

Example 21. Example 4 Versus Shallower Bed

Decreasing the depth of the bed from Example 4 of 1.2 m to 10 cm decreases the energy expenditure for moving air through the reactor. However, the site footprint expands by ~7.9 times and the number of reactors increases by 10. The increase in materials usage and landscape disturbance decrease the net $CO_2$ removal efficiency by 49%. The cost per net t-$CO_2$ removal increase relative to Example 4 by a factor of 1.8

Example 22. Example 4 Versus Higher Air Flowrate

The air flowrate is increased over that of Example 4 to maintain a higher $CO_2$ concentration throughout the pellet bed, thereby increasing the $CO_2$ mineralization rate. Increasing the average superficial space velocity in the pellet bed from 0.03 m/s to 0.3 m/s reduces the reaction time but comes at additional energy expenditure due to the increased pressure drop through the reactor. The effect is to reduce the net $CO_2$ removal efficiency by 10% and increase the cost by a factor of 4.9.

Example 23. Example 4 Versus Lower Air Flowrate

The air flowrate is slowed to reduce the pressure drop through the reactor and associated energy consumption. Reducing the average superficial space velocity in the pellet bed of Example 4 from 0.03 m/s to 0.003 m/s increases the time to reach 97.4% mineralization extent from 90 days in Example 4 to 900 days. To provide a set $CO_2$ removal rate (e.g., 1 Mt—$CO_2$/y) requires increasing the site footprint and the number of reactors. The reduction in energy expenditure to operate the fans is overshadowed by the increase in other operational costs (e.g., labor) and the increased capital expenditure on equipment and land.

Example 24. Example 4 Versus Slurry Reactor Energy

A slurry reactor where a solution is sparged with a $CO_2$ containing gas is used as an alternative to Example 4's gas-solid reactor. The solution may or may not contain solids. There is a wide variety of slurry reactor operating conditions, equipment designs, and reaction rates. However, all forms of slurry reactors require more operational energy than Example 4. Both Example 4's reactor and slurry reactors move a large quantity of air to supply $CO_2$ to the reaction. Slurry systems also move the liquid, and sometimes solid, component over the course of the reaction. The additional pumping or mixing substantially increases energy-associated $CO_2$ emissions, cost, and system complexity.

Example 25. Example 4 Versus Slurry Post Processing

A slurry reactor where a solution is sparged with a $CO_2$ containing gas is used as an alternative to Example 4's gas-solid reactors. The solution may or may not contain solids. There is a wide variety of slurry reactor operating conditions, equipment designs, and reaction rates. However, to produce a stable, storable form of $CO_2$, slurry reactors must separate and dry precipitates to generate solid carbonates. Assuming a slurry reactor fully mineralizes a 30 wt % $Mg(OH)_2$ material and generates a filter cake with 33 wt % water, the energy to dry the carbonates is at least 1.5 MWh/t-$CO_2$. For electricity with a $CO_2$ intensity of 300 g-$CO_2$/kWh, the $CO_2$ emissions from the generation of electricity to run the drying process alone decrease the net $CO_2$ removal efficiency by 45%. If the process is powered by a fully decarbonized source of electricity, the electricity cost of the drying process alone adds \$151/t-$CO_2$, assuming an electricity price of \$0.10/kWh.

Example 26. Example 4 Versus Cyclic Capture Energy

Temporarily capturing $CO_2$ as a mineral and then releasing the $CO_2$ from the mineral structure in a concentrated form (i.e., >95% purity) for storage as supercritical $CO_2$ in underground, geologic formations is used as an alternative to Example 4's single-pass capture and storage of $CO_2$ as a solid mineral. The removal of $CO_2$ from a mineral requires energy input, typically in the form of heat. The thermal decomposition of $MgCO_3$ to liberate $CO_2$ comes at a minimum energy expenditure of 872 kWh/t-$CO_2$. If the energy is supplied by natural gas, the cradle-to-grave emissions of natural gas reduces the net $CO_2$ removal efficiency of the process due solely to the $CO_2$ liberation step by 39%. If heat is supplied by electricity with a $CO_2$ intensity of 300 g-$CO_2$/kWh, the $CO_2$ emissions from the generation of electricity for the decomposition of $MgCO_3$ alone decrease the net $CO_2$ removal efficiency by 26%. If the process is powered by a fully decarbonized source of electricity, the electricity cost of the decomposition process alone adds \$87/t-$CO_2$, assuming an electricity price of \$0.10/kWh.

Example 27. Example 4 Versus Cyclic Capture External Costs

Temporarily capturing $CO_2$ as a mineral and then releasing the $CO_2$ from the mineral structure in a concentrated form (i.e., >95% purity) for storage as supercritical $CO_2$ in underground, geologic formations is used as an alternative to Example 4's single-pass capture and storage of $CO_2$ as a solid mineral. $CO_2$ produced from thermal decomposition of carbonates requires, at a minimum, transport to the storage location, compression to a supercritical state, injection into an underground storage formation, and long-term monitoring of storage stability. The cost of these activities is highly dependent on the transport distance, transport mode (e.g., pipeline, ship, truck, rail, barge), quality of the geologic storage formation, and local regulatory requirements. These costs add \$35/t-$CO_2$ to \$95/t-$CO_2$ captured to the \$/t-$CO_2$ of Example 4.

Example 28. Example 4 Versus Cyclic Capture External Risks

Temporarily capturing $CO_2$ as a mineral and then releasing the $CO_2$ from the mineral structure in a concentrated form (i.e., >95% purity) for storage as supercritical $CO_2$ in underground, geologic formations is used as an alternative to Example 4's single-pass capture and storage of $CO_2$ as a solid mineral. Such processes require project integration between the entity performing $CO_2$ capture, the entity performing $CO_2$ transport, and the entity performing $CO_2$ storage as these activities are, to date, not performed by a single player. These activities are front-loaded with capital expenditure. Since the risk profiles and factors of these activities are distinct, the chance for a delay in one or more parts of the chain risks revenue generation for all parties and thus the financial viability of the project. Example 4 eliminates these cross-chain risks by having a vertically-integrated process where $CO_2$ capture and storage happen at the same location and is performed by a single entity. This reduces a project's risk profile and allows for more favorable financing terms.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Exemplary Aspects.

The following exemplary aspects are provided, the numbering of which is not to be construed as designating levels of importance:

Aspect 1 provides a method for sequestering carbon dioxide, the method comprising:

contacting a first feedstock that is a gaseous feedstock comprising carbon dioxide with a second feedstock comprising one or more minerals, such that at least a portion of the carbon dioxide in the first feedstock reacts with the one or more minerals in the second feedstock to form a first output comprising one or more carbonate minerals and a second output that is a gaseous output having a lower concentration of carbon dioxide than a concentration of carbon dioxide in the first feedstock.

Aspect 2 provides the method of Aspect 1, wherein the first and second feedstock are substantially free of liquid water.

Aspect 3 provides the method of any one of Aspects 1-2, wherein liquid water is 0 wt % to 15 wt % of the first feedstock.

Aspect 4 provides the method of any one of Aspects 1-3, wherein prior to the contacting of the first feedstock and the second feedstock, the one or more minerals are substantially free of liquid water.

Aspect 5 provides the method of any one of Aspects 1-4, wherein prior to the contacting of the first feedstock and the second feedstock, liquid water is 0 wt % to 15 wt % of the one or more minerals.

Aspect 6 provides the method of any one of Aspects 1-5, wherein during the contacting of the first feedstock and the second feedstock the one or more minerals are substantially free of liquid water other than any water that condenses on the one or more minerals from humidity present in the first feedstock.

Aspect 7 provides the method of any one of Aspects 1-6, wherein the one or more minerals comprise $Mg(OH)_2$, $CaSiO_3$, $Mg_3Si_2O_5(OH)_4$, $Mg_{10}Fe_2(CO_3)(OH)_{24}·2H_2O$, $Mg_6Fe_3(OH)_{16}(CO_3)(H_2O)_4$, $Ca(OH)_2$, $Fe(OH)_2$, $Mn(OH)_2$, $Sr(OH)_2$, $Ba(OH)_2$, CaO, MgO, SrO, BaO, $Ca_2SiO_4$, $Ca_3SiO_5$, $Ca_3Si_2O_7$, $Ca_7MgSi_4O_{16}$, $Ca_3MgSi_2O_8$, $Ca_2MgSi_2O_7$, $CaMgSi_2O_6$, $CaFeSiO_4$, $Mg_2SiO_4$, $MgSiO_3$, $Ca_2Fe_2O_5$, $Ca_3Al_2O_6$, $Ca_{12}Al_{14}O_{33}$, $CaAl_4O_7$, $CaAl_{12}O_{19}$, $MgFe_2O_4$, $Ca_2Al_2SiO_7$, or a combination thereof.

Aspect 8 provides the method of any one of Aspects 1-7, wherein the one or more minerals comprise $Mg(OH)_2$, $CaSiO_3$, $Mg_3Si_2O_5(OH)_4$, or a combination thereof.

Aspect 9 provides the method of any one of Aspects 1-8, wherein the one or more minerals comprise brucite.

Aspect 10 provides the method of any one of Aspects 1-9, wherein the one or more minerals comprise magnesium hydroxide.

Aspect 11 provides the method of Aspect 10, wherein the magnesium hydroxide is 1 wt % to 100 wt % of the one or more minerals.

Aspect 12 provides the method of any one of Aspects 10-11, wherein the magnesium hydroxide is 5 wt % to 90 wt % of the one or more minerals.

Aspect 13 provides the method of any one of Aspects 1-12, wherein the first output comprises nesquehonite, hydromagnesite, dypingite, amorphous hydrated magnesium carbonate, amorphous magnesium carbonate, artinite, barringtonite, giorgiosite, landsfordite, magnesite, pokrovskite, calcite, aragonite, vaterite, amorphous calcium carbonate, siderite, other thermodynamically stable carbonate minerals, or a combination thereof.

Aspect 14 provides the method of any one of Aspects 1-13, wherein the one or more minerals are in the form of structured powder bodies, wherein each of the structured powder bodies comprises an agglomerated powder.

Aspect 15 provides the method of Aspect 14, wherein the structured powder bodies are substantially free of added binders.

Aspect 16 provides the method of any one of Aspects 14-15, wherein added binders are 0 wt % to 10 wt % of the structured powder bodies.

Aspect 17 provides the method of any one of Aspects 14-16, wherein added binders are 0 wt % to 3 wt % of the structured powder bodies.

Aspect 18 provides the method of any one of Aspects 14-17, wherein added binders are 0 wt % to 1 wt % of the structured powder bodies.

Aspect 19 provides the method of any one of Aspects 14-18, wherein the structured powder bodies have a moisture content of 0 wt % to 10 wt %.

Aspect 20 provides the method of any one of Aspects 14-19, wherein the structured powder bodies have a moisture content of 0 wt % to 3 wt %.

Aspect 21 provides the method of any one of Aspects 14-20, wherein the structured powder bodies have a moisture content of 0 wt % to 1 wt %.

Aspect 22 provides the method of any one of Aspects 14-21, wherein the powder comprises one or more minerals, the one or more minerals comprising $Mg(OH)_2$, $CaSiO_3$, $Mg_3Si_2O_5(OH)_4$, $Mg_{10}Fe_2(CO_3)(OH)_{24}{\cdot}2H_2O$, $Mg_6Fe_3(OH)_{16}(CO_3)(H_2O)_4$, $Ca(OH)_2$, $Fe(OH)_2$, $Mn(OH)_2$, $Sr(OH)_2$, $Ba(OH)_2$, CaO, MgO, SrO, BaO, $Ca_2SiO_4$, $Ca_3SiO_5$, $Ca_3Si_2O_7$, $Ca_7MgSi_4O_{16}$, $Ca_3MgSi_2O_8$, $Ca_2MgSi_2O_7$, $CaMgSi_2O_6$, $CaFeSiO_4$, $Mg_2SiO_4$, $MgSiO_3$, $Ca_2Fe_2O_5$, $Ca_3Al_2O_6$, $Ca_{12}Al_{14}O_{33}$, $CaAl_4O_7$, $CaAl_{12}O_{19}$, $MgFe_2O_4$, $Ca_2Al_2SiO_7$, or a combination thereof.

Aspect 23 provides the method of Aspect 22, wherein the one or more minerals comprise $Mg(OH)_2$, $CaSiO_3$, $Mg_3Si_2O_5(OH)_4$, or a combination thereof.

Aspect 24 provides the method of any one of Aspects 22-23, wherein the one or more minerals are 1 wt % to 100 wt % of the powder.

Aspect 25 provides the method of any one of Aspects 22-24, wherein the one or more minerals are 15 wt % to 100 wt % of the powder.

Aspect 26 provides the method of any one of Aspects 22-25, wherein the one or more minerals comprise the magnesium hydroxide.

Aspect 27 provides the method of Aspect 26, wherein the one or more minerals comprise brucite.

Aspect 28 provides the method of any one of Aspects 14-27, wherein magnesium hydroxide is 5 wt % to 90 wt % of the powder.

Aspect 29 provides the method of any one of Aspects 14-28, wherein magnesium hydroxide is 15 wt % to 70 wt % of the powder.

Aspect 30 provides the method of any one of Aspects 14-29, wherein brucite is 1 wt % to 100 wt % of the powder.

Aspect 31 provides the method of any one of Aspects 14-30, wherein brucite is about 100 wt % of the powder.

Aspect 32 provides the method of any one of Aspects 14-31, wherein the powder is 80 wt % to 100 wt % of the structured powder bodies.

Aspect 33 provides the method of any one of Aspects 14-32, wherein the powder is 95 wt % to 100 wt % of the structured powder bodies.

Aspect 34 provides the method of any one of Aspects 14-33, wherein the particles of the powder have a mean diameter of 1 micron to 40 microns.

Aspect 35 provides the method of any one of Aspects 14-34, wherein the particles of the powder have a mean diameter of 1 micron to 10 microns.

Aspect 36 provides the method of any one of Aspects 14-35, wherein the particles of the powder have a mean diameter of 4 microns to 6 microns Aspect 37 provides the method of any one of Aspects 14-36, wherein the particles of the powder have a dao diameter of 0.1 micron to 100 microns.

Aspect 38 provides the method of any one of Aspects 14-37, wherein the particles of the powder have a $d_{80}$ diameter of 1 microns to 10 microns.

Aspect 39 provides the method of any one of Aspects 14-38, wherein the particles of the powder have a $d_{99}$ diameter of 1 micron to 200 microns.

Aspect 40 provides the method of any one of Aspects 14-39, wherein the particles of the powder have a $d_{99}$ diameter of 5 micron to 20 microns.

Aspect 41 provides the method of any one of Aspects 14-40, wherein the particles of the powder have a surface area of $1\times10^3$ $m^2/m^3$ to $1\times10^8$ $m^2/m^3$.

Aspect 42 provides the method of any one of Aspects 14-41, wherein the particles of the powder have a surface area of $0.5\times10^6$ $m^2/m^3$ to $5\times10^6$ $m^2/m^3$.

Aspect 43 provides the method of any one of Aspects 14-42, wherein the particles of the powder have a Sauter mean diameter (D[3,2]) of 0.5 micron to 10 microns.

Aspect 44 provides the method of any one of Aspects 14-43, wherein the particles of the powder have a Sauter mean diameter (D[3,2]) of 2 microns to 4 microns.

Aspect 45 provides the method of any one of Aspects 14-44, wherein the particles of the powder have a De Brouckere mean diameter (D[4,3]) of 0.5 micron to 10 microns.

Aspect 46 provides the method of any one of Aspects 14-45, wherein the particles of the powder have a De Brouckere mean diameter (D[4,3]) of 2 microns to 5 microns.

Aspect 47 provides the method of any one of Aspects 14-46, wherein the structured powder bodies comprise the powder particles directly fused to one another and/or the powder particles fused to one another via a connective matrix that extends between the particles and that has the same composition as the powder particles.

Aspect 48 provides the method of any one of Aspects 1-47, wherein the structured powder bodies have a mean largest dimension size of 1 mm to 30 mm.

Aspect 49 provides the method of any one of Aspects 1-48, wherein the structured powder bodies have a mean largest dimension size of 1 mm to 10 mm.

Aspect 50 provides the method of any one of Aspects 1-49, wherein the structured powder bodies have a shape that is ellipsoidal, spheroidal, spherical, planar, or a combination thereof.

Aspect 51 provides the method of any one of Aspects 1-50, wherein the structured powder bodies has a shape that is a sphere, cylinder, cube, tetrahedron, octahedron, icosahedron, dodecahedron, ellipse, cuboid, tube, torus, sheet, a three-dimensional projection of a two-dimensional shape, or a combination thereof.

Aspect 52 provides the method of any one of Aspects 1-51, wherein the structured powder bodies are pellets.

Aspect 53 provides the method of Aspect 52, wherein the pellets have a shape that is spherical, spheroidal, ellipsoidal, or a combination thereof.

Aspect 54 provides the method of any one of Aspects 52-53, wherein the pellets have a spherical shape.

Aspect 55 provides the method of any one of Aspects 52-54, wherein the pellets have a mean diameter of 1 mm to 30 mm.

Aspect 56 provides the method of any one of Aspects 52-55, wherein the pellets have a mean diameter of 4 mm to 6 mm.

Aspect 57 provides the method of any one of Aspects 14-56, wherein the structured powder bodies have an internal porosity of 10 vol % to 50 vol %.

Aspect 58 provides the method of any one of Aspects 14-57, wherein the structured powder bodies have an internal porosity of 20 vol % to 40 vol %.

Aspect 59 provides the method of any one of Aspects 14-58, wherein the structured powder bodies comprise pores homogeneously distributed throughout.

Aspect 60 provides the method of any one of Aspects 14-59, wherein the structured powder bodies have a compressive strength of 1 kPa to 500 kPa.

Aspect 61 provides the method of any one of Aspects 14-60, wherein the structured powder bodies have a compressive strength of 50 kPa to 200 kPa.

Aspect 62 provides the method of any one of Aspects 1-61, wherein the structured powder bodies comprise pellets, wherein the pellets comprise:

a pelletized powder, wherein the powder comprises brucite and magnesium hydroxide is 5 wt % to 90 wt % of the powder, and particles of the powder have a mean diameter of 1 micron to 40 microns;

wherein the pellets have a spherical shape, a mean diameter of 1 mm to 30 mm, an internal porosity of 10 vol % to 50 vol %, and wherein the pellets are substantially free of added binders.

Aspect 63 provides the method of any one of Aspects 1-62, wherein the structured powder bodies comprise pellets, wherein the pellets comprise:

a pelletized powder that is 90-100 wt % of the pellets, wherein the powder comprises brucite and magnesium hydroxide is 5 wt % to 90 wt % of the powder, particles of the powder have a dao diameter of 5 microns to 10 microns, and the particles have a mean diameter of 1 micron to 10 microns;

wherein the pellets have a spherical shape, a mean diameter of 1 mm to 10 mm, pores homogeneously distributed throughout, an internal porosity of 10 vol % to 50 vol %, and a compressive strength of 50 kPa to 500 kPa, and wherein the pellets are substantially free of added binders.

Aspect 64 provides the method of any one of Aspects 1-63, wherein the first feedstock has a carbon dioxide content of 0.01 vol % to 100 vol %.

Aspect 65 provides the method of any one of Aspects 1-64, wherein the first feedstock has a carbon dioxide content of 0.03 vol % to 0.1 vol %.

Aspect 66 provides the method of any one of Aspects 1-65, wherein the contacting the first feedstock and the second feedstock is performed in a reactor, wherein the method comprises introducing the first feedstock to the reactor to contact the second feedstock within the reactor and to form the first and second output in the reactor, wherein the method comprises removing the second output from the reactor.

Aspect 67 provides the method of Aspect 66, wherein the reactor comprises a reactor cavity configured to house structured powder bodies comprising the one or more minerals, a gas inlet extending through a wall of the reactor and into the reactor cavity, the gas inlet configured to accept the first feedstock, and a gas outlet extending through the wall of the reactor and into the reactor cavity, the gas outlet configured to release the second output from the reactor.

Aspect 68 provides the method of Aspect 67, wherein the reactor cavity comprises a removable cassette that is configured to house the one or more minerals.

Aspect 69 provides the method of Aspect 68, wherein the cassette comprises one or more sides comprising a screen or mesh having openings that are smaller than a mean diameter or a mean largest dimension size of the structured powder bodies.

Aspect 70 provides the method of any one of Aspects 68-69, wherein the reactor is configured such that the removable cassette can be slid into and out of the reactor.

Aspect 71 provides the method of any one of Aspects 68-70, wherein the reactor is configured such that the cassette forms a substantially airtight seal with an interior of the wall of the reactor such that gas entering from the gas inlet is substantially prevented from bypassing the reactor cavity as it flows through the cassette and toward the gas outlet.

Aspect 72 provides the method of any one of Aspects 68-71, wherein the gas inlet is located at a portion of the reactor that is at one end of the reactor, and the gas outlet is located at a portion of the reactor at an opposite end of the reactor, such that the reactor is configured for the gas source to pass through the cassette toward the gas outlet.

Aspect 73 provides the method of any one of Aspects 1-72, wherein the contacting comprises flowing the first feedstock through a dry bed of the one or more minerals having a depth of 0.5 m to 5 m.

Aspect 74 provides the method of any one of Aspects 1-73, wherein the contacting comprises flowing the first feedstock through a dry bed of the one or more minerals having a depth of 1 m to 1.5 m.

Aspect 75 provides the method of any one of Aspects 66-74, wherein the first feedstock has an average superficial space velocity through the reactor of 0.001 m/s to 10 m/s.

Aspect 76 provides the method of any one of Aspects 66-75, wherein the first feedstock has an average superficial space velocity through the reactor of 0.01 m/s to 0.1 m/s.

Aspect 77 provides the method of any one of Aspects 66-76, wherein a pressure of the first feedstock and the second output within the reactor is about atmospheric pressure.

Aspect 78 provides the method of any one of Aspects 66-77, comprising introducing the first feedstock to a portion of the reactor that is at one end of the reactor and removing the second output from a portion of the reactor that is at an opposite end of the reactor, such that the first feedstock flows through the second feedstock.

Aspect 79 provides the method of any one of Aspects 1-78, wherein the contacting of the first feedstock and the second feedstock is conducted at about ambient temperature.

Aspect 80 provides the method of any one of Aspects 1-79, wherein the contacting of the first feedstock and the second feedstock is conducted at a temperature of −15° C. to 60° C.

Aspect 81 provides the method of any one of Aspects 1-80, wherein the contacting of the first feedstock and the second feedstock is conducted at a temperature of 15° C. to 30° C.

Aspect 82 provides the method of any one of Aspects 1-81, comprising refreshing the second feedstock after contacting the second feedstock with the continuously flowing first feedstock for at least 1 day and less than or equal to 180 days.

Aspect 83 provides the method of any one of Aspects 1-82, comprising refreshing the second feedstock after contacting the second feedstock with the continuously flowing first feedstock for at least 60 days and less than or equal to 90 days.

Aspect 84 provides the method of any one of Aspects 1-83, wherein the first feedstock has a relative humidity of 50% to 100%.

Aspect 85 provides the method of any one of Aspects 1-84, wherein the first feedstock has a relative humidity of greater than or equal to 70% to less than 100%.

Aspect 86 provides the method of any one of Aspects 1-85, wherein the first feedstock has a relative humidity of greater than or equal to 90% to less than 100%.

Aspect 87 provides the method of any one of Aspects 1-86, wherein the first feedstock comprises an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof.

Aspect 88 provides the method of any one of Aspects 1-87, wherein the first feedstock is air.

Aspect 89 provides the method of any one of Aspects 1-88, wherein the method further comprises adjusting relative humidity of a first feedstock precursor to form the first feedstock.

Aspect 90 provides the method of Aspect 89, wherein the first feedstock precursor comprises an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof.

Aspect 91 provides the method of any one of Aspects 89-90, wherein the first feedstock precursor is air.

Aspect 92 provides the method of any one of Aspects 89-91, wherein adjusting the relative humidity of the first feedstock precursor comprises passing the first feedstock precursor through a humidifying apparatus.

Aspect 93 provides the method of Aspect 92, wherein the humidifying apparatus comprises a humidifying packed column that increases relative humidity of the first feedstock precursor.

Aspect 94 provides the method of Aspect 93, comprising flowing the first feedstock precursor horizontally through the humidifying packed column while flowing water through packing of the column vertically.

Aspect 95 provides the method of any one of Aspects 92-94, wherein the humidifying apparatus comprises a knockout portion that extracts excess moisture from the first feedstock precursor after treatment with moistened packing of a humidifying packed column.

Aspect 96 provides the method of any one of Aspects 1-95, wherein the second output has a carbon dioxide concentration that is 0% to 99% of the carbon dioxide concentration of the first feedstock.

Aspect 97 provides the method of any one of Aspects 1-96, wherein the second output has a carbon dioxide concentration that is 0% to 50% of the carbon dioxide concentration of the first feedstock.

Aspect 98 provides a method for sequestering carbon dioxide, the method comprising:

contacting a gaseous feedstock comprising carbon dioxide and having a relative humidity of 50% to 100% with pellets comprising a pelletized powder comprising brucite, wherein the powder is 5 wt % to 90 wt % magnesium hydroxide, such that at least a portion of the carbon dioxide in the gaseous feedstock reacts with the pellets to produce used pellets that are the pellets after reaction with the carbon dioxide to form one or more magnesium carbonates and a gaseous output having a lower concentration of carbon dioxide than a concentration of carbon dioxide in the gaseous feedstock.

Aspect 99 provides a method for sequestering carbon dioxide, the method comprising:

introducing a first feedstock into a reactor, wherein the first feedstock is gaseous and comprises carbon dioxide, wherein the first feedstock has a relative humidity of 80% to 100%; and contacting the first feedstock with a second feedstock in the reactor, the second feedstock comprising dry spherical pellets that are less than or equal to 15 wt % water, have a mean diameter of 1 mm to 10 mm, and comprise a pelletized powder comprising brucite, wherein the powder is 5 wt % to 90 wt % magnesium hydroxide, such that at least a portion of the carbon dioxide reacts with the pellets to produce first and second outputs, wherein the first output comprises used pellets that are the pellets after reaction with the carbon dioxide to form one or more magnesium carbonates and the second output is a gaseous output having a lower concentration of carbon dioxide than a concentration of carbon dioxide in the first feedstock.

Aspect 100 provides an apparatus for sequestering carbon dioxide comprising:

a reactor comprising a reactor cavity configured to house structured powder bodies comprising one or more minerals, a gas inlet extending through a wall of the reactor and into the reactor cavity, and a gas outlet extending through the wall of the reactor and into the reactor cavity, the gas outlet configured to release a product gas from the reactor; and wherein the reactor is configured such that a gas source comprising carbon dioxide provided to the reactant gas inlet passes through the reactor cavity such that at least some of the carbon dioxide reacts with the structured powder bodies to form used structured powder bodies that are the structured powder bodies after reaction with the carbon dioxide to form one or more magnesium carbonates and forms the product gas having a lower concentration of carbon dioxide than the gas source.

Aspect 101 provides the apparatus of Aspect 100, wherein each of the structured powder bodies comprises an agglomerated powder.

Aspect 102 provides the apparatus of Aspect 100, wherein the structured powder bodies are substantially free of added binders.

Aspect 103 provides the apparatus of any one of Aspects 100-102, wherein added binders are 0 wt % to 10 wt % of the structured powder bodies.

Aspect 104 provides the apparatus of any one of Aspects 100-103, wherein added binders are 0 wt % to 3 wt % of the structured powder bodies.

Aspect 105 provides the apparatus of any one of Aspects 100-104, wherein added binders are 0 wt % to 1 wt % of the structured powder bodies.

Aspect 106 provides the apparatus of any one of Aspects 100-105, wherein the structured powder bodies have a moisture content of 0 wt % to 10 wt %.

Aspect 107 provides the apparatus of any one of Aspects 100-106, wherein the structured powder bodies have a moisture content of 0 wt % to 3 wt %.

Aspect 108 provides the apparatus of any one of Aspects 100-107, wherein the structured powder bodies have a moisture content of 0 wt % to 1 wt %.

Aspect 109 provides the apparatus of any one of Aspects 100-108, wherein the powder comprises one or more minerals, the one or more minerals comprising $Mg(OH)_2$, $CaSiO_3$, $Mg_3Si_2O_5(OH)_4$, $Mg_{10}Fe_2(CO_3)(OH)_{24}\cdot 2H_2O$, $Mg_6Fe_3(OH)_{16}(CO_3)(H_2O)_4$, $Ca(OH)_2$, $Fe(OH)_2$, $Mn(OH)_2$, $Sr(OH)_2$, $Ba(OH)_2$, CaO, MgO, SrO, BaO, $Ca_2SiO_4$, $Ca_3SiO_5$, $Ca_3Si_2O_7$, $Ca_7MgSi_4O_{16}$, $Ca_3MgSi_2O_8$, $Ca_2MgSi_2O_7$, $CaMgSi_2O_6$, $CaFeSiO_4$, $Mg_2SiO_4$, $MgSiO_3$, $Ca_2Fe_2O_5$, $Ca_3Al_2O_6$, $Ca_{12}Al_{14}O_{33}$, $CaAl_4O_7$, $CaAl_{12}O_{19}$, $MgFe_2O_4$, $Ca_2Al_2SiO_7$, or a combination thereof.

Aspect 110 provides the apparatus of Aspect 109, wherein the one or more minerals comprise $Mg(OH)_2$, $CaSiO_3$, $Mg_3Si_2O_5(OH)_4$, or a combination thereof.

Aspect 111 provides the apparatus of any one of Aspects 109-110, wherein the one or more minerals are 1 wt % to 100 wt % of the powder.

Aspect 112 provides the apparatus of any one of Aspects 109-111, wherein the one or more minerals are 15 wt % to 100 wt % of the powder.

Aspect 113 provides the apparatus of any one of Aspects 109-112, wherein the one or more minerals comprise the magnesium hydroxide.

Aspect 114 provides the apparatus of Aspect 113, wherein the one or more minerals comprise brucite.

Aspect 115 provides the apparatus of any one of Aspects 100-114, wherein magnesium hydroxide is 5 wt % to 90 wt % of the powder.

Aspect 116 provides the apparatus of any one of Aspects 100-115, wherein magnesium hydroxide is 15 wt % to 70 wt % of the powder.

Aspect 117 provides the apparatus of any one of Aspects 100-116, wherein brucite is 1 wt % to 100 wt % of the powder.

Aspect 118 provides the apparatus of any one of Aspects 100-117, wherein brucite is about 100 wt % of the powder.

Aspect 119 provides the apparatus of any one of Aspects 100-118, wherein the powder is 80 wt % to 100 wt % of the structured powder bodies.

Aspect 120 provides the apparatus of any one of Aspects 100-119, wherein the powder is 95 wt % to 100 wt % of the structured powder bodies.

Aspect 121 provides the apparatus of any one of Aspects 100-120, wherein the particles of the powder have a mean diameter of 1 micron to 40 microns.

Aspect 122 provides the apparatus of any one of Aspects 100-121, wherein the particles of the powder have a mean diameter of 1 micron to 10 microns.

Aspect 123 provides the apparatus of any one of Aspects 100-122, wherein the particles of the powder have a mean diameter of 4 microns to 6 microns.

Aspect 124 provides the apparatus of any one of Aspects 100-123, wherein the particles of the powder have a $d_{80}$ diameter of 0.1 micron to 100 microns.

Aspect 125 provides the apparatus of any one of Aspects 100-124, wherein the particles of the powder have a $d_{80}$ diameter of 1 microns to 10 microns.

Aspect 126 provides the apparatus of any one of Aspects 100-125, wherein the particles of the powder have a $d_{99}$ diameter of 1 micron to 200 microns.

Aspect 127 provides the apparatus of any one of Aspects 100-126, wherein the particles of the powder have a $d_{99}$ diameter of 5 micron to 20 microns.

Aspect 128 provides the apparatus of any one of Aspects 100-127, wherein the particles of the powder have a surface area of $1\times10^3$ $m^2/m^3$ to $1\times10^8$ $m^2/m^3$.

Aspect 129 provides the apparatus of any one of Aspects 100-128, wherein the particles of the powder have a surface area of $0.5\times10^6$ $m^2/m^3$ to $5\times10^6$ $m^2/m^3$.

Aspect 130 provides the apparatus of any one of Aspects 100-129, wherein the particles of the powder have a Sauter mean diameter (D[3,2]) of 0.5 micron to 10 microns.

Aspect 131 provides the apparatus of any one of Aspects 100-130, wherein the particles of the powder have a Sauter mean diameter (D[3,2]) of 2 microns to 4 microns.

Aspect 132 provides the apparatus of any one of Aspects 100-131, wherein the particles of the powder have a De Brouckere mean diameter (D[4,3]) of 0.5 micron to 10 microns.

Aspect 133 provides the apparatus of any one of Aspects 100-132, wherein the particles of the powder have a De Brouckere mean diameter (D[4,3]) of 2 microns to 5 microns.

Aspect 134 provides the apparatus of any one of Aspects 100-133, wherein the structured powder bodies comprise the powder particles directly fused to one another and/or the powder particles fused to one another via a connective matrix that extends between the particles and that has the same composition as the powder particles.

Aspect 135 provides the apparatus of any one of Aspects 100-134, wherein the structured powder bodies have a mean largest dimension size of 1 mm to 30 mm.

Aspect 136 provides the apparatus of any one of Aspects 100-135, wherein the structured powder bodies have a mean largest dimension size of 1 mm to 10 mm.

Aspect 137 provides the apparatus of any one of Aspects 100-136, wherein the structured powder bodies have a shape that is ellipsoidal, spheroidal, spherical, planar, or a combination thereof.

Aspect 138 provides the apparatus of any one of Aspects 100-137, wherein the structured powder bodies has a shape that is a sphere, cylinder, cube, tetrahedron, octahedron, icosahedron, dodecahedron, ellipse, cuboid, tube, torus, sheet, a three-dimensional projection of a two-dimensional shape, or a combination thereof.

Aspect 139 provides the apparatus of any one of Aspects 100-138, wherein the structured powder bodies are pellets.

Aspect 140 provides the apparatus of Aspects 139, wherein the pellets have a shape that is spherical, spheroidal, ellipsoidal, or a combination thereof.

Aspect 141 provides the apparatus of any one of Aspects 139-140, wherein the pellets have a spherical shape.

Aspect 142 provides the apparatus of any one of Aspects 139-141, wherein the pellets have a mean diameter of 1 mm to 30 mm.

Aspect 143 provides the apparatus of any one of Aspects 139-142, wherein the pellets have a mean diameter of 4 mm to 6 mm.

Aspect 144 provides the apparatus of any one of Aspects 100-143, wherein the structured powder bodies have an internal porosity of 10 vol % to 50 vol %.

Aspect 145 provides the apparatus of any one of Aspects 100-144, wherein the structured powder bodies have an internal porosity of 20 vol % to 40 vol %.

Aspect 146 provides the apparatus of any one of Aspects 100-145, wherein the structured powder bodies comprise pores homogeneously distributed throughout.

Aspect 147 provides the apparatus of any one of Aspects 100-146, wherein the structured powder bodies have a compressive strength of 1 kPa to 500 kPa.

Aspect 148 provides the apparatus of any one of Aspects 100-147, wherein the structured powder bodies have a compressive strength of 50 kPa to 200 kPa.

Aspect 149 provides the apparatus of any one of Aspects 100-148, wherein the structured powder bodies comprise pellets, wherein the pellets comprise:

a pelletized powder, wherein the powder comprises brucite and magnesium hydroxide is 5 wt % to 90 wt % of the powder, and particles of the powder have a mean diameter of 1 micron to 40 microns;

wherein the pellets have a spherical shape, a mean diameter of 1 mm to 30 mm, an internal porosity of 10 vol % to 50 vol %, and wherein the pellets are substantially free of added binders.

Aspect 150 provides the apparatus of any one of Aspects 100-149, wherein the structured powder bodies comprise pellets, wherein the pellets comprise:

a pelletized powder that is 90-100 wt % of the pellets, wherein the powder comprises brucite and magnesium hydroxide is 5 wt % to 90 wt % of the powder, particles of the powder have a $d_{80}$ diameter of 5 microns to 10 microns, and the particles have a mean diameter of 1 micron to 10 microns;

wherein the pellets have a spherical shape, a mean diameter of 1 mm to 10 mm, pores homogeneously distributed throughout, an internal porosity of 10 vol % to 50 vol %, and a compressive strength of 50 kPa to 500 kPa, and wherein the pellets are substantially free of added binders.

Aspect 151 provides the apparatus of any one of Aspects 100-150, wherein the gas source has a relative humidity of 50% to 100%.

Aspect 152 provides the apparatus of any one of Aspects 100-151, wherein the gas source has a relative humidity of greater than or equal to 70% and less than 100%

Aspect 153 provides the apparatus of any one of Aspects 100-152, wherein the gas source has a relative humidity of greater than or equal to 90% to less than 100%.

Aspect 154 provides the apparatus of any one of Aspects 100-153, wherein the gas source has a carbon dioxide content of 0.01 vol % to 100 vol %.

Aspect 155 provides the apparatus of any one of Aspects 100-154, wherein the gas source has a carbon dioxide content of 0.03 vol % to 0.1 vol %.

Aspect 156 provides the apparatus of any one of Aspects 100-155, wherein the reactor is configured to contact the gas source with the structured powder bodies at a pressure of about atmospheric pressure.

Aspect 157 provides the apparatus of any one of Aspects 100-156, wherein the reactor is configured to contact the gas source with the structured powder bodies at a temperature of about ambient temperature.

Aspect 158 provides the apparatus of any one of Aspects 100-157, wherein the reactor is configured to contact the gas source with the structured powder bodies at a temperature of −15° C. to 60° C.

Aspect 159 provides the apparatus of any one of Aspects 100-158, wherein the reactor is configured to contact the gas source with the structured powder bodies at a temperature of 15° C. to 30° C.

Aspect 160 provides the apparatus of any one of Aspects 100-159, wherein the reactor is configured to house a dry bed of the structured powder bodies having a depth of 0.5 m to 5 m.

Aspect 161 provides the apparatus of any one of Aspects 100-160, wherein the reactor is configured to house a dry bed of the structured powder bodies having a depth of 1 m to 1.5 m.

Aspect 162 provides the apparatus of any one of Aspects 100-161, wherein the gas source comprises an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof.

Aspect 163 provides the apparatus of any one of Aspects 100-162, wherein the gas source is air.

Aspect 164 provides the apparatus of any one of Aspects 100-163, wherein the gas inlet is located in a portion of the reactor at one end of the reactor, and the gas outlet is located in a portion of the reactor that is at an opposite end of the reactor.

Aspect 165 provides the apparatus of any one of Aspects 100-164, wherein the reactor cavity comprises a removable cassette that is configured to house the structured powder bodies.

Aspect 166 provides the apparatus of Aspect 165, wherein the reactor is configured such that the removable cassette can be slid into and out of the reactor.

Aspect 167 provides the apparatus of any one of Aspects 165-166, wherein the cassette comprises one or more sides comprising a screen or mesh having openings that are smaller than a mean diameter or mean largest dimension size of the structured powder bodies.

Aspect 168 provides the apparatus of any one of Aspects 165-167, wherein the reactor is configured such that the cassette forms a substantially airtight seal with an interior of the wall of the reactor such that gas entering from the gas inlet is substantially prevented from bypassing the reactor cavity as it flows through the cassette and toward the gas outlet.

Aspect 169 provides the apparatus of any one of Aspects 165-168, wherein the gas inlet is located at a portion of the reactor at one end of the reactor, and the gas outlet is located at a portion of the reactor that is at an opposite end of the reactor, such that the apparatus is configured for the gas source to pass through the cassette toward the gas outlet.

Aspect 170 provides an apparatus for sequestering carbon dioxide comprising:

a reactor comprising a reactor cavity configured to house pellets comprising a pelletized powder comprising brucite, wherein the powder is 5 wt % to 90 wt % magnesium hydroxide, a gas inlet extending through a wall of the reactor and into the reactor cavity, and a gas outlet extending through the wall of the reactor and into the reactor cavity, the gas outlet arranged to release a product gas from the reactor; and wherein the reactor is configured such that a gas source comprising carbon dioxide and having a relative humidity of 50% to 100% provided to the reactant gas inlet passes through the reactor cavity such that at least some of the carbon dioxide reacts with the pellets to form used pellets that are the pellets after reaction with the carbon dioxide to form one or more magnesium carbonates and forms the product gas having a lower concentration of carbon dioxide than the gas source.

Aspect 171 provides an apparatus for sequestering carbon dioxide comprising:

a reactor comprising a reactor cavity comprising a removable cassette configured to house a stationary and dry bed of pellets, wherein the pellets are less than or equal to 15 wt % water and comprise a pelletized powder comprising brucite, wherein the powder is 5 wt % to 90 wt % magnesium hydroxide, wherein the pellets are spherical pellets having a mean diameter of 1 mm to 10 mm, wherein the removable cassette and the reactor are configured such that the removable cassette can be slid into and out of the reactor, a gas inlet extending through a wall of the reactor and into the reactor cavity, wherein the gas inlet is located in a portion of the reactor that is at one end of the reactor, and a gas outlet extending through the wall of the reactor and into the reactor cavity, the gas outlet arranged to release a product gas from the reactor, wherein the gas outlet is located in a portion of the reactor that is at an opposite end of the reactor, wherein the reactor is configured such that the cassette forms a substantially airtight seal with an interior of the wall of the reactor such that gas entering from the gas inlet is prevented from bypassing the reactor cavity as it flows to the gas outlet; and wherein the reactor is configured such that a gas source comprising carbon dioxide and having a relative humidity of 80% to 100% provided to the reactant gas inlet passes through the reactor cavity such that at least some of the carbon dioxide reacts with the pellets to form used pellets that are the pellets after reaction with the carbon dioxide to form one or more magnesium carbonates and forms the product gas having a lower concentration of carbon dioxide than the gas source.

Aspect 172 provides the method or apparatus of any one or any combination of Aspects 1-171 optionally configured such that all elements or options recited are available to use or select from.

What is claimed is:

1. A method for sequestering carbon dioxide, the method comprising:

contacting a first feedstock that is a gaseous feedstock having a relative humidity of 74% to 100% and comprising carbon dioxide with a second feedstock comprising one or more minerals, such that at least a portion of the carbon dioxide in the first feedstock reacts with the one or more minerals in the second feedstock to form a first output comprising one or more carbonate minerals and a second output that is a gaseous output having a lower concentration of carbon dioxide than a concentration of carbon dioxide in the first feedstock.

2. The method of claim 1, wherein prior to the contacting of the first feedstock and the second feedstock liquid water is 0 wt % to 15 wt % of the one or more minerals.

3. The method of claim 1, wherein the one or more minerals comprise $Mg(OH)_2$, $CaSiO_3$, $Mg_3Si_2O_5(OH)_4$, $Mg_{10}Fe_2(CO_3)(OH)_{24}·2H_2O$, $Mg_6Fe_3(OH)_{16}(CO_3)(H_2O)_4$, $Ca(OH)_2$, $Fe(OH)_2$, $Mn(OH)_2$, $Sr(OH)_2$, $Ba(OH)_2$, CaO, MgO, SrO, BaO, $Ca_2SiO_4$, $Ca_3SiO_5$, $Ca_3Si_2O_7$, $Ca_7MgSi_4O_{16}$, $Ca_3MgSi_2O_8$, $Ca_2MgSi_2O_7$, $CaMgSi_2O_6$, $CaFeSiO_4$, $Mg_2SiO_4$, $MgSiO_3$, $Ca_2Fe_2O_5$, $Ca_3Al_2O_6$, $Ca_{12}Al_{14}O_{33}$, $CaAl_{407}$, $CaAl_{12}O_{19}$, $MgFe_{204}$, $Ca_2Al_2SiO_7$, or a combination thereof.

4. The method of claim 1, wherein the one or more minerals comprise brucite.

5. The method of claim 1, wherein the one or more minerals comprise magnesium hydroxide, wherein the magnesium hydroxide is 5 wt % to 90 wt % of the one or more minerals.

6. The method of claim 1, wherein the one or more minerals are in the form of structured powder bodies, wherein each of the structured powder bodies comprises an agglomerated powder, wherein the structured powder bodies have an average largest dimension size of 1 mm to 250 mm.

7. The method of claim 6, wherein the structured powder bodies comprise pellets, wherein the pellets comprise:

a pelletized powder, wherein the powder comprises brucite and magnesium hydroxide is 5 wt % to 90 wt % of the powder, and particles of the powder have a mean diameter of 1 micron to 40 microns;

wherein the pellets have a spherical shape, a mean diameter of 1 mm to 30 mm, an internal porosity of 10 vol % to 50 vol %, and wherein the pellets are substantially free of added binders.

8. The method of claim 6, wherein the structured powder bodies comprise pellets, wherein the pellets comprise:

a pelletized powder that is 90-100 wt % of the pellets, wherein the powder comprises brucite and magnesium hydroxide is 5 wt % to 90 wt % of the powder, particles of the powder have a $d_{80}$ diameter of 5 microns to 10 microns, and the particles have a mean diameter of 1 micron to 10 microns;

wherein the pellets have a spherical shape, a mean diameter of 1 mm to 10 mm, pores homogeneously distributed throughout, an internal porosity of 10 vol % to 50 vol %, and a compressive strength of 50 kPa to 500 kPa, and wherein the pellets are substantially free of added binders.

9. The method of claim 1, wherein the contacting the first feedstock and the second feedstock is performed in a reactor, wherein the method comprises introducing the first feedstock to the reactor to contact the second feedstock within the reactor and to form the first and second output in the reactor, wherein the method comprises removing the second output from the reactor, wherein the reactor comprises a reactor cavity configured to house structured powder bodies comprising the one or more minerals, a gas inlet extending through a wall of the reactor and into the reactor cavity, the gas inlet configured to accept the first feedstock, and a gas outlet extending through the wall of the reactor and into the reactor cavity, the gas outlet configured to release the second output from the reactor.

10. The method of claim 9, wherein the reactor cavity comprises a removable cassette that is configured to house the one or more minerals.

11. The method of claim 9, wherein a pressure of the first feedstock and the second output within the reactor is about atmospheric pressure, wherein the contacting of the first feedstock and the second feedstock is conducted at about ambient temperature.

12. The method of claim 1, wherein the contacting comprises flowing the first feedstock through a bed of the one or more minerals having a depth of 0.5 m to 5 m.

13. The method of claim 1, wherein the first feedstock has a relative humidity of 80% to 100%.

14. The method of claim 1, wherein the first feedstock comprises an industrial gas, a cement industry emission, a chemical industry emission, a fertilizer industry emission, exhaust from a fossil fuel combustion process, a natural gas stream, a flue gas from a power plant or industrial process, an agricultural activity emission, a forestry activity emission, an emission from a biogenic source, an emission from waste, atmospheric air, or a combination thereof.

15. The method of claim 1, wherein the first feedstock is air.

16. The method of claim 1, wherein the method further comprises adjusting relative humidity of a first feedstock precursor to form the first feedstock.

17. The method of claim 1, wherein the second output has a carbon dioxide concentration that is 0% to 50% of the carbon dioxide concentration of the first feedstock.

18. The method of claim 1, wherein the contacting the first feedstock and the second feedstock is performed in a reactor, wherein the method comprises introducing the first feedstock to the reactor to contact the second feedstock within the reactor and to form the first and second output in the reactor, wherein the method comprises removing the second output from the reactor, wherein the first feedstock is gaseous and comprises carbon dioxide, wherein the first feedstock has a relative humidity of 80% to 100%, wherein the second feedstock comprises dry spherical pellets that are less than or equal to 15 wt % water, have a mean diameter of 1 mm to 10 mm, and comprise a pelletized powder comprising brucite, wherein the powder is 5 wt % to 90 wt % magnesium hydroxide, and wherein the first output comprises used pellets that are the pellets after reaction with the carbon dioxide to form one or more magnesium carbonates.

* * * * *